US012527968B2

(12) United States Patent
Puleo et al.

(10) Patent No.: US 12,527,968 B2
(45) Date of Patent: Jan. 20, 2026

(54) TECHNIQUES FOR NEUROMODULATION

(71) Applicant: General Electric Company, Schenectady, NY (US)

(72) Inventors: Christopher Michael Puleo, Niskayuna, NY (US); Victoria Cotero, Niskayuna, NY (US); Ying Fan, Niskayuna, NY (US); Tzu-Jen Kao, Niskayuna, NY (US); David Mills, Niskayuna, NY (US); Jeffrey Ashe, Niskayuna, NY (US); Sireesha Kaanumalle, Niskayuna, NY (US); Kirk Dennis Wallace, Niskayuna, NY (US); Kenneth Wayne Rigby, Niskayuna, NY (US); Ileana Hancu, Clifton Park, NY (US); James Rothman, Niskayuna, NY (US)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 1224 days.

(21) Appl. No.: 16/345,974

(22) PCT Filed: Oct. 31, 2017

(86) PCT No.: PCT/US2017/059394
§ 371 (c)(1),
(2) Date: Apr. 29, 2019

(87) PCT Pub. No.: WO2018/081826
PCT Pub. Date: May 3, 2018

(65) Prior Publication Data
US 2020/0054228 A1 Feb. 20, 2020

Related U.S. Application Data

(60) Provisional application No. 62/415,212, filed on Oct. 31, 2016.

(51) Int. Cl.
*A61N 1/40* (2006.01)
*A61B 5/00* (2006.01)
(Continued)

(52) U.S. Cl.
CPC ................. *A61N 1/40* (2013.01); *A61B 5/407* (2013.01); *A61B 5/418* (2013.01); *A61B 5/6825* (2013.01);
(Continued)

(58) Field of Classification Search
CPC ...... A61N 1/40; A61N 1/36014; A61N 2/006; A61N 2/02; A61N 7/00; A61N 2007/0026;
(Continued)

(56) References Cited

U.S. PATENT DOCUMENTS 7,418,292 B2   8/2008  Shafer
7,628,750 B2  12/2009  Cohen et al.
(Continued)

FOREIGN PATENT DOCUMENTS

CN   104800973 A   7/2015
CN   104856731 A   8/2015
(Continued)

OTHER PUBLICATIONS

Gigliotti et al., Ultrasound Modulates the Splenic Neuroimmune Axis in Attenuating AKI, Journal of the American Society of Nephrology : JASN, Oct. 2015, vol. 26, Issue: 10, pp. 2470-2481.
(Continued)

*Primary Examiner* — Hien N Nguyen
(74) *Attorney, Agent, or Firm* — Fletcher Yoder, P.C.

(57) ABSTRACT

The subject matter of the present disclosure generally relates to techniques for neuromodulation of a tissue that include applying energy (e.g., ultrasound energy) into the tissue to
(Continued)

cause altered activity at a synapse between a neuron and a non-neuronal cell.

3 Claims, 43 Drawing Sheets

(51) Int. Cl.
  *A61B 90/00*  (2016.01)
  *A61N 1/36*  (2006.01)
  *A61N 2/00*  (2006.01)
  *A61N 2/02*  (2006.01)
  *A61N 7/00*  (2006.01)
(52) U.S. Cl.
  CPC ..... *A61B 2090/378* (2016.02); *A61N 1/36014* (2013.01); *A61N 2/006* (2013.01); *A61N 2/02* (2013.01); *A61N 7/00* (2013.01); *A61N 2007/0026* (2013.01)
(58) Field of Classification Search
  CPC ........... A61B 5/24; A61B 5/407; A61B 5/418; A61B 5/6825; A61B 2090/378; A61B 5/6823; A61B 5/40
  See application file for complete search history.

(56) References Cited

U.S. PATENT DOCUMENTS

| | | | |
|---|---|---|---|
| 8,321,012 | B2 | 11/2012 | Della Rocca et al. |
| 8,463,387 | B2 | 6/2013 | De Ridder |
| 8,715,209 | B2 | 5/2014 | Gertner |
| 8,843,210 | B2 | 9/2014 | Simon et al. |
| 8,858,440 | B2 | 10/2014 | Tyler |
| 9,020,591 | B2 | 4/2015 | Dacey, Jr. et al. |
| 11,013,938 | B2 | 5/2021 | Konofagou et al. |
| 2004/0034304 | A1* | 2/2004 | Sumi ............... G01S 7/52042 600/439 |
| 2007/0093716 | A1* | 4/2007 | Radulescu ............ G01S 7/5206 600/437 |
| 2009/0112133 | A1 | 4/2009 | Diesseroth et al. |
| 2011/0028859 | A1 | 2/2011 | Chian |
| 2013/0066239 | A1 | 3/2013 | Mishelevich |
| 2013/0324892 | A1 | 12/2013 | Zhu et al. |
| 2014/0288551 | A1* | 9/2014 | Bharmi ............... A61N 1/3702 606/41 |
| 2015/0025422 | A1 | 1/2015 | Tyler |
| 2015/0111918 | A1 | 4/2015 | Sobotka et al. |
| 2015/0224348 | A1 | 8/2015 | Iyer et al. |
| 2016/0001096 | A1 | 1/2016 | Mishelevich |
| 2016/0016016 | A1 | 1/2016 | Taylor et al. |
| 2016/0128767 | A1 | 5/2016 | Azamian et al. |
| 2016/0279021 | A1 | 9/2016 | Hyde et al. |
| 2018/0028841 | A1* | 2/2018 | Konofagou ............. A61N 7/02 |
| 2019/0251327 | A1* | 8/2019 | Laviola ............... A61B 8/5261 |

FOREIGN PATENT DOCUMENTS

| | | |
|---|---|---|
| CN | 105636644 A | 6/2016 |
| EP | 2344039 A1 | 7/2011 |
| EP | 2821103 A1 | 1/2015 |

OTHER PUBLICATIONS

Giglioiti. el al 'Ultrasound Prevents Renal Ischemia,Reperfusion Injury by Stimulating the Splenic Cholinergic Anti-Inflammatory Pathway'. JASN. Sep. 2013, Z,T, pp. 1340-1342, Published Ahead of Print Aug. 1, 2013, ISSN 1046-6673.

Lee et al., Creation of Various Skin Sensations using Pulsed Focused Ultrasound: Evidence for Functional Neuromodulation, International Journal of Imaging Systems and Technology, Jun. 1, 2014, vol. 24, No. 2, pp. 167-174.

Wu F, High intensity focused ultrasound ablation and antitumor immune response, Acoustical Society of America, Aug. 2013, vol. 134, Issue: 2, pp. 1695-1701.

Extended European Search Report for EP Application No. 17865071.9 mailed Oct. 6, 2020, 8 pages.

Chinese Office Action for Application No. 201780067523.X dated May 25, 2021, 8 pgs.

Australian Examination Report for Application No. 2017348440 dated Feb. 25, 2022, 5 pgs.

* cited by examiner

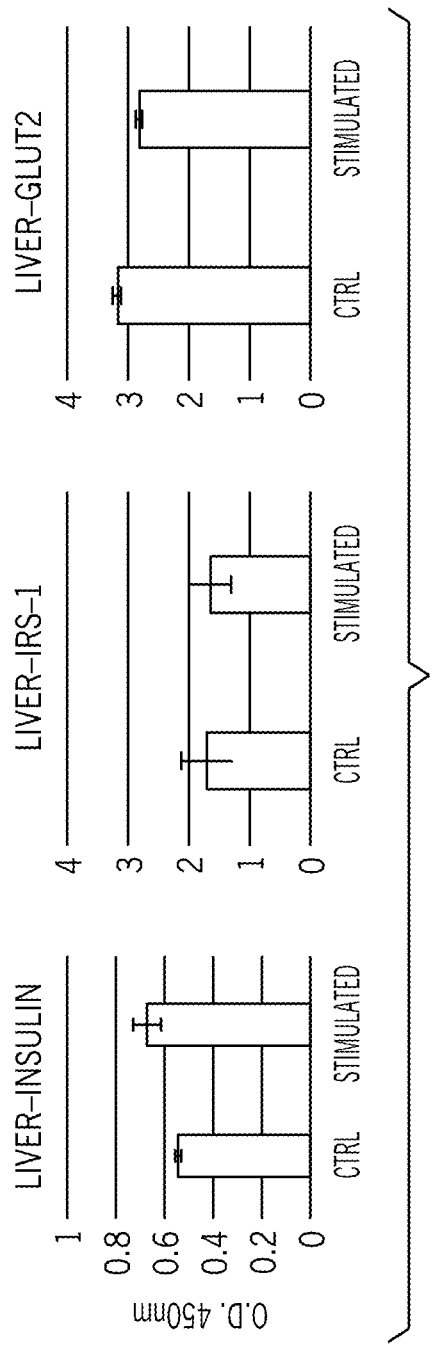
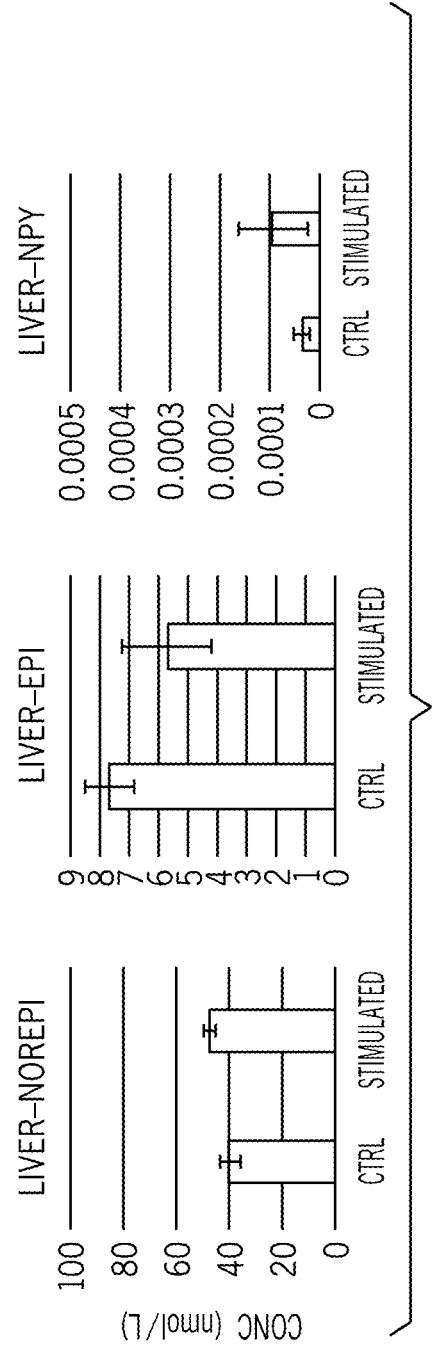
FIG. 37B
FIG. 37C

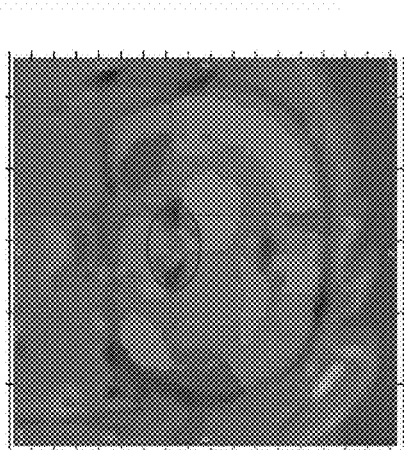
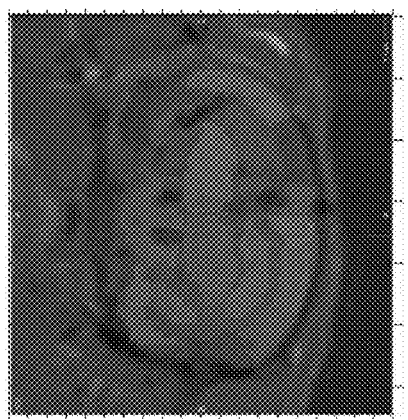
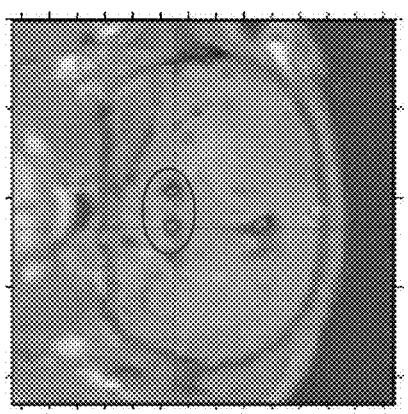
FIG. 43
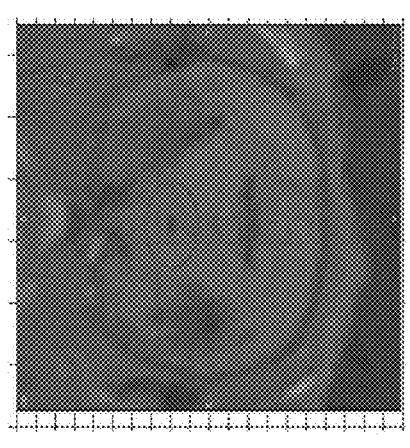
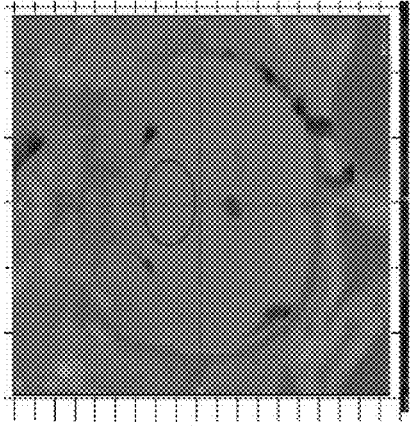
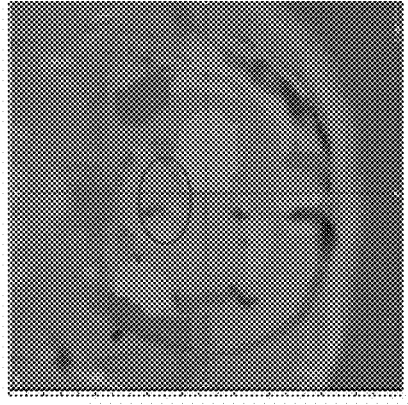
FIG. 44

TECHNIQUES FOR NEUROMODULATION

CROSS-REFERENCE TO RELATED APPLICATIONS

The present application is a National Stage Application of International Application No. PCT/US2017/059394, which was filed on Oct. 31, 2017, which claims the benefit of and priority to U.S. Provisional Application No. 62/415,212, filed on Oct. 31, 2016, the entirety of which are incorporated by reference herein for all purposes.

BACKGROUND

The subject matter disclosed herein relates to neuromodulation and more specifically, to techniques for modulating a physiological response using energy applied from an energy source.

Neuromodulation has been used to treat a variety of clinical conditions. For example, electrical stimulation at various locations along the spinal cord has been used to treat chronic back pain. Such treatment may be performed by an implantable device that periodically generates electrical energy that is applied to a tissue to activate certain nerve fibers, which in turn may result in a decreased sensation of pain. In the case of spinal cord stimulation, the stimulating electrodes are generally positioned in the epidural space, although the pulse generator may be positioned somewhat remotely from the electrodes, e.g., in the abdominal or gluteal region, but connected to the electrodes via conducting wires. In other implementations, deep brain stimulation may be used to stimulate particular areas of the brain to treat movement disorders, and the stimulation locations may be guided by neuroimaging. Such central nervous system stimulation is generally targeted to the local nerve or brain cell function and is mediated by electrodes that deliver electrical pulses and that are positioned at or near the target nerves. However, positioning electrodes at or near the target nerves is challenging. For example, such techniques may involve surgical placement of the electrodes that deliver the energy. In addition, specific tissue targeting via neuromodulation is challenging. Electrodes that are positioned at or near certain target nerves mediate neuromodulation by triggering an action potential in the nerve fibers, which in turn results in neurotransmitter release at a nerve synapse and synaptic communication with the next nerve. Such propagation may result in a relatively larger or more diffuse physiological effect than desired, as current implementation of implanted electrodes stimulate many nerves or axons at once. Because the neural pathways are complex and interconnected, a more targeted modulated effect may be more clinically useful.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible embodiments. Indeed, the disclosure may encompass a variety of forms that may be similar to or different from the embodiments set forth below.

In one embodiment, a system is provided that includes an energy application device configured to apply energy to a region of interest of a tissue in a subject, the tissue comprising a plurality of axon terminals of respective neurons, the axon terminals forming synapses (e.g., axoextracellular or other synapse types) between individual axon terminals and respective non-neuronal cells. The system also includes a controller configured to: spatially select the region of interest of the tissue, the region of interest containing a subset of the plurality of axon terminals and an associated subset of the synapses; focus the energy on the region of interest; and control application of the energy via the energy application device to the region of interest to induce preferential activation of the associated subset synapses to cause a targeted physiological outcome.

In another embodiment, a method is provided that includes the steps of directing an energy application device at an organ or a peripheral tissue; focusing energy on a region of interest in the organ or the peripheral tissue, the region of interest being a sub-region of the peripheral tissue or the organ containing a synapse between a neuronal cell and a non-neuronal cell; and applying pulsed power to the energy application device via a pulse generator to deliver the energy to and thereby modulate activity of at least one of the neuronal cell or the non-neuronal cell at the selected type of synapse to achieve a targeted physiological outcome.

In another embodiment, a method is provided that includes the steps of positioning an energy application device at a location at which the energy application device is capable of modulating a tissue; focusing the energy application device on a region of interest in the tissue; and applying one or more energy pulses within the region of interest to alter activity in a synapse between a neuron and a non-neuronal cell in response to the one or more energy pulses and relative to a baseline activity before applying the one or more energy pulses.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 37B shows the effect of ultrasound liver porta hepatis modulation on liver concentration of various molecules:

FIG. 37C shows the effect of ultrasound liver porta hepatis modulation on liver concentration of various molecules:

FIG. 43 shows DfMRI data from a stimulated LPS-treated animal;

FIG. 44 shows DfMRI data from a non-stimulated LPS sham animal;

DETAILED DESCRIPTION

Figure 1:
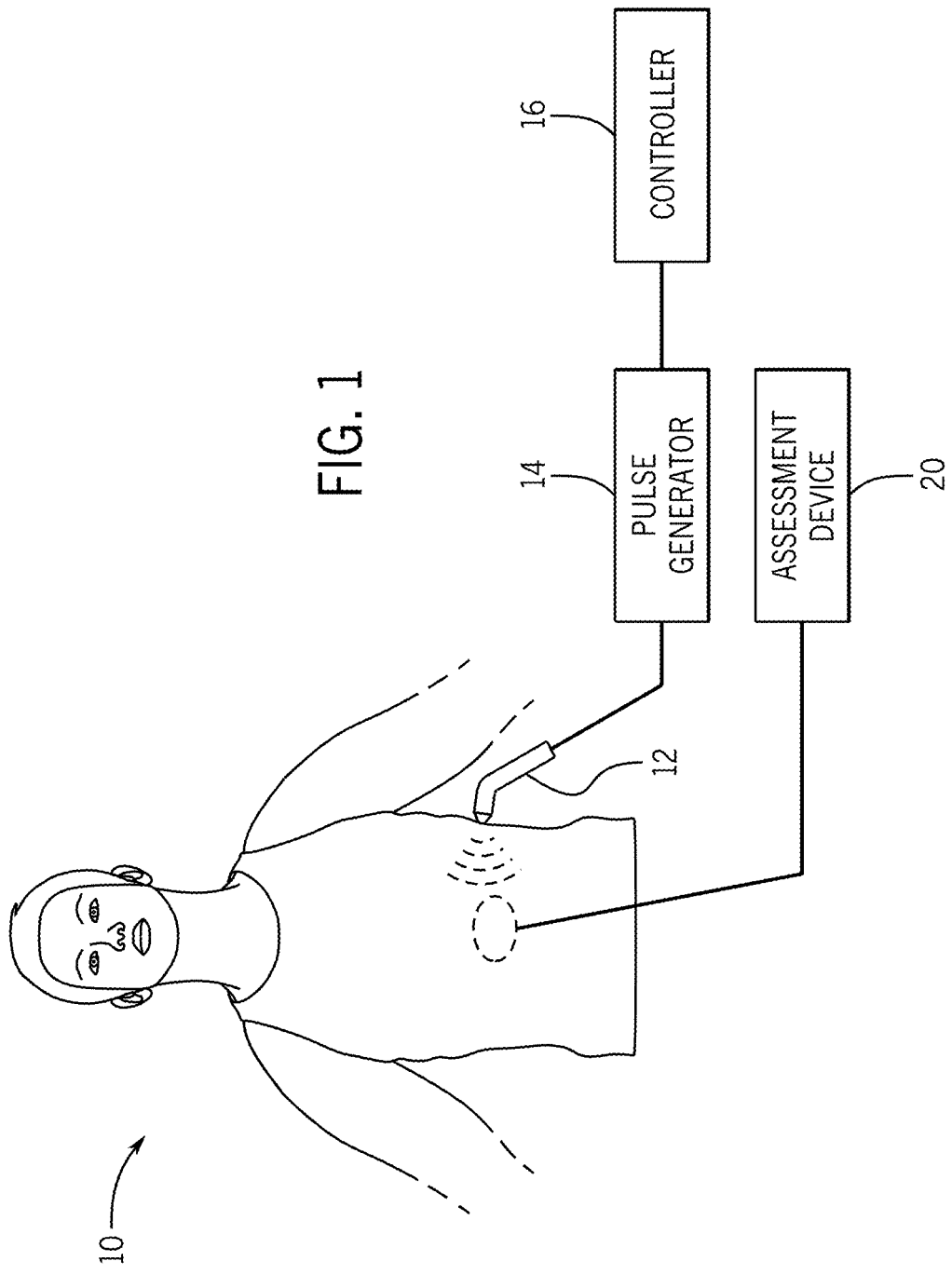
FIG. 1 is a schematic representation of a neuromodulation system using a pulse generator according to embodiments of the disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Any examples or illustrations given herein are not to be regarded in any way as restrictions on, limits to, or express definitions of, any term or terms with which they are utilized. Instead, these examples or illustrations are to be regarded as being described with respect to various particular embodiments and as illustrative only. Those of ordinary skill in the art will appreciate that any term or terms with which these examples or illustrations are utilized will encompass other embodiments that may or may not be given therewith or elsewhere in the specification and all such embodiments are intended to be included within the scope of that term or terms. Language designating such non-limiting examples and illustrations includes, but is not limited to: "for example," "for instance," "such as," "e.g.," "including," and "in one (an) embodiment."

The present techniques relate to modulation of synapses at axon terminals in a tissue via an application of energy by an energy source. For example, these may include axoextracellular synapses formed between presynaptic axon terminals and postsynaptic non-neuronal cells. In addition, while certain disclosed embodiments are discussed in the context of axoextracellular synapses, it should be understood that the axon terminals may form axosecretory, axosynaptic, axosomatic or axoextracellular synapses, and that additionally or alternatively, these synaptic types are contemplated as being selectively modulated, as provided herein. Further, certain axon terminals may terminate in interstitial or body fluid that may also experience neurotransmitter release as a result of the modulation. The disclosed synapses may be modulated to alter an activity in the synapses, e.g., a release of neurotransmitters from the presynaptic axon terminals. In turn, the altered activity may lead to local effects and/or non-local (e.g., systemic) effects. The present techniques permit energy to be focused in a targeted manner on a volume of tissue that includes certain axon terminals to preferentially directly activate the targeted axon terminals to achieve desired outcomes. In this manner, the targeted axon terminals within a region of interest are activated while, in certain embodiments, axon terminals in the same organ or tissue structure but that are outside of the region of interest are not activated. Because organs and tissue structures may include different types of axon terminals that form synapses with different types of postsynaptic non-neuronal cells, the region of interest may be selected that includes axon terminals that, when activated, yield the desired targeted physiological outcome. Accordingly, the modulation may target a specific type of axon terminal on the basis of the presynaptic neuron type, the postsynaptic cell type, or both.

For example, in one embodiment, the type of axon terminal may be a axon terminal forming an axoextracellular synapse with a resident (i.e., tissue-resident or non-circulating) immune cell. That is, the axoextracellular synapse is formed at a junction between a axon terminal and a non-neuronal cell or interstitial or body fluid. Accordingly, the application of energy leads to modulation of immune function in the region of interest. However, it should be understood that, based on the population of axon terminal types and the characteristics of the presynaptic neuron type and postsynaptic cells (e.g., immune cells, lymph cells, mucosal cells, muscle cells, etc.) of the axoextracellular synapse, different targeted physiological effects may be achieved. Accordingly, applying energy to a region of interest in a tissue of a subject may activate axon terminals and their associated axoextracellular synapse within the region of interest while untargeted axon terminals (and associated synapses) outside of the region of interest may be unaffected. However, because modulation may result in systemic effects, untargeted axon terminals outside of the region of interest may experience certain systemic changes as a result of the activation of the axon terminals within the region of interest. As provided herein, preferential activation or direct activation may refer to cells or structures that experience direct application of energy within a region of interest. That is, axon terminals, axoextracellular synapses, and/or post-synaptic non-neuronal cells or interstitial or body fluid that directly experience the applied energy as provided herein.

The human nervous system is a complex network of nerve cells, or neurons, found centrally in the brain and spinal cord and peripherally in the various nerves of the body. Neurons have a cell body, dendrites and an axon. A nerve is a group of neurons that serve a particular part of the body. Nerves may contain several hundred neurons to several hundred thousand neurons. Nerves often contain both afferent and efferent neurons. Afferent neurons carry signals to the central nervous system and efferent neurons carry signals to the periphery. A group of neuronal cell bodies in one location is known as a ganglion. Electrical signals generated in the nerves (e.g., via stimulation, which may be intrinsic or externally applied) are conducted via neurons and nerves. Neurons release neurotransmitters at synapses (connections) adjacent to a receiving cell to allow continuation and modulation of the electrical signals. In the periphery, synaptic transmission often occurs at ganglia.

The electrical signal of a neuron is known as an action potential. Action potentials are initiated when a voltage potential across the cell membrane exceeds a certain threshold. This action potential is then propagated down the length of the neuron. The action potential of a nerve is complex and represents the sum of action potentials of the individual neurons in it. The junction between the axon terminals of a neuron and the receiving cell is called a synapse. Action potentials travel down the axon of the neurons to its axon terminal, the distal termination of the branches of an axon nerve that forms a presynaptic ending or a synaptic knob of the nerve fiber. The electrical impulse of the action potential triggers migration of vesicles containing neurotransmitters to a presynaptic membrane of the presynaptic axon terminal and ultimately the release of the neurotransmitters into a synaptic cleft (e.g., the space formed between the presynaptic and the postsynaptic cell) or the axoextracellular space. A synapse that reaches a synaptic knob to convert the electrical signal of the action potential to a chemical signal of neurotransmitter release is a chemical synapse. Chemical synapses may be contrasted with electrical synapses in which the ionic currents flowing into a presynaptic axon terminal can cross the barrier of the two cell membranes and enter a postsynaptic cell.

The physiological effect of the action potential is mediated by ion movement across a cell membrane. Neurons actively maintain a resting membrane potential via ion pumps that facilitate movement of ions such as $Na^+$, $K^+$, and $Cl^-$ through the neuronal membrane. Different types of neurons may maintain different resting potentials, e.g., −75 mV to −55 mV. An action potential is generated by an influx of ions, i.e., a movement of charge to generate a large deviation in the membrane potential that is associated with a temporary rise in voltage across the membrane, e.g., a rise to a membrane potential in a range of 30-60 mV. The action potential in an individual neuron may be initiated in response to a neurotransmitter release from a presynaptic (e.g., upstream) neuron, which in turn results in receptor binding at the postsynaptic cell and a cascade of events which leads to an influx of ions and membrane depolarization that results in an action potential that is propagated through the nerve.

Synapses may be located at a junction between two neurons, which permits an action potential to be propagated down a nerve fiber. However, axon terminals may also form synapses at the junctions between neurons and non-neuronal cells or may terminate at interstitial fluid or body fluid. Examples of synapse types are synapses with immune cells at a neuroimmune junction, synapses with resident sensory cells within an organ, or synapses with gland cells. Release of neurotransmitters into a synaptic cleft and binding to receptors in a postsynaptic membrane of a postsynaptic cell results in downstream effects that are dependent on the nature of the presynaptic neuron and the specific neurotransmitters released as well as the nature of the postsynaptic cell, e.g., types of available receptors of the postsynaptic cell. In addition, an action potential may be excitatory or inhibitory. An excitatory postsynaptic action potential is a postsynaptic potential that makes the postsynaptic neuron more likely to fire or release a subsequent action potential while an inhibitory postsynaptic action potential is a postsynaptic potential that makes the postsynaptic neuron less likely to fire or release a subsequent action potential. Further, several neurons may work together to release neurotransmitters in concert that trigger downstream action potentials or inhibit downstream action potentials.

Neuromodulation is a technique in which energy from an external energy source is applied to certain areas of the nervous system to activate or increase the nerve or nerve function and/or block or decrease the nerve or nerve function. In certain neuromodulation techniques, one or more electrodes are applied at or near target nerves, and the application of energy is carried through the nerve (e.g., as an action potential) to cause a physiological response in areas of the downstream of the energy application site. However, because the nervous system is complex, it is difficult to predict the scope and eventual endpoint of the physiological response for a given energy application site.

While strategies for ultrasound modulation of the central nervous system (i.e. brain tissue) have demonstrated successful modulation of neural activity, attempts to modulate peripheral nerves have lagged. For example, ultrasound modulation of the central nervous system (CNS) involves stimulation of cortical regions of the brain, which are rich in synaptic structures while attempts at ultrasound stimulation of peripheral nerves have targeted nerve trunks that are less rich in or devoid of synaptic structures. In the present technique, modulation of peripheral nerves involves targeting one or more peripheral axon terminals. In addition, instead of targeting traditional neuron-neuron synapses in peripheral tissue, where stimulation results in nerve-generated action potential propagation, in present techniques, one or more energy pulses are applied to the subject's internal tissue comprising axon terminals that include axoextracellular synapses or neuronal junctions with other cell types, interstitial fluid, or body fluid, e.g., at neuroimmune synapses, where stimulation of axon terminals releases neurotransmitter/neuropeptide or induces altered neurotransmitter release in a vicinity of neighboring non-neuronal cells such as immune or other cells and modulates cell activity. Further, via such modulation, modulation of other tissue structures or organs may be achieved, without direct stimulation. In one embodiment, direct energy application to a relatively small region of an organ (e.g., a volume less than 25% of the total organ volume) may result in stimulation of action potentials in afferent projecting neurons that project into different areas of the brain (e.g., the hypothalamus). However, this result may be achieved without direct brain stimulation of synapse-rich regions. The direct brain stimulation may result in undesired activation of other pathways that may interfere with or swamp a desired physiological outcome. Accordingly, the present techniques permit granular activation of either brain activity or activity within an organ in a manner that is more targeted and more specific than direct brain stimulation or electrical peripheral nerve stimulation.

Benefits of the present techniques include local modulation at the region of interest of the tissue to achieve local and/or systemic effects. Further, the local modulation may involve direct activation of a relatively small region of tissue (e.g., less than 25% of a total tissue volume) to achieve these effects. In this manner, the total applied energy is relatively small to achieve a desired physiological outcome. In certain embodiments, the applied energy may be from a non-invasive extracorporeal energy source (e.g., ultrasound energy source). For example, a focused energy probe may apply energy through a subject's skin and is focused on a region of interest of an internal tissue. Such embodiments achieve the desired physiological outcome without invasive procedures or without side effects that may be associated with other types of procedures or therapy.

The local modulation of the disclosed techniques was demonstrated relative to other modulation techniques, such as electrical stimulation via electrodes. For example, stimulation of a nerve pathway that regulates systemic inflammation was shown without off-target stimulation of a pathway responsible for metabolic control (previous electrical stimulation experiments on peripheral nerve were unable to decouple these off-target effects). In addition, the present techniques were demonstrated to induce a variety of clinically useful physiological outcomes, both local and systemic.

Provided herein are techniques for neuromodulation in which energy from an energy source (e.g., an external or extracorporeal energy source) is applied to axon terminals in a manner such that neurotransmitter release at the site of focus of the energy application, e.g., the axon terminals, is triggered in response to the energy application and not in response to an action potential. That is, the application of energy directly to the axon terminals acts in lieu of an action potential to facilitate neurotransmitter release into a neuro-immune junction or other neuronal junction with a non-neuronal cell. The application of energy directly to the axon terminals further induces an altered neurotransmitter release from the axon terminal within the axoextracellular synapse into the vicinity of neighboring non-neuronal cells. In one embodiment, the energy source is an extracorporeal energy source, such as an ultrasound energy source or a mechanical vibrator. In this manner, non-invasive and targeted neuromodulation may be achieved directly at the site of energy focus rather than via modulation at an upstream site that in turn triggers an action potential to activate downstream targets.

The present techniques may be used in conjunction with lymph node neuromodulation or modulation of a lymphocyte retention neuro-immune reflex in addition to modulation of any neuroimmune interfaces (e.g., the junction or synapse between an axon terminal and an immune cell). In addition, direct modulation of immune cells themselves is also contemplated, e.g., immune cells that are not part of a junction with a neuron. While certain embodiments of the disclosure are presented in the context of neuroimmune modulation, it should be understood that the disclosed techniques may be used in conjunction with other target tissues and with other types of non-neuronal cells. As provided herein, non-neuronal cells may include immune cells, endothelial cells, secretory cells, etc.

In certain embodiments, the target tissues are internal tissues or organs that are difficult to access using electrical stimulation techniques. Other contemplated tissue targets include gastrointestinal tissue (stomach, intestines), muscle tissue (cardiac, smooth and skeletal), epithelial tissue (epidermal, organ/GI lining), connective tissue, glandular tissues (exocrine/endorcrine), etc. In one example, focused application of energy at a neuromuscular junction facilitates neurotransmitter release at the neuromuscular junction without an upstream action potential. Contemplated modulation targets may include portions of a spleen responsible for controlling TNF-alpha release from macrophages, a site in an adrenal gland for controlling dopamine release, or local sites within a mesenteric plexus controlling inflammation and macrophage function in gut. In addition, neuroimmune interfaces that may control antibody production or a functional state of lymphocytes may be modulated via ultrasound energy.

To that end, the disclosed neuromodulation techniques may be used in conjunction with a neuromodulation system. FIG. 1 is a schematic representation of a system 10 for neuromodulation to achieve neurotransmitter release and/or activate components within an axoextracellular synapse in response to an application of energy. The depicted system includes a pulse generator 14 coupled to an energy application device 12 (e.g., an ultrasound transducer). The energy application device 12 is configured to receive energy pulses, e.g., via leads or wireless connection, that in use are directed to a region of interest of an internal tissue or an organ of a subject, which in turn results in a targeted physiological outcome. In certain embodiments, the pulse generator 14 and/or the energy application device 12 may be implanted at a biocompatible site (e.g., the abdomen), and the lead or leads couple the energy application device 12 and the pulse generator 14 internally. For example, the energy application device 12 may be a MEMS transducer, such as a capacitive micromachined ultrasound transducer.

In certain embodiments, the energy application device 12 and/or the pulse generator 14 may communicate wirelessly, for example with a controller 16 that may in turn provide instructions to the pulse generator 14. In other embodiments, the pulse generator 14 may be an extracorporeal device, e.g., may operate to apply energy transdermally or in a noninvasive manner from a position outside of a subject's body, and may, in certain embodiments, be integrated within the controller 16. In embodiments in which the pulse generator 14 is extracorporeal, the energy application device 12 may be operated by a caregiver and positioned at a spot on or above a subject's skin such that the energy pulses are delivered transdermally to a desired internal tissue. Once positioned to apply energy pulses to the desired site, the system 10 may initiate neuromodulation to achieve targeted physiological outcome or clinical effects.

In certain embodiments, the system 10 may include an assessment device 20 that is coupled to the controller 16 and assesses characteristics that are indicative of whether the targeted physiological outcome of the modulation have been achieved. In one embodiment, the targeted physiological outcome may be local. For example, the modulation may result in local tissue or function changes, such as tissue structure changes, local increase in concentration of certain molecules, tissue displacement, increased fluid movement, etc. The modulation may result in systemic or non-local changes, and the targeted physiological outcome may be related to a change in concentration of circulating molecules or a change in a characteristic of a tissue that does not include the region of interest to which energy was directly applied. In one example, the displacement may be a proxy measurement for a successful modulation, and displacement measurements below an expected displacement value may result in modification of modulation parameters until expected displacement value is observed.

In embodiments in which the energy is applied to a neuroimmune junction, the modulation may also result in immune function changes, such as a change in a population of immune cells or a change in a presence or concentration of chemical compounds within a lymphatic tissue. Based on the assessment, the modulation parameters of the controller 16 may be altered. For example, if a successful modulation is associated with a decrease in norepinephrine or tumor necrosis factor concentration within a defined time window relative to the start of a procedure (e.g., 5 minutes, 30 minutes after the procedure starts), a change of the frequency or other parameters may be desired, which in turn may be provided by an operator to the controller 16 for defining or adjusting the energy pulses of the pulse generator 14.

The system 10 as provided herein may provide energy pulses according to various modulation parameters. For example, the modulation parameters may include various stimulation time patterns, ranging from continuous to intermittent. With intermittent stimulation, energy is delivered for a period of time at a certain frequency during a signal-on time. The signal-on time is followed by a period of time with no energy delivery, referred to as signal-off time. The modulation parameters may also include frequency and duration of a stimulation application. The application frequency may be continuous or delivered at various time periods, for example, within a day or week. The treatment duration may last for various time periods, including, but not limited to, from a few minutes to several hours. In certain embodiments, treatment duration with a specified stimulation pattern may last for one hour, repeated at, e.g., 72 hour intervals. In certain embodiments, treatment may be delivered at a higher frequency, say every three hours, for shorter durations, for example, 30 minutes. The treatment duration and frequency may be adjustably controlled to achieve a desired result.

Figure 2:
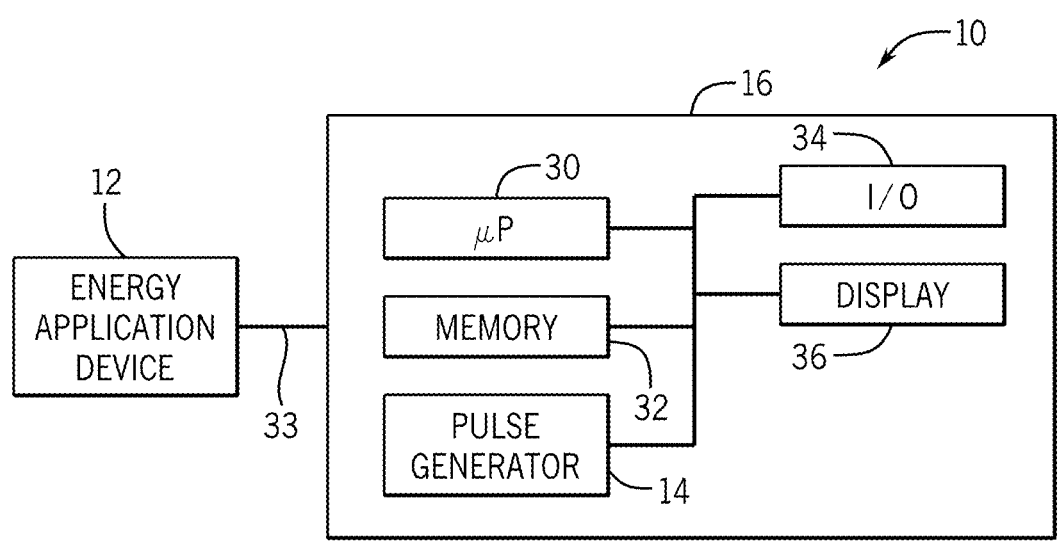
FIG. 2 is a block diagram of a neuromodulation system according to embodiments of the disclosure.

FIG. 2 is a block diagram of certain components of the system 10. As provided herein, the system 10 for neuromodulation may include a pulse generator 14 that is adapted to generate a plurality of energy pulses for application to a tissue of a subject. The pulse generator 14 may be separate or may be integrated into an external device, such as a controller 16. The controller 16 includes a processor 30 for controlling the device. Software code or instructions are stored in memory 32 of the controller 16 for execution by the processor 30 to control the various components of the device. The controller 16 and/or the pulse generator 14 may be connected to the energy application device 12 via one or more leads 33.

The controller 16 also includes a user interface with input/output circuitry 34 and a display 36 that are adapted to allow a clinician to provide selection inputs or modulation parameters to modulation programs. Each modulation program may include one or more sets of modulation parameters including pulse amplitude, pulse width, pulse frequency, etc. The pulse generator 14 modifies its internal parameters in response to the control signals from controller device 16 to vary the stimulation characteristics of energy pulses transmitted through lead 33 to the subject. Any suitable type of pulse generating circuitry may be employed including constant current, constant voltage, multiple-independent current or voltage sources, etc. The energy applied is a function of the current amplitude and pulse width duration.

In one embodiment, the memory 32 stores different operating modes that are selectable by the operator. For example, the stored operating modes may include instructions for executing a set of modulation parameters associated with a particular treatment site. Different sites may have different associated modulation parameters. Rather than having the operator manually input the modes, the controller 16 may be configured to execute the appropriate instruction based on the selection. In another embodiment, the memory 32 stores operating modes for different types of treatment. For example, activation may be associated with a different stimulating pressure or frequency range relative to those associated with depressing or blocking tissue function. In a specific example, when the energy application device is an ultrasound transducer, the time-averaged power and peak positive pressure are in the range of 1 mW/cm$^2$-30,000 mW/cm$^2$ and 0.1 MPa to 7 MPa. In another specific example, when the energy application device is a mechanical actuator, the amplitude of vibration is in the range of 0.1 to 10 mm. The selected frequencies may depend on the mode of energy application, e.g., ultrasound or mechanical actuator.

In another embodiment, the memory 32 stores a calibration or setting mode that permits adjustment or modification of the modulation parameters to achieve a desired result. In one example, the stimulation starts at a lower energy parameter and increases incrementally, either automatically or upon receipt of an operator input. In this manner, the operator may observe the effects as the modulation parameters are being changed.

The system may also include an imaging device that facilitates focusing the energy application device 12. In one embodiment, the imaging device may be integrated with or the same device as the energy application device 12 such that different ultrasound parameters (frequency, aperture, or energy) are applied for targeting and subsequently neuromodulation.

In another embodiment, the memory 32 stores a targeting or focusing mode that is used to spatially select the region of interest within an organ or tissue structure. For example, the energy application device 12 may be configured to first operate in the targeting mode to apply energy that is used to capture image data that is used to identify the region of interest. The targeting mode energy is not at levels and/or applied with modulation parameters suitable for preferential activation. However, once the region of interest is identified, the controller 16 may then operate in a treatment mode according to the modulation parameters associated with preferential activation.

The controller 16 may also be configured to receive inputs related to the targeted physiological outcomes as an input to the selection of the modulation parameters. For example, when an imaging modality is used to assess a tissue characteristic, the controller 16 may be configured to receive a calculated index or parameter of the characteristic. Based on whether the index or parameter is above or below a threshold, the modulation parameters may be modified. In one embodiment, the parameter can be a measure of tissue displacement of the affected tissue or a measure of depth of the affected tissue. Further, the energy application device 12 (e.g., an ultrasound transducer) may operate under control of the controller 16 to a) acquire image data to spatially select a region of interest within the target tissue b) apply the modulating energy to the region of interest and c) acquire image to determine that the targeted physiological outcome has occurred (e.g., via displacement measurement). In such an embodiment, the imaging device, the assessment device 20 and the energy application device 12 may be the same device.

In another implementation, a successful modulation parameter set may also be stored by the controller 16. In this manner, subject-specific parameters may be determined. Further, the effectiveness of such parameters may be assessed over time. If a particular set of parameters is less effective over time, the subject may be developing insensitivity to activated pathways. If the system 10 includes an assessment device 20, the assessment device may provide feedback to the controller 16. In certain embodiments, the feedback may be received from a user or an assessment device 20 indicative of a characteristic of the target physiological outcome. The controller 16 may be configured to cause the energy application device to apply the energy according to modulation parameters and to dynamically change the modulation parameters based on the feedback. For example, based on the feedback, the processor 16 may automatically alter the modulation parameters (e.g., the frequency, amplitude, or pulse width of an ultrasound beam or mechanical vibration).

Figure 3:
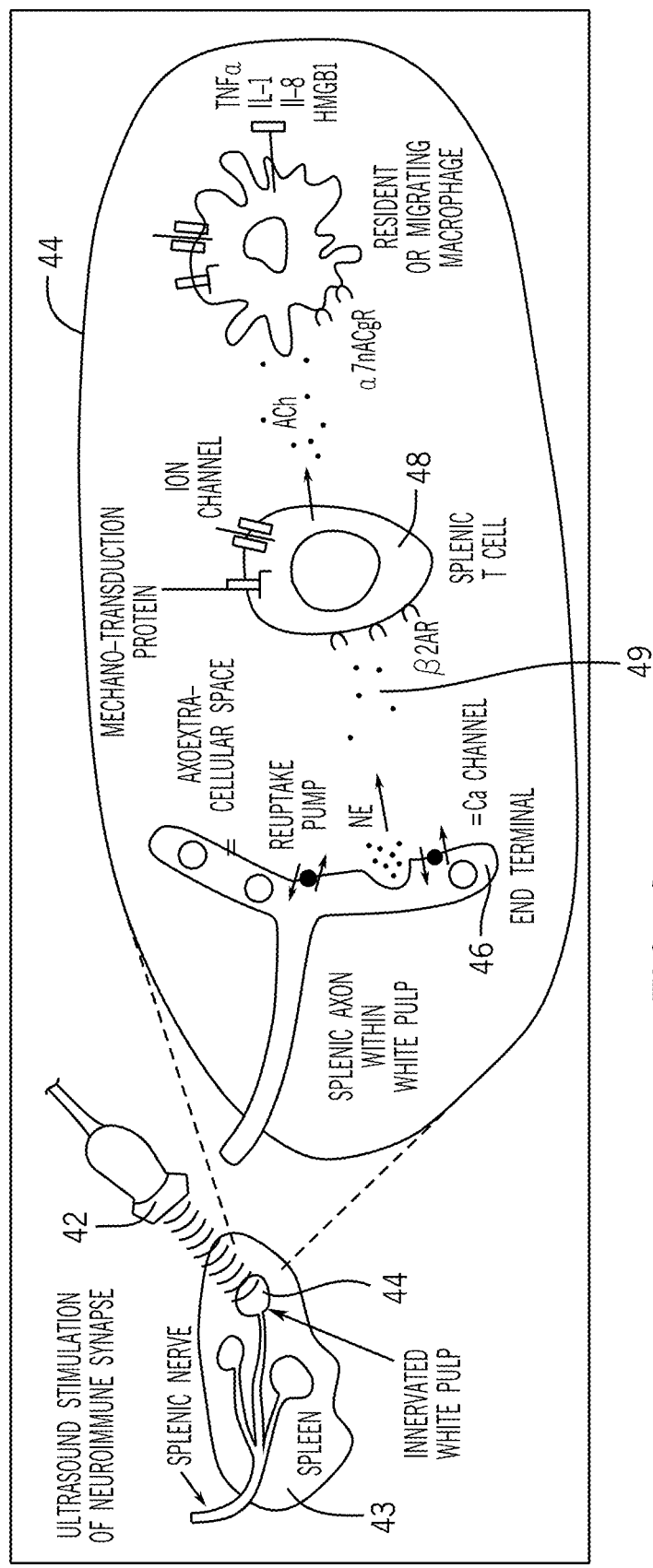
FIG. 3 is a schematic representation of an ultrasound energy application device in operation according to embodiments of the disclosure.

FIG. 3 is a specific example in which the energy application device 12 includes an ultrasound transducer 42 that is capable of applying energy to a target tissue, shown by way of example as a spleen. The energy application device 12 may include control circuitry for controlling the ultrasound transducer 42. The ultrasound transducer 42 may also be configured to acquire image data to assist with focusing the applied energy on a desired target location.

The desired target tissue 43 may be an internal tissue or an organ that includes synapses of axon terminals 46 and non-neuronal cells 48 that may be stimulated by direct application of energy to the axon terminals within a field of focus of the ultrasound transducer 42 focused on a region of interest 44 of the target tissue 43 to release into the synaptic space 49. In the depicted embodiment, the axon terminal 46 forms a synapse with an immune cell, and the release of neurotransmitters in turn causes downstream effects such as activation of macrophages or other resident or migrating immune cells. The region of interest may be selected to include a certain type of axon terminal 46 (e.g., a splenic axon within white pulp as depicted), such as a axon terminal 46 of a particular neuron type and/or one that forms a synapse with a certain type of non-neuronal cell 48 (e.g., a splenic T cell as depicted). Accordingly, the region of interest 44 may be selected to correspond to a portion of the target tissue 43 with the desired axon terminals 46 (and associated non-neuronal cells 48). The energy application may be selected to preferentially elicit a release of neuron transmitter from the nerve within the synapse or directly activate the non-neuronal cell itself through direct energy transduction (i.e. mechanotransduction or voltage-activated proteins within the non-neuronal cells), or cause an activation within both the neural and non-neuronal cells that elicits a desired physiological effect. In the depicted example, the region of interest includes innervated red and/or white pulp tissue extending from the splenic nerve. As provided herein, splenic stimulation or modulation may refer to a modulation of the region of interest 44 including innervated white pulp tissue.

The energy may be focused or substantially concentrated on a region of interest 44 and to only part of the internal tissue 43, e.g., less than about 50%, 25%, 10%, or 5% of the total volume of the tissue 43. In one embodiment, energy may be applied to two or more regions of interest 44 in the target tissue 43, and the total volume of the regions of interest 44 may be less than about 90%, 50%, 25%, 10%, or 5% of the total volume of the tissue 43. In one embodiment, the energy is applied to only about 1%-50% of the total volume of the tissue 43, to only about 1%-25% of the total volume of the tissue 43, to only about 1%-10% of the total volume of the tissue 43, or to only about 10-5% of the total volume of the tissue 43. In certain embodiments, only axon terminals 46 in the region of interest 44 of the target tissue 43 would directly receive the energy and release neurotransmitters while the unstimulated axon terminals outside of the region of interest 44 do not receive substantial energy and, therefore, are not activated/stimulated in the same manner. In some embodiments, axon terminals 46 in the portions of the tissue directly receiving the energy would induce an altered neurotransmitter release. In this manner, tissue compartments may be targeted for neuromodulation in a granular manner. In some embodiments, the energy application parameters may be chosen to induce preferential activation of either neural or non-neuronal components within the tissue directly receiving energy to induce a desired combined physiological effect. In certain embodiments, the energy may be focused or concentrated within a volume of less than about 25 mm$^3$. In certain embodiments, the energy may be focused or concentrated within a volume of about 0.5 mm$^3$-50 mm$^3$. A focal volume and a focal depth for focusing or concentrating the energy within the region of interest 44 may be influenced by the size/configuration of the energy application device 12. The focal volume of the energy application may be defined by the field of focus of the energy application device 12.

Figure 4:
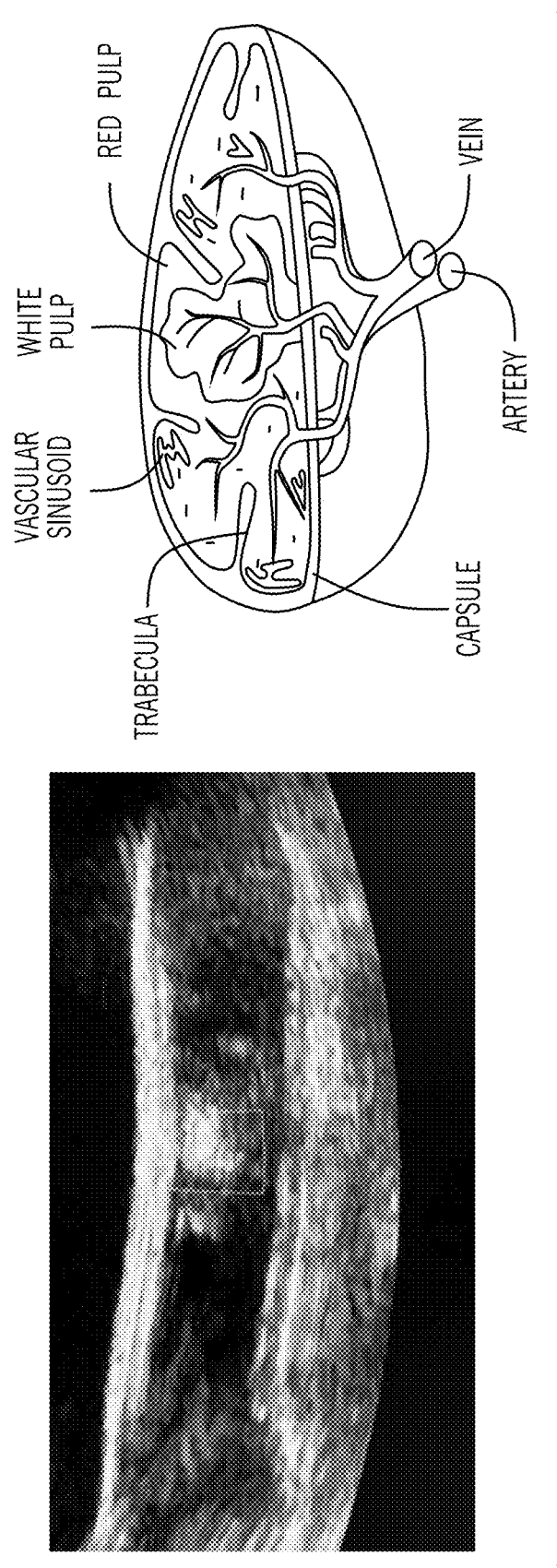
FIG. 4 is an ultrasound visualization of the spleen that may be used as spatial information to focus on a region of interest in a spleen according to embodiments of the disclosure.

As provided herein, the energy may be substantially applied only to the region or regions of interest 42 to preferentially activate the synapse in a targeted manner to achieve targeted physiological outcomes and is not substantially applied in a general or a nonspecific manner across the entire tissue 43. Accordingly, only a subset of the plurality of different types of axon terminals 46 in the tissue 43 is exposed to the direct energy application. FIG. 4 is an image of blood flow (Doppler ultrasound) within a spleen that may serve as spatial information for selecting the region of interest of the spleen. For example, the regions of interest within organs containing either blood vessels, nerves, or other anatomical landmarks may be selected and used to identify areas with specific axon terminals and synapses. In one embodiment, the region of interest is selected by identifying a splenic artery and spatially selecting an area close to or parallel to the splenic artery. Organ architectures is typically segmented based on sub-organ tissue function, blood vessel, and neural innervation, and subsets of axon terminals may be selected to be included in a region of interest to which energy is directly applied. Other axon terminals are outside of the region of interest and are not exposed to the direct applied energy. The individual axon terminal or terminals to include in the region of interest may be based on historical or experimental data (e.g., based on an association of a particular location with a desired targeted physiological outcome). In another embodiment, the location of the axon terminals and their adjacent tissue or structures may be used to select an individual axon terminals from the total set of axon terminals for preferential activation. Alternatively or additionally, the system 10 may apply energy to individual axon terminals until the desired targeted physiological effect is achieved. It should be understood that the spleen image is by way of example only. The disclosed selection of axon terminals for preferential activation via a direct energy application to the region of interest using spatial information of visualized nerves may be used in conjunction with other organs or structures (e.g., liver, lymph nodes).

The disclosed techniques may be used in assessment of neuromodulation effects, which in turn may be used as an input or a feedback for selecting or modifying neuromodulation parameters. The disclosed techniques may use direct assessments of tissue condition or function as the targeted physiological outcomes. The assessment may occur before (i.e., baseline assessment), during, and/or after the neuromodulation. For example, for a subject in need of increase lymphatic drainage, such drainage may be monitored before, during and/or after neuromodulation to determine if the selected parameters have achieved a sufficient increase in the drainage. Accordingly, lymphatic drainage may be assessed by one or more in vivo techniques that determine lymphatic drainage. In one embodiment, an exogenous contrast agent is administered either directly into the lymphatic tissue or indirectly via intradermal injection. For example, a gadolinium-based contrast media may be used. Either local or systemic flow may be addressed, depending on the desired clinical outcome. For example, MR lymphangiography may be used to assess lymphatic drainage in the limbs. In another embodiment, fluorescence microlymphangiography (FML) may also be used to assess lymphatic drainage. FML employs the intradermal administration of a fluorescent dye, FITC conjugated to dextran (FITC-dextran), and video fluorescence microscopy techniques to acquire high-resolution images. In yet another embodiment, imaging may include dyes or indicators that target lymph-specific markers, such as LYVE-1, Prox-1, podoplanin, and VEGFR3.

The assessment techniques may include at least one of functional magnetic resonance imaging, diffusion tensor magnetic resonance imaging, positive emission tomography, or acoustic monitoring, thermal monitoring. The assessment techniques may also include protein and/or marker concentration assessment.

The images from the assessment techniques may be received by the system for automatic or manual assessment. Based on the image data, the modulation parameters may also be modified. For example, if the lymphatic drainage has increased in a presence of stable vital signs and other health indicators, the stimulation may be stepped back to the lowest energy that maintains the desired elevated lymphatic drainage. In other embodiments, the change in lymphatic drainage may be utilized as a marker of local neurotransmitter concentration, and used as a surrogate marker for exposure of local immune (immune interacting) cells to phenotype modulating neurotransmitters, and effectively as a marker of predicted effect on immune function. The local concentration may refer to a concentration within a field of focus of the energy application.

Additionally or alternatively, the system may assess the presence or concentration of neurotransmitters or cells in the lymph tissue or lymphatic fluid or in the blood. Lymphatic fluid or tissue may be acquired by a fine needle aspirate, and the assessment of the presence or levels of neurotransmitters (e.g., peptide transmitters, catecholamines) may be performed by any suitable technique known to one of ordinary skilled in the art.

In another embodiment, a change in the types and/or numbers of cells in the lymph node or lymphatic tissue may be an indication of lymphatic tissue function. The cell population may be assessed by ex vivo techniques, such as flow cytometry. In another embodiment, the lymphatic cell population may be assessed by laser-scanning in vivo confocal microscopy (IVCM) using endogenous contrast.

In other embodiments, the targeted physiological outcomes may include, but are not limited to, tissue displacement, tissue size changes, a change in concentration of one or more molecules (either local, non-local, or circulating), a change in gene or marker expression, afferent activity, and cell migration, etc.

Figure 5:
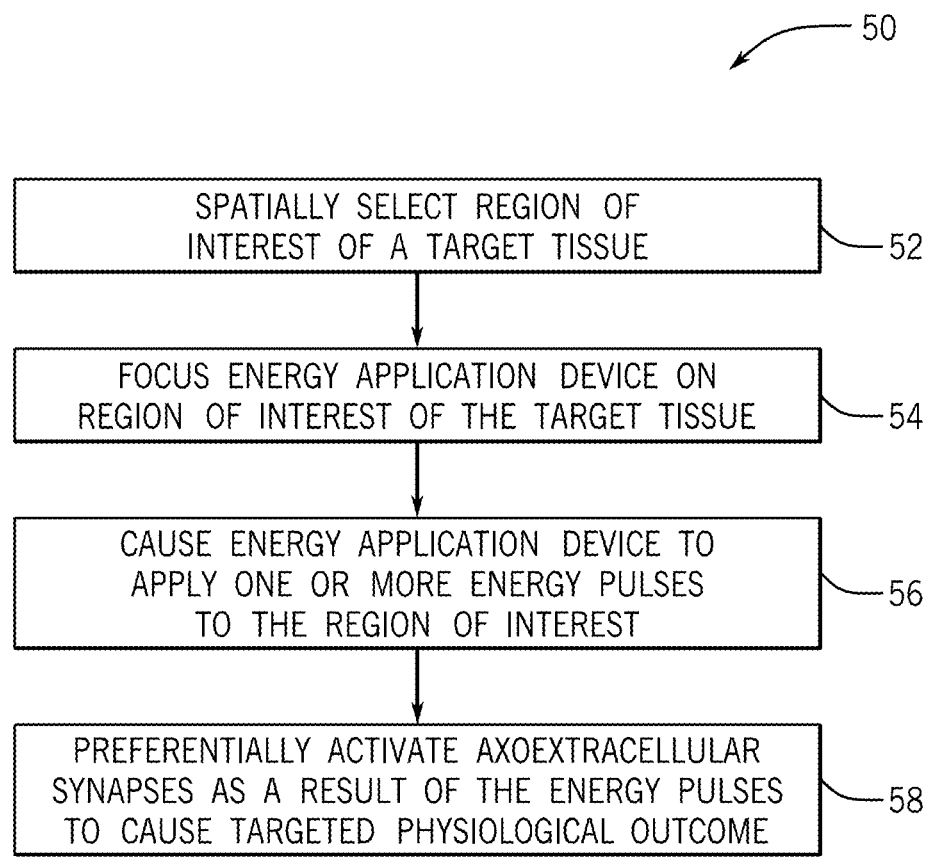
FIG. 5 is a flow diagram of a neuromodulation technique according to embodiments of the disclosure.

FIG. 5 is a flow diagram of a method 50 for stimulating a region of interest of a target tissue. In the method, the energy application device is positioned such that the energy pulses are focused at the desired region of interest at step 54, and the pulse generator applies a plurality of energy pulses to the target tissue at step 56 to activate a subset of synapses in the target tissue, e.g., to stimulate the axon terminal to release neurotransmitters and/or induce altered neurotransmitter release and/or induce altered activity in the non-neuronal cell (within the synapse) to cause a targeted physiological outcome at step 58. In certain embodiments, the method may include a step of assessing the effect of the stimulation. For example, one or more direct or indirect assessments of a state of tissue function or condition may be used. Based on the tissue function as assessed, the modulation parameters of the one or more energy pulses may be modified (e.g., dynamically or adjustably controlled) to achieve the targeted physiological outcome.

In one embodiment, assessments may be performed before and after modulation to assess a change in lymphatic function as a result of the modulation. If a desired change in the state of the assessed characteristic of lymphatic function is above or below a threshold, appropriate modification in the modulation parameters may be made. For example, if the change in the characteristic relative to the threshold is associated with successful activation of the lymph tissue, the energy applied during neuromodulation may be stepped back to a minimum level that supports the desired outcome. If the change in the characteristic relative to the threshold is associated with insufficient activation of the lymph tissue, certain modulation parameters, including, but not limited to, the modulation amplitude or frequency, the pulse shape, the stimulation pattern, and/or the stimulation location may be changed. It should also be understood that certain desired clinical outcomes may be instead associated with blocking activation. In such embodiments, an assessment of decreased neural and/or lymphatic function is associated with maintaining the modulation parameters, and the modulation parameters may be modified if an undesired level of lymphatic activity persists.

Further, the assessed characteristic or condition may be a value or an index, for example, a flow rate, a concentration, a cell population, or any combination thereof, which in turn may be analyzed by a suitable technique. For example, a relative change exceeding a threshold may be used to determine if the modulation parameters are modified. The successful modulation may be assessed via a measured clinical outcome, such as a presence or absence of an increase in tissue structure size (e.g., lymph node size) or a change in concentration of released molecules (e.g., relative to the baseline concentration before the neuromodulation). In one embodiment, a successful modulation may involve an increase in concentration above a threshold, e.g., above a about 50%, 100%, 200%, 400%, 1000% increase in concentration relative to baseline. For blocking treatments, the assessment may involve tracking a decrease in concentration of a molecule over time, e.g., at least a 10%, 20%, 30%, 50%, or 75% decrease in the molecule of interest. Further, for certain subjects, the successful blocking treatment may involve keeping a relatively steady concentration of a particular molecule in the context of other clinical events that may tend to increase the concentration of the molecule. That is, successful blocking may block a potential increase. The increase or decrease or other observable effect may be measured within a certain time window from the start of a treatment, e.g., within about 5 minutes, within about 30 minutes. In certain embodiments, if the neuromodulation is determined to be successful, the change in the neuromodulation is an instruction to stop applying energy pulses. In another embodiment, one or more parameters of the neuromodulation are changed if the neuromodulation is not successful. For example, the change in modulation parameters may be an increase in pulse repetition frequency, such as a stepwise increase in frequency of 10-100 Hz and assessment of the desired characteristic until a successful neuromodulation is achieved. In another implementation, a pulse width may be changed. In other embodiments, two or more of the parameters may be changed together. If the neuromodulation is not successful after multiple parameter changes, the focus of energy application may be changed.

Figure 6:
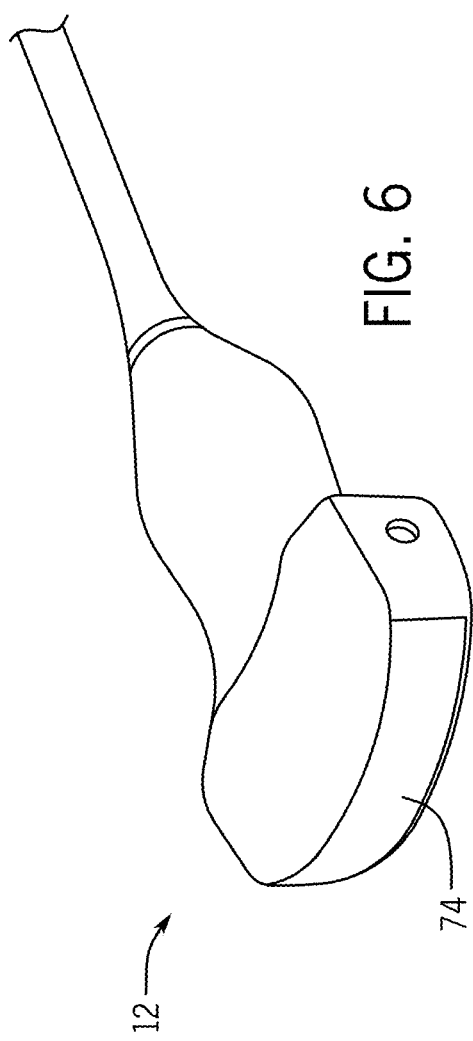
FIG. 6 is a schematic illustration of the energy application device configured as an extracorporeal device and including an ultrasound transducer.

The energy application device 12 may be configured as an extracorporeal non-invasive device or an internal device, e.g., a minimally invasive device. As noted, the energy application device 12 may be an extracorporeal noninvasive ultrasound transducer or mechanical actuatot. For example, FIG. 6 shows an embodiment of the energy application device configured as a handheld ultrasound probe including an ultrasound transducer 74. However, it should be understood that other noninvasive implementations are also contemplated, including other methods to configure, adhere, or place ultrasound transducer probes over an anatomical target. Further, in addition to handheld configurations, the energy application device 12 may include steering mechanisms responsive to instructions from the controller 16. The steering mechanisms may orient or direct the energy application device 12 towards the target tissue 43 (or structure), and the controller 16 may then focus the energy application onto the region of interest 44.

EXAMPLES

1. Experimental Methods

Figure 7:
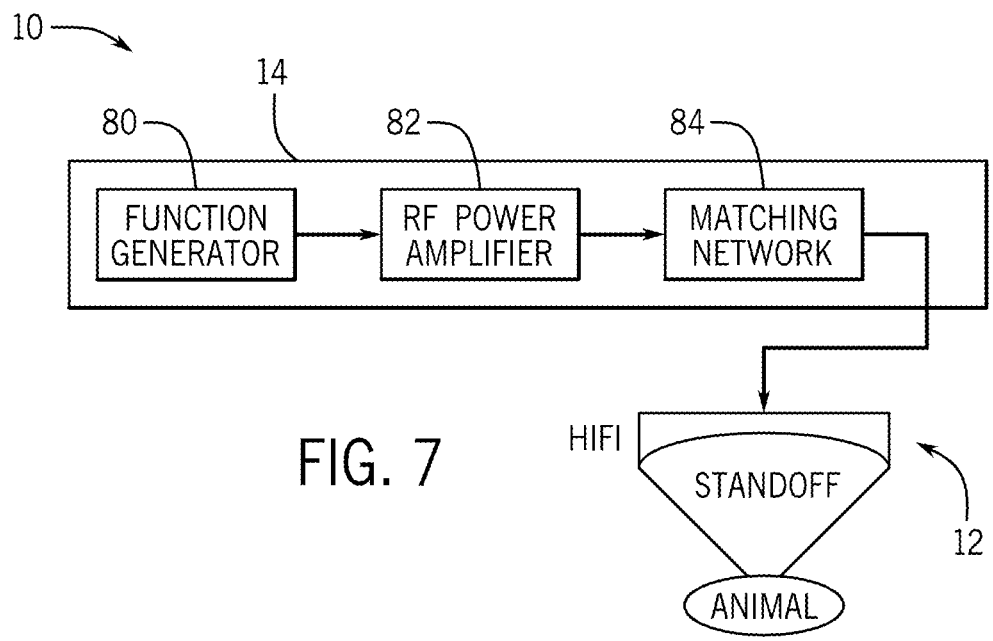
FIG. 7 is a schematic illustration of the energy application device and the pulse generator configured to apply high-intensity focused ultrasound.
Figure 8:
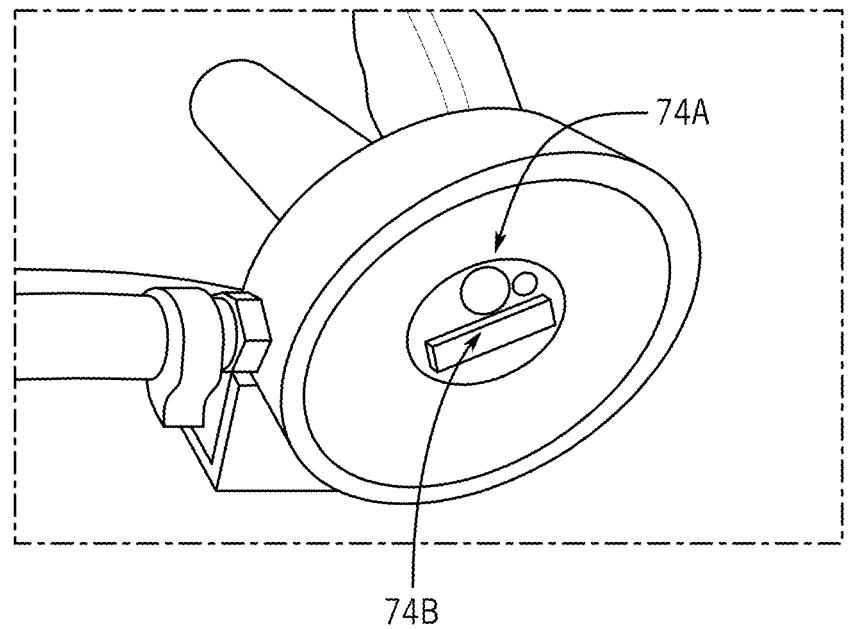
FIG. 8 is an example of an energy application device that may be used in conjunction with the system of FIG. 7.

FIG. 7 is a block diagram of the system 10 including the energy application device 12 and the pulse generator 14 configured to apply High-Intensity Focused Ultrasound (HIFU). In one embodiment, the system 10 includes, for example, a pulse generator including a function generator 80, a power amplifier 82, and a matching network 84. In one embodiment used to generate experimental results as provided herein, the pulse generator included a 1.1 MHz, high intensity focused ultrasound (HIFU) transducer (Sonic Concepts H106), a matching network (Sonic Concepts), an RF power amplifier (ENI 350L) and a function generator (Agilent 33120A). The HIFU transducer 12 was coupled to the animal subject through a 6 cm tall plastic cone filled with degassed water. FIG. 8 is an example of an energy application device that may be used in conjunction with the system 10 of FIG. 7 including a HIFU transducer 74A and an imaging ultrasound transducer 74B arranged in a single energy application device 12 that may be controlled, e.g., by the controller 16, to apply energy and to image the target tissue as provided herein.

Figure 9:
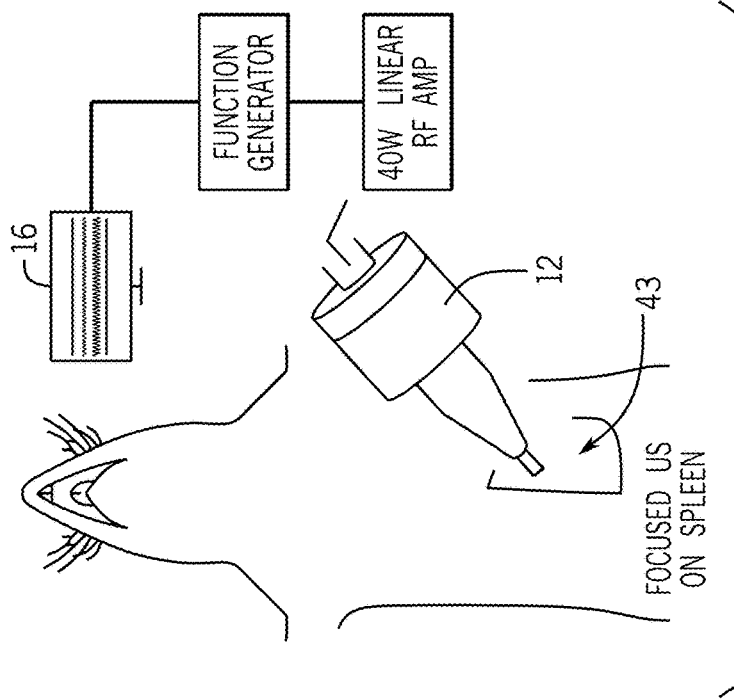
FIG. 9 is a schematic illustration of the experimental setup for ultrasound energy application to achieve target physiological outcomes.

FIG. 9 shows an experimental setup used to perform certain splenic modulation experiments as provided herein. While the depicted embodiment shows a splenic target tissue 43, it should be understood that certain elements of the experimental setup may be common between different target tissues 43. For example, the energy application device 12 may operate according to parameters set by the controller 16 to apply energy to a region of interest in the target tissue 43.

Figure 10:
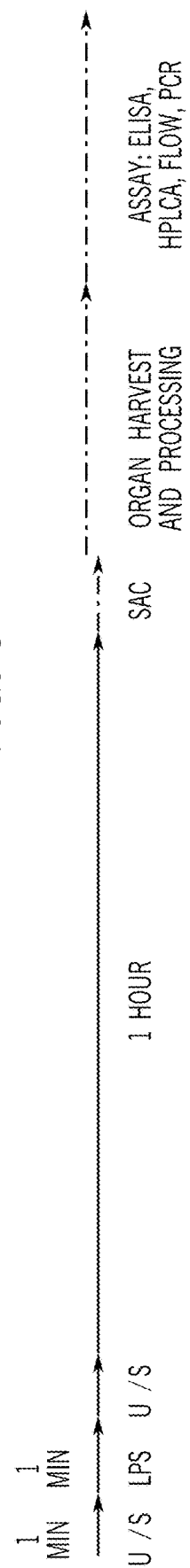
FIG. 10 is an experimental timeline of ultrasound energy application.

FIG. 10 shows an experimental timeline for ultrasound energy application used to perform certain modulation experiments as provided herein. In the depicted embodiment, the ultrasound application is performed for 1 minute before and after lipopolysaccharide injection. Lipopolysaccharides (LPS) are bacterial membrane molecules that elicit a strong immune or inflammatory response. Accordingly, LPS-treated animals may serve as models for diseases or conditions in which the immune response is active. In the experimental timeline, organ harvesting and measurement of various targeted physiological outcomes may occur after a period of time has elapsed after treatment.

Figure 11:
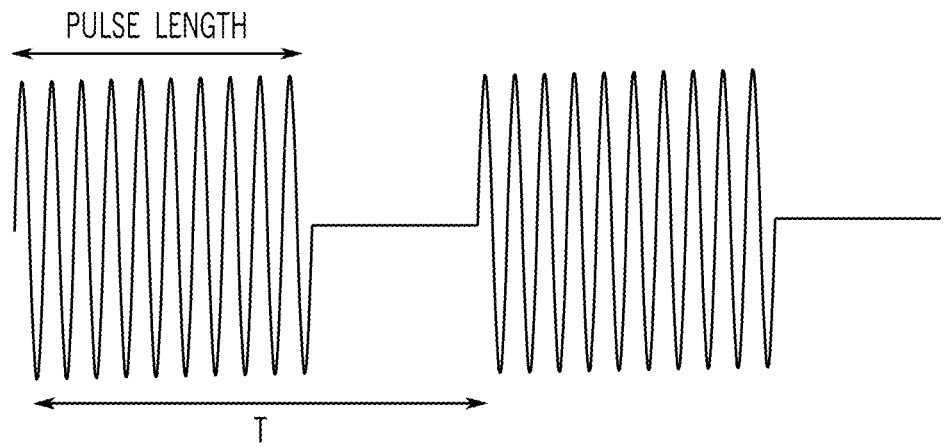
FIG. 11 shows pulse characteristics of the applied ultrasound energy pulses.

The function generator 80 generates a pulsed sinusoidal waveform, which is shown in FIG. 11. This pulsed sinusoidal waveform is amplified by the RF power amplifier and sent to the matching network of the HIFU transducer. Three ultrasound parameters can be adjusted during the animal experiment: pulse amplitude, pulse length and pulse repetition frequency. The pulse amplitude has a range of 0.5V-peak to 62V-peak. Three pulse lengths are used: 18.2 us, 136.4 us, and 363.6 us. The pulse repetition frequency (1/T) is 2 kHz. The treatment time is 1 minute. Table 1 summarizes the HIFU ultrasound parameters. The ultrasound modulation parameters are by way of example. In one embodiment, modulation is provided with an ultrasound stimulus having an ultrasound transducer frequency in a range of about 0.1 MHz to about 5 MHz and the ultrasound stimulus has an ultrasound frequency pulse repetition frequency in a range of about 0.1 Hz to about 10 kHz. The ultrasound cycles per pulse of the ultrasound energy may be in a range of about 1 to about 1000.

| Transducer Frequency (MHz) | Pulse Amplitude (V-peak) | Pulse Length (us) | Repetition Frequency (Hz) | Peak Pressure (MPa) |
|---|---|---|---|---|
| 1.1 | 62 | 136.4 | 2000 | 1.72 |
| 1.1 | 46.5 | 136.4 | 2000 | 1.27 |
| 1.1 | 31 | 136.4 | 2000 | 0.83 |
| 1.1 | 15.5 | 136.4 | 2000 | 0.41 |
| 1.1 | 9.6 | 136.4 | 2000 | 0.25 |
| 1.1 | 7.75 | 136.4 | 2000 | 0.20 |
| 1.1 | 5 | 136.4 | 2000 | 0.13 |
| 1.1 | 0.5 | 136.4 | 2000 | 0.01 |
| 1.1 | 31 | 18.2 | 2000 | 0.83 |
| 1.1 | 31 | 363.6 | 2000 | 0.83 |

Figure 12:
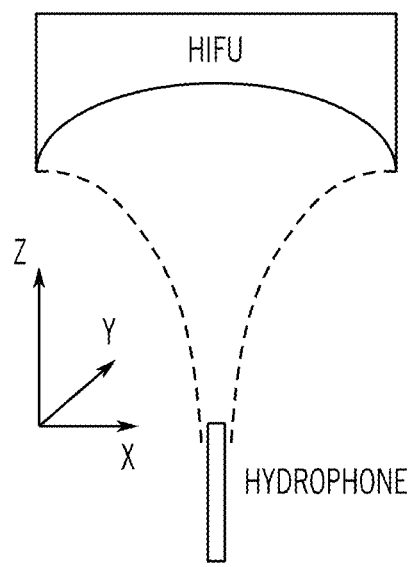
FIG. 12 shows a hydrophone measurement setup.
Figure 13:
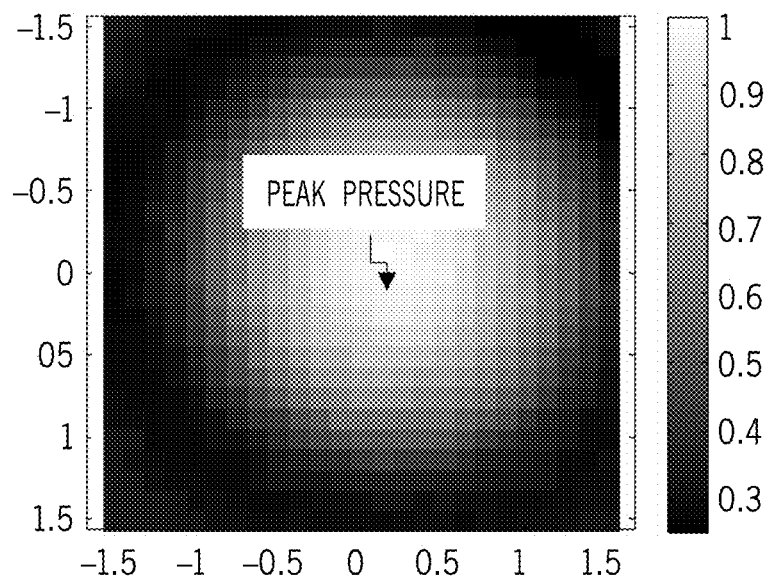
FIG. 13 shows an example of an ultrasound pressure field in x-y plane.

Pressure measurements were performed in degassed water using a HIFU hydrophone (HNA-0400) manufactured by Onda Corp. The HIFU transducer was driven by a 100-cycle sinusoidal waveform. The hydrophone was scanned through the focal spot with a grid size of 0.1 mm in the x-y plane and a step size of 0.2 mm along the z axis. FIG. 12 shows the hydrophone setup and FIG. 13 shows the scan result. The peak positive (negative) pressure is defined as the maximum positive (negative) pressure at the transducer focus in x-y plane. The input voltages were low enough to eliminate nonlinearity effects. Therefore, the value of the peak positive pressure was identical to the value of the peak negative pressure. In order to estimate the peak pressure at the full operating voltage, peak pressures were measured at several different driving voltages before cavitation occurs and performed curve fitting. The calculated peak pressures are shown in Table 1.

Ultrasound Targeting for Organ Specific Neuromodulation

A GE Vivid E9 ultrasound system and an 11L probe were used for the ultrasound scan before neuromodulation started. The region of interest was labeled on animal skin. The HIFU transducer was positioned on the labeled area. Another ultrasound scan was also performed using a smaller imaging probe (3S), which was placed in the opening of the HIFU transducer. The imaging beam of the 3S probe was aligned with HIFU beam. Therefore, one could confirm that the HIFU beam was targeted at the region of interest using an image of the targeted organ (visualized on the ultrasound scanner).

Animal Protocols

Adult male Sprague-Dawley rats 8 to 12 weeks old (250-300 g: Charles River Laboratories) were housed at 25° C. on a 12-h light/dark cycle and acclimatized for 1 week before experiments were conducted. Water and regular rodent chow were available ad libitum.

Endotoxin (LPS from *Escherichia coli*, 0111: B4; Sigma-Aldrich) was used to produce a significant state of inflammation and metabolic dysfunction (e.g. hyperglycemia and hyperinsulemia) in naïve adult-Sprague Dawley rats. LPS was administered to animals (10 mg/kg; Rosa-Ballinas PNAS, 2008) via intraperitoneal (IP) injection causing significant elevation in TNF, circulating glucose and insulin concentration which peaks 4-hours, but remains elevated as compared to control for up to 8 hours' post injection. Spleen, liver, hypothalamic, hippocampal and blood samples were harvested after 60 minutes (for power studies) and at 30, 60, 120, 240 or 480 minutes (for duration and kinetic studies) following LPS administration. Spleen and liver samples were homogenized in a solution of PBS, containing phosphatase (0.2 mM phenylmethylsulfonyl fluoride, 5 ug/mL of aprotinin, 1 mM benzamidine, 1 mM sodium orthovandate and 2 uM cantharidin) and protease (1 uL to 20 mg of tissue as per Roche Diagnostics) inhibitors. A targeted final concentration of 0.2 g tissue per mL PBS solution was applied in all samples. Blood samples were stored with the anticoagulant (disodium) EDTA to prevent coagulation of samples. Samples were analyzed by ELISA assay for changes in cytokine (Bio-Plex Pro; Bio-Rad), TNF (Lifespan) and acetylcholine (Lifespan) concentration. Catecholamine concentrations were assessed using HPLC detection or ELISA (Rocky Mountain Diagnostic) analysis.

The effects of LPS on blood glucose and insulin levels were examined. Blood samples were obtained from the tail vein at 0, 60, 90, 120, 150, 180, and 240 min after LPS injection to measure glucose and insulin levels. Circulating blood glucose concentrations were measured by a OneTouch Elite glucometer (LifeScan; Johnson & Johnson). Insulin concentrations in plasma, obtained from blood, were determined using an ELISA kit (Crystal Chem, Chicago, IL) to determine the impact of LPS and subsequent U/S stimuli on systemic insulin resistance. Signal Transduction changes were measured by assessment of key biomarkers including: IRS-1/2, PI3K, Akt, GLUT2, GLUT4, GLUTamate, GABA and AMPK in liver, muscle, cardiac and hypothalamic tissue samples.

The protocol used for ultrasound neuromodulation is as follows:

Animals will be anesthetized with 2-4% isoflurane

The animal will be laid prone on a water circulating warming pad to prevent hyperthermia during the procedure.

The region above the designated point for US stimulus (nerve of interest) may be shaved with a disposable razor and animal clippers prior to stimulation.

Diagnostic imaging ultrasound will be used to identify the region of interest

Liver: the porta hepatis as indicated by Doppler identification of the hepatic portal vein.

Spleen: visual identification of the spleen by diagnostic ultrasound. Location of stimuli will be maintained along the splenic axis as identified.

The area may be marked with a permanent marker for later identification.

Either the FUS U/S probe or LogiQ E9 probe will be placed at the designated area of interest previous identified by diagnostic ultrasound.

An U/S pulse will then be performed with total duration of a single stimulus not surpassing a single 1 minute pulse. At no point, will energies reach levels associated with thermal damage & ablation/cavitation.

LPS (10 mg/kg may then be injected IP (for acute/kinetic studies). Alternatively, for duration of effect, LPS will not be injected here and will instead be injected at a later designated time point.

A second 1 minute U/S stimuli will be applied.

The animal will then be allowed to incubate under anesthesia for acute (1 hour) and kinetic (varying up to a maximum of 3 hours post LPS) studies. After which the animal is sacked and tissue, blood samples are collected.

For duration of effect studies, LPS is not injected at the time of U/S stimulus but rather at a designated time point after the U/S stimuli has been applied (e.g. 0.5, 1, 2, 4 or 8 hours). After which the animal is placed into an anesthetic holding chamber and monitored up until euthanasia and tissue/fluid collection.

An incision will be made starting at the base of the peritoneal cavity extending up and through to the pleural cavity. Organs (including spleen and liver) will be rapidly removed and homogenized in a solution of PBS, containing phosphatase (0.2 mM phenylmethylsulfonyl fluoride, 5 ug/mL of aprotinin, 1 mM benzamidine, 1 mM sodium orthovandate and 2 uM cantharidin) and protease (1 uL to 20 mg of tissue as per Roche Diagnostics) inhibitors. A targeted final concentration of 0.2 g tissue per mL PBS solution was applied in all samples. Blood samples were stored with the anticoagulant (disodium) EDTA to prevent coagulation of samples. Samples are then stored at −80 C until analysis. Samples were analyzed by ELISA assay for changes in cytokine (Bio-Plex Pro: Bio-Rad), TNF (Lifespan/Abcam/ThermoFisher) and acetylcholine (Lifespan) concentration. Catecholamine concentrations were assessed using HPLC detection or ELISA (Rocky Mountain Diagnostic) analysis.

Electrode-based Vagal Nerve Stimulation Control Experimental Protocol

Male Sprague-Dawley rats were anesthetized with 2% isoflurane. A single incision was made along the neck exposing the cervical portion of the trapezius, stemocleidomastoid and masseter muscles for blunt dissection exposing the left cervical vagus nerve. The microelectrode was placed along the main trunk of the exposed cervical vagus nerve. Electrical stimulation (5V, 30 Hz, 2 ms; 5V, 5 Hz, 2 ms; IV, 5 Hz, 2 ms) was generated using a BIOPAC MP150 module under the control of the of the AcqKnowledge software (Biopac Systems). Rats underwent 3 min of vagus nerve stimulation before and after IP injection of 10 mg/kg LPS. Rats were euthanized 60 min after LPS injection, and spleen and blood samples were obtained for TNF determination. In rats subjected to sham surgery, the vagus nerve was exposed, but not touched or manipulated.

HPLC Analyses

Serum samples were injected directly into the machine with no pre-treatment. Tissue homogenates were initially homogenized with 0.1M perchloric acid and centrifuged for 15 minutes, after which the supernatant was separated and the sample injected into the HPLC (Dhir & Kulkarni, 2007).

Catecholamines (Norepinephrine/Epinephrine) were analyzed by high performance liquid chromatograph (HPLC) with inline ultraviolet detector. The test column used in this analysis was a Supelco Discovery C18 (15 cm×4.6 mm I.D., 5 um particle size). A biphasic mobile phase comprised of [A] acetonitrile: [B} 50 mM KH2PO4, set to pH 3 (with phosphoric acid). The solution was then buffered with 100 mg/L EDTA and 200 mg/L 1-octane-sulfonic acid. Final concentration of mobile phase mixture was set at 5:95, A:B. A flow rate of 1 mL/min was used to improve overall peak resolution while the column was held to a consistent 20 C to minimize pressure compaction of the column resulting from the viscosity of the utilized mobile phase. The UV detector was maintained at 254 nm, a wavelength known to capture the absorption for catecholamines including: norepinephrine, epinephrine and dopamine.

Chemical Inhibition of U/S Modulated Molecular Signaling Pathways

To further investigate the impact of mechanical vs. direct neural stimulation (and preferential modulation of nerve versus non-neural components of the axoextracellular synapse), a SRC inhibitor (common marker of direct mechanoreceptor) or PI3K inhibitor (common marker of neural signal transduction) prior to performing the ultrasound stimulation procedure outlined above.

Tissue Extraction and Paraffin Block Conversion:

Put tissue (Rat brain) into fixative immediately and fix ~24 hours in 10% formalin at 4 C.

Process tissue with the following protocol (with vacuum and pressure during each incubation):
  a. 70% ethanol, 37 C, 40 min
  b. 80% ethanol, 37 C, 40 min
  c. 95% ethanol, 37 C, 40 min
  d. 95% ethanol, 37 C, 40 min
  e. 100% ethanol, 37 C, 40 min
  f. 100% ethanol, 37 C, 40 min
  g. Xylene, 37 C, 40 min
  h. Xylene, 37 C, 40 min
  i. Paraffin, 65 C, 40 min
  j. Paraffin, 65 C, 40 min
  k. Paraffin, 65 C, 40 min
  l. Paraffin, 65 C, 40 min *leave in this paraffin until ready for embedding, however don't go more than ~12-18 hours.

Embed into Paraffin block for sectioning, allow block to cool/harden before sectioning. Section 5 micron thick, float on 50 C water bath for collection. Use positive charged slides and try to position the tissue in the same orientation for every slide. Air dry slides. Overnight at room temperature seems to be the best for drying but the slides can place on a 40 C slide warmer to speed up the drying process, but don't leave slides more than an hour on the warmer. Store slides at 4 C.

IHC Process

Formalin-fixed paraffin-embedded (FFPE) tissue samples (Rat brains) were baked at 65° C. for 1 h. Slides were deparaffinized with xylene, rehydrated by decreasing ethanol concentration washes, and then processed for antigen retrieval. A two-step antigen retrieval method was developed specifically for multiplexing with FFPE tissues, which allowed for the use of antibodies with different antigen retrieval conditions to be used together on the same samples (2). Samples were then incubated in PBS with 0.3% Triton X-100 for 10 min at ambient temperature before blocking against nonspecific binding with 10% (wt/vol) donkey serum and 3% (wt/vol) BSA in 1×PBS for 45 min at room temperature. Primary antibody cFOS (santa cruz-SC52) was diluted to optimized concentration (5 μg/mL) and applied for 1 h at room temperature in PBS/3% (vol/vol) BSA. Samples were then washed sequentially in PBS, PBS-TritonX-100, and then PBS again for 10 min, each with agitation. In the case of secondary antibody detection, samples were incubated with primary antibody species-specific secondary Donkey IgG conjugated to either Cy3 or Cy5. Slides were then washed as above and stained in DAPI (10 μg/mL) for 5 min, rinsed again in PBS, then mounted with antifade media for Image acquisition. Whole tissue mages were acquired on fluorescence Olympus IX81 microscope at 10× magnification.

Image Processing

Autofluorescence, which is typical of FFPE tissues, should be characterized and separated from target fluorophore signals using autofluorescence removal processes, wherein an image of the unstained sample is acquired in addition to the stained image. The unstained and stained images are normalized with respect to their exposure times and the dark pixel value (pixel intensity value at zero exposure time). Each normalized autofluorescence image is then subtracted from the corresponding normalized stained image. AF removed image merged with registered DAPI image is shown in the pictures. The same region in stimulated and control samples were imaged and images were qualitatively assessed for cFOS expression to detect changes nerve activation associated gene expression.

Histology assessment of spleen: Spleen from stimulated rats and control rats were processed into paraffin blocks as described above. Paraffin embedded sections were cleared and stained for H&E following standard protocol reported in the literature and scanned on bright field olympus scanner. H&E images were qualitatively assessed for morphology difference and no significant difference noticed between stimulated and control samples.

Heart Rate Monitoring and Analysis

Heart rate (during either ultrasound or electrode stimulation experiments) was monitored using a commercial infrared oximeter and physiological monitoring system (Starr Lifesciences) using manufacturer's instructions. During the stimulation protocols the foot clip sensor (provided by manufacturer) was placed on the footpad of the animal. The animal was allowed to acclimate for at least 5 minutes prior to measurement, a time point found sufficient for animals to recover to normal heart rate activities and physiological reading in controls. Measurement were recorded before (2 minute recording periods), during, and after the stimulation (2 minutes recording periods) with either the electrical microelectrode or ultrasound probe, respectively.

Diffusion Functional MRI Measurements of U/S Induced Activation

Neuronal activation is typically detected using blood-oxygenation-level-dependent (BOLD) fMRI; brain regions with increased metabolic demand lead to higher cerebral blood flow, an increased supply of oxygenated blood, and decreased gradient echo signal. Sensitivity to the BOLD effect requires the use of fast gradient echo acquisitions; this causes undesired signal loss in brain areas next to air pockets, such as sinuses and ear canals, and hinders detection of neuronal activation near those specific brain areas. Alternatively, to minimize signal loss in areas characterized by large field inhomogeneities, spin echo (or double spin echo) diffusion weighted imaging (DWI) may be used. In DWI-fMRI, a volume increase in the slow-diffusing, presumably intracellular, water pool, or an increase in water diffusion (or apparent diffusion coefficient (ADC)) were both assigned to cell swelling and membrane expansion caused by neuronal activation.

Figure 14:
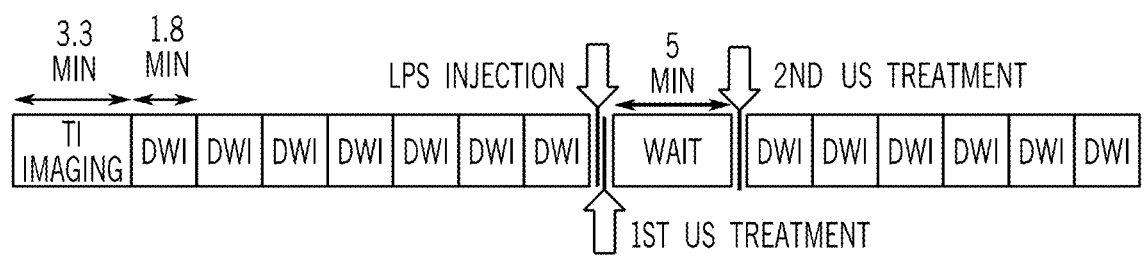
FIG. 14 shows experimental workflow for LPS injection for generating a model of inflammation and/or hyperglycemia/hyperinsulemia and ultrasound treatments.

Ten rats underwent a brain MRI scan using the paradigm of FIG. 14. Six of them received both the LPS injection (as described above) and the ultrasound treatment: four of them only received the LPS injection.

Scans were performed in a 3T GE DV scanner (Waukesha, WI), using a Doty Scientific quadrature birdcage coil. The scans started with a T1 acquisition, using a spoiled gradient echo sequence, at a 0.4/1 mm in-plane/out-of-plane spatial resolution, using a TE:TR of 10/1475 ms, for a total acquisition time of 3:22 min. Six blocks of double spin echo DWI images (termed forward polarity gradient, or FPG) were acquired at 0.6/1 mm in-plane/out-of-plane spatial resolution, with a TE/TR of 82/3400 ms, using 3/4 averages for the b=0/b=1000 s/mm2, respectively, for a total acquisition time per block of 1:49 min. At the completion of the 6 pre-injection DWI acquisition, for distortion correction purposes, another DWI acquisition was performed, with the direction of the gradients reversed; this acquisition will be referred to as a reverse polarity gradient (RPG) acquisition. Following the LPS injection, the 1st ultrasound treatment, a wait time of 5 minutes, and the second ultrasound treatment, other 6 blocks of FPG DWI images were acquired. For the control rats, only undergoing the LPS injection, the last 6 DWI blocks immediately followed the LPS injection.

The ultrasound treatment was performed using a MR compatible 1.47 MHz focused ultrasound transducer, coupled to the porta hepatis region of the liver (containing afferent nerves; as discussed above) using a water-filled cone. Each ultrasound treatment lasted 60 seconds, during which pulsed sinusoidal ultrasound waveforms were applied. The pulse on time was 150 μs and the pulse off-time was 350 μs. The rats' abdomens were outside of the imaging coil; supine animal positioning ensured easy coupling of the ultrasound probe to the liver through the skin, using coupling gel.

Data Analysis and Results

Based on the observation that traversal of the k-space in the opposite direction leads to reversal of distortions (i.e. a compression transforms into an expansion), a field map that causes the FPG and RPG images to overlap can be estimated. This field map estimation is done by setting up a least squares cost function that explicitly depends on all voxel displacements; the smoothness of the deformation field is controlled by the introduction of regularization parameters limiting the sum of the squares of the gradients of the displacements at each voxel. The numerical task of efficiently minimizing this cost function is achieved by starting with heavily blurred FPG and RPG images, then progressively decreasing the blurring Gaussian kernel width. For all the distortion correction performed by us in this work, this schedule of blurring started with a kernel width of 25 pixels, decreasing in steps of 2 to the native resolution of the input images, for a total of 13 iterations; the regularization parameters were $\lambda_1=0$, $\lambda_2=1100$. To summarize, the estimated field maps are first obtained using the b=0 acquisitions of each of the 12 FPG and the single RPG acquisitions; the 12 corrected FPG DWI images are obtained by applying the shifts to the distorted DWI images of FPG series.

Performance of the distortion correction performance was assessed by setting up a brain bounding box for the T1 images, and estimating a cross-correlation coefficient on a per slice basis between the anatomical T1 images and the functional DWI images. Only brain slices whose cross-correlation coefficient exceeded 0.5 were kept in the activation region analysis.

Figure 15:
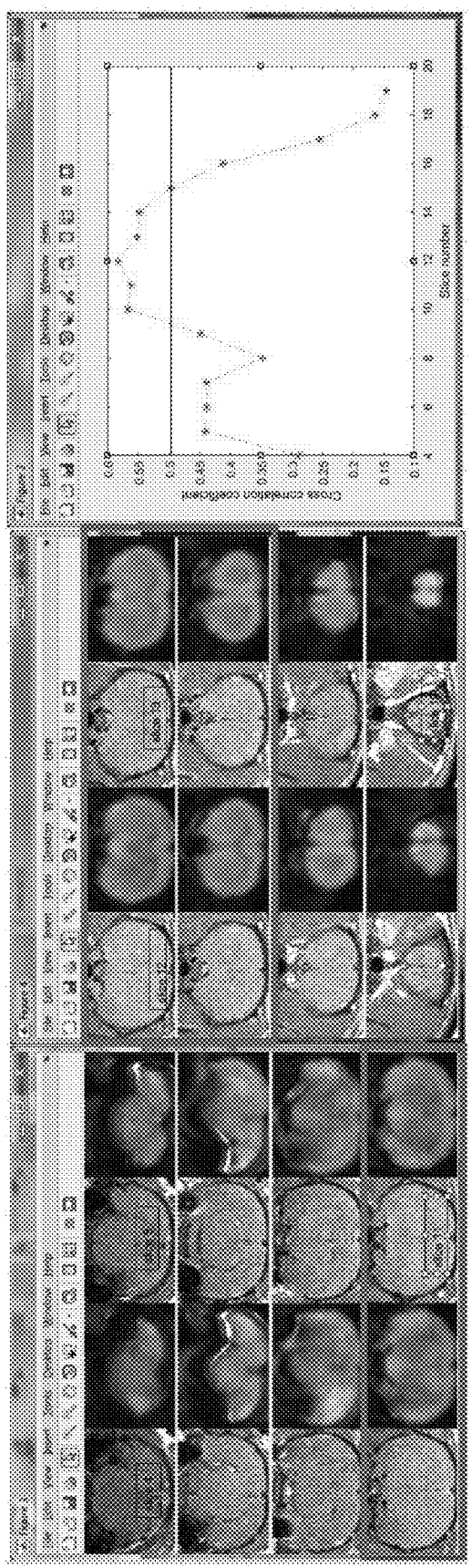
FIG. 15 displays an example of T1/DWI images in rats, together with a cross-correlation coefficient per slice.

FIG. 15 displays and example of T1/DWI images after correction in one of the rats, together with a cross-correlation coefficient per slice, and the slices to be kept for activation analysis highlighted in red.

For each of the 12 corrected DWI data sets, apparent diffusion coefficients were determined on a pixel by pixel basis as $$ADC = \ln\left(\frac{S(b_1)}{S(b_2)}\right) \bigg/ (b_2 - b_1)$$

Here, $b_1=0$, $b_2=1000$ s/mm$^2$, and $S(b_i)$ represents the signal intensity at the i-th b-value.

For each of the 2 conditions (pre-treatment and post-treatment), the 6 ADC maps were binned together, and t-tests were performed on a pixel by pixel basis to identify regions whose average signal significantly increased or decreased (corresponding to deactivation change in neural activation) as a consequence of the application of ultrasound energy.

To identify the anatomical regions of activation, a manual registration between the anatomical T1 images for each rat and a rat brain atlas was performed using ITKSnap registration tool aligning boundaries of the brain using only translation, rotation and scaling (9 degrees of freedom). These corrected and anatomically aligned images were then used to determine regions of the brain activated in response to hepatic ultrasound neuromodulation in the LPS-treated rats.

2. Experimental Results

Figure 16:
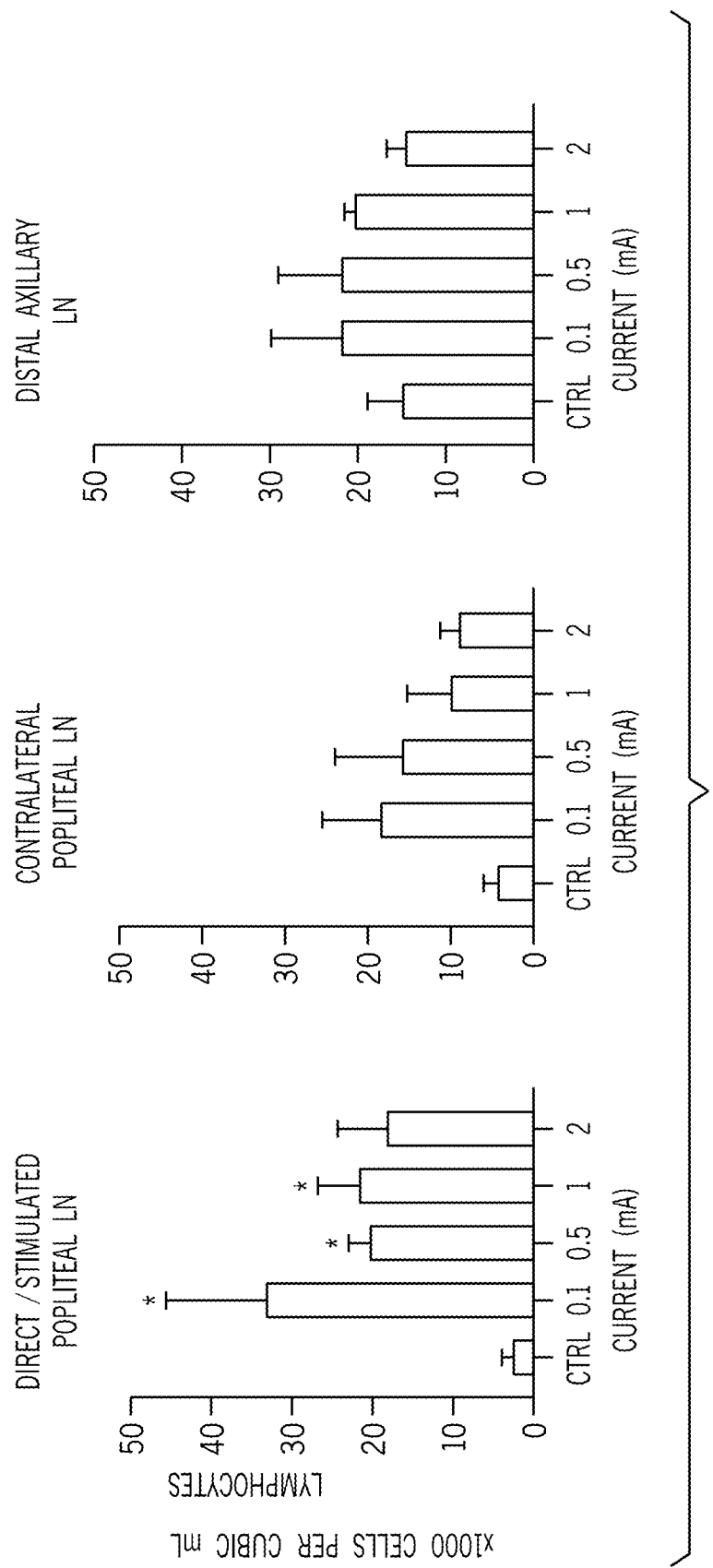
FIG. 16 shows the results of a standard electrode stimulation on direct and contralateral popliteal lymph nodes as well as distal axillary lymph nodes.

As a control, nerves from the sciatic nerve entering the popliteal lymph node were stimulated in a rat. A bipolar electrode was utilized to stimulate for 5 minutes at a range of applied current using a 20 Hz stimulation frequency with 200 microsecond (balanced, biphasic pulses) After stimulation, the lymph node was excised, dissociated into a single cells suspension, and then analyzed using a Hemavet cell counter. The number of lymphocyte cells per cubic mL of dissociated tissue was plotted for the directly stimulated popliteal lymph node, the contralateral popliteal lymph node, and the axillary lymph node. Lymphocyte numbers were statistically increased only in the stimulated lymph node. Results are shown in FIG. 16. As provided herein, application of energy, e.g., ultrasound energy, to a region of interest in a tissue in a targeted manner may in turn achieve more targeted results relative to direct electrical stimulation as shown in FIG. 16.

Figure 17:
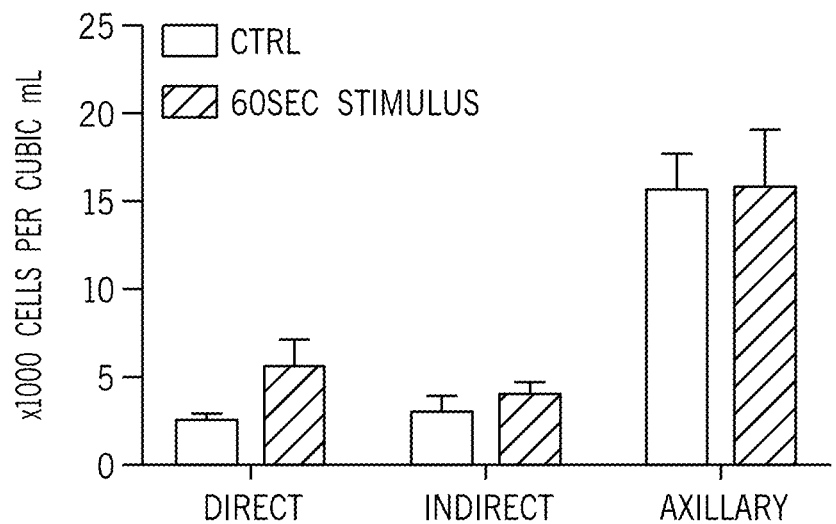
FIG. 17 shows the results of a comparison of lymphocyte counts in directly stimulated popliteal vs. non-stimulated popliteal lymph nodes after ultrasound stimulation.

In contrast to the electrical stimulation, cells and nerve terminals within the popliteal lymph node were stimulated by exposing the lymph node to ultrasound energy in the form of a pulsed sinusoidal waveform Ultrasound parameters used were as follows:

Frequency: 1.1 MHz
Pulse Length: 136 ips
Pulse Repetition Interval: 500 μs (27%0/duty cycle
Total Ultrasound Exposure Time: 1 min
Estimated Positive Pressure at the Focus: 5 MPa
Estimated Negative Pressure at the Focus: −2 MPa
Transducer Geometry: Spherically focused with a central aperture
Transducer Outside Diameter: approximately 70 mm
Transducer Central Aperture diameter: approximately 20 mm
Focus Distance: approximately 54.8 mm (Fnumber approximately 1)
Focal Spot Region: approximately ellipsoidal, with diameter 1.8 mm and length 11.7 mm and After stimulation, the stimulated (and other) lymph nodes were excised and examined using a cell counter. Only the stimulated lymph node showed a lymphocyte increase as shown in FIG. 17. Neurotransmitter levels in the ultrasound stimulated lymph node differed relative to the electrically stimulated lymph node. However, the cell count data for lymphocytes was similar in both the ultrasound and electrically stimulated lymph nodes. In addition to local modulation of lymphocyte egress (through efferent nerve fibers), electrical stimulation of the nerves entering the lymph node was found to have distal effects on immune cell concentrations in the liver and spleen.

Figure 18:
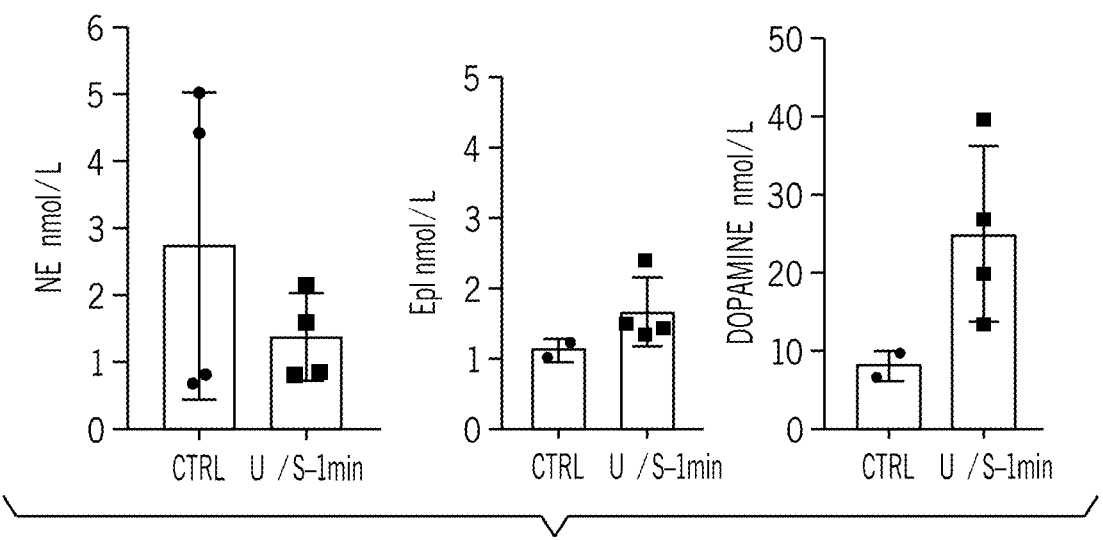
FIG. 18 shows the concentration of norepinephrine, epinephrine, and dopamine in lymph node dissociated tissue after ultrasound stimulation.

FIG. 18 shows results for neurotransmitter concentration in ultrasound stimulated lymph nodes. Epinephrine and dopamine went up in ultrasound stimulated lymph nodes.

Figure 19:
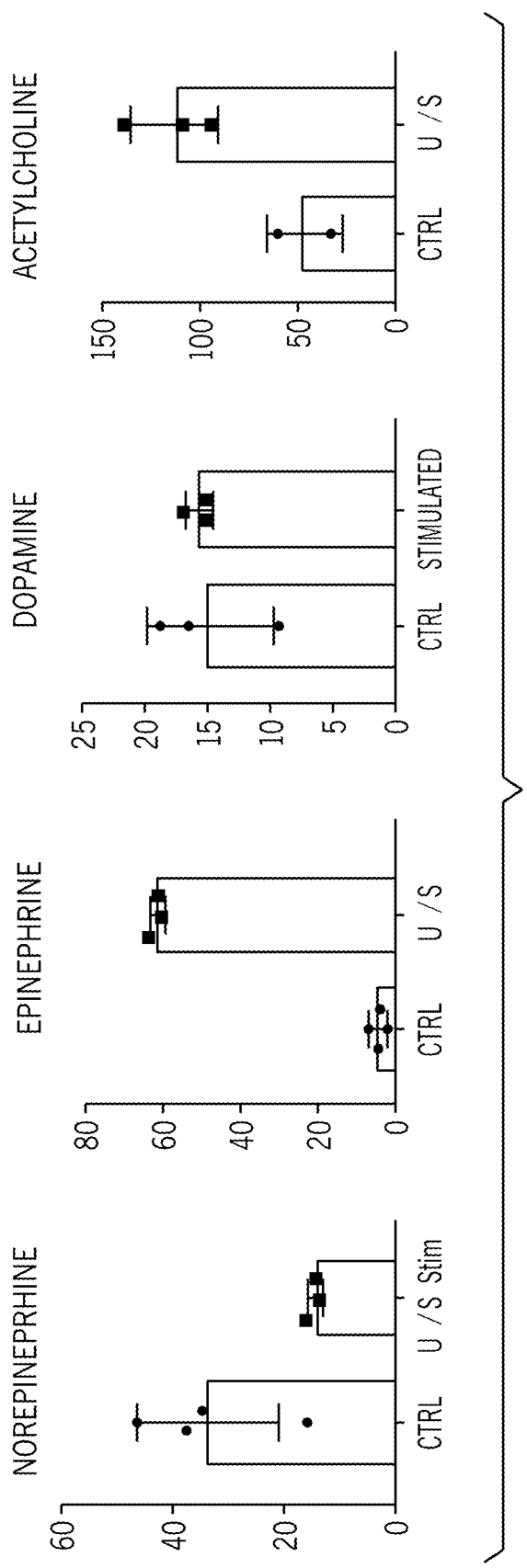
FIG. 19 shows the concentration of norepinephrine, epinephrine, acetylcholine, and dopamine in the spleen after ultrasound stimulation.

FIG. 19 shows results for norepinephrine, epinephrine, dopamine and acetylcholine concentrations in spleens as a distal effect of lymph node ultrasound stimulation.

Figure 20:
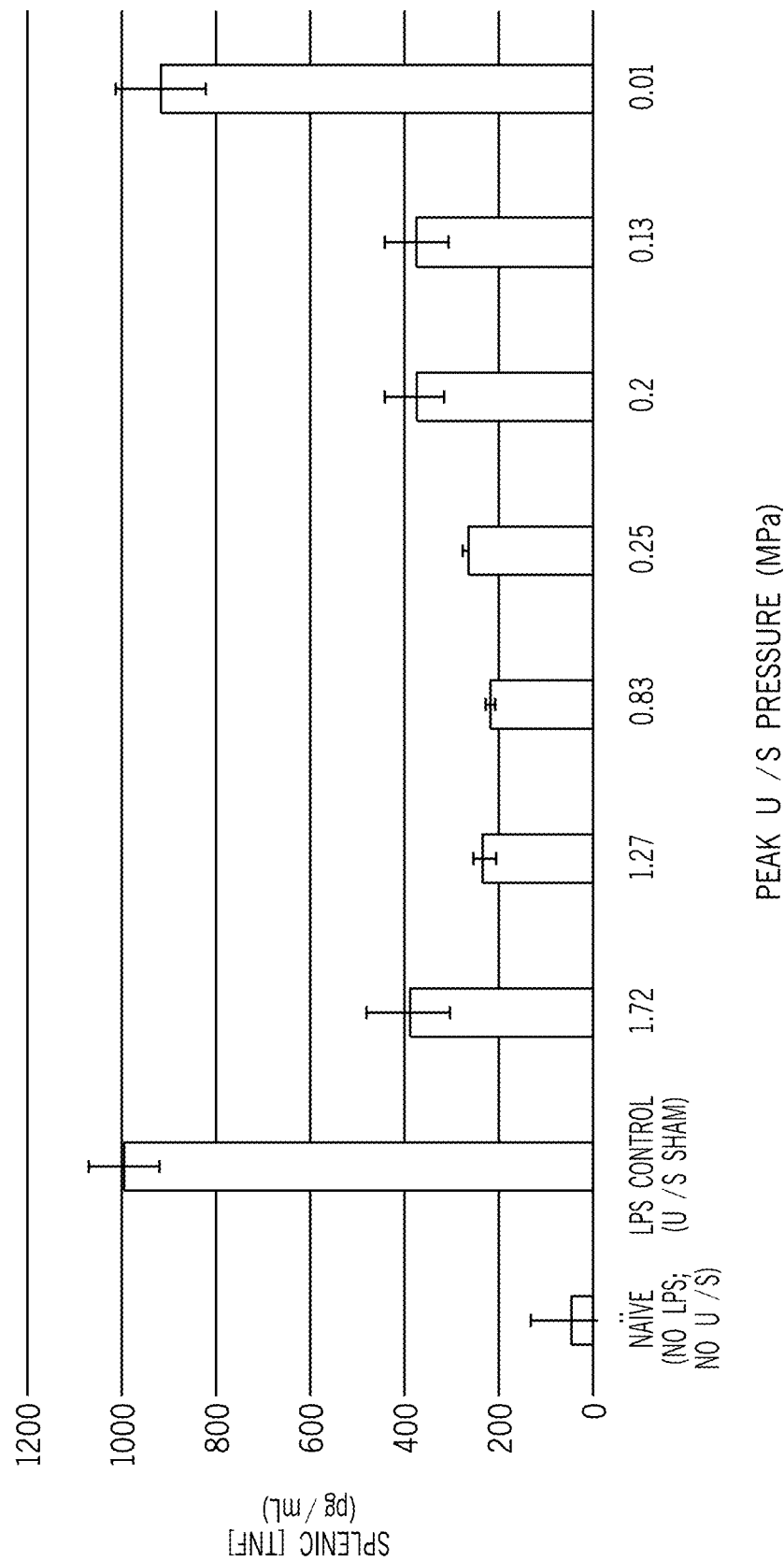
FIG. 20 shows the spleen concentration of TNF-alpha relative to peak ultrasound pressure.
Figure 21A:
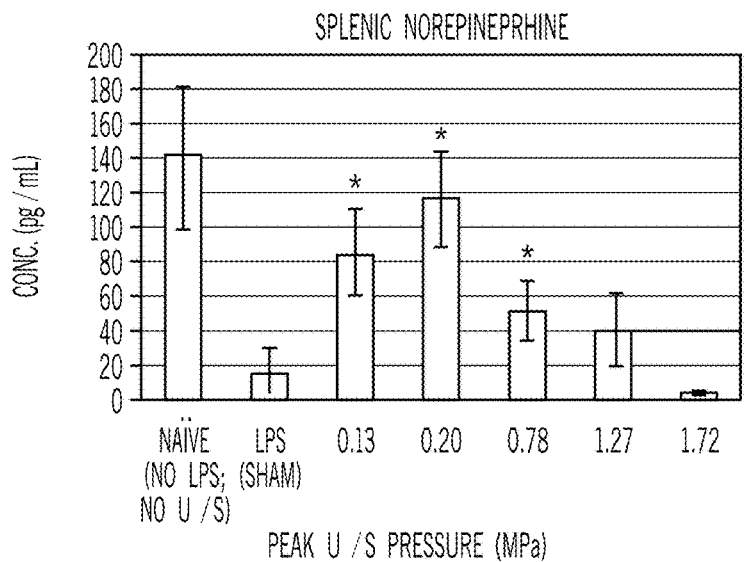
FIG. 21A shows the spleen concentration of norepinephrine relative to peak ultrasound pressure.
Figure 21B:
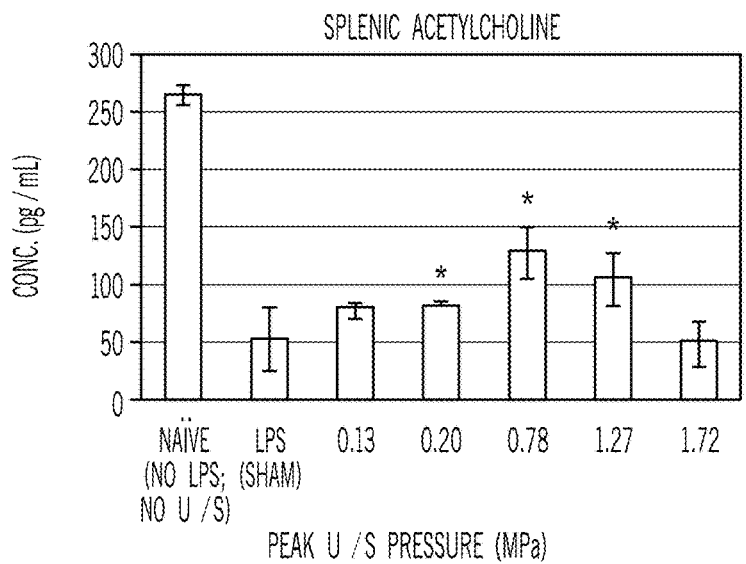
FIG. 21B shows the spleen concentration of acetylcholine relative to peak ultrasound pressure.
Figure 21C:
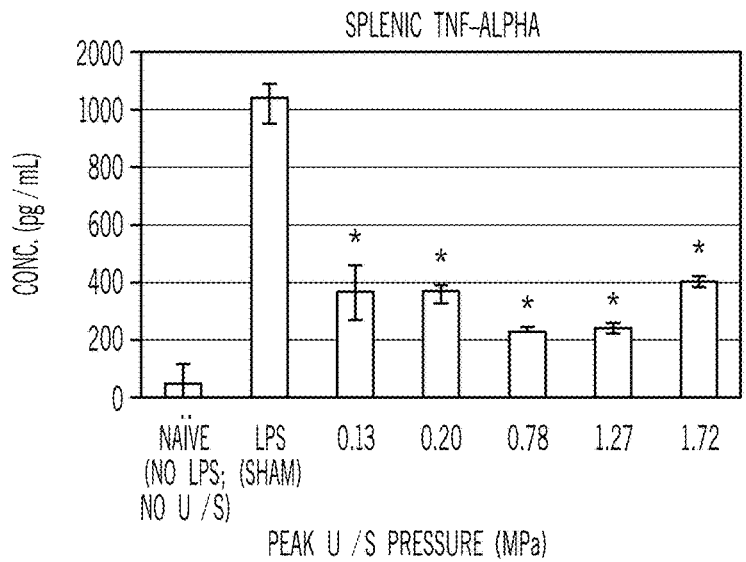
FIG. 21C shows the spleen concentration of TNF-alpha relative to peak ultrasound pressure.
Figure 22:
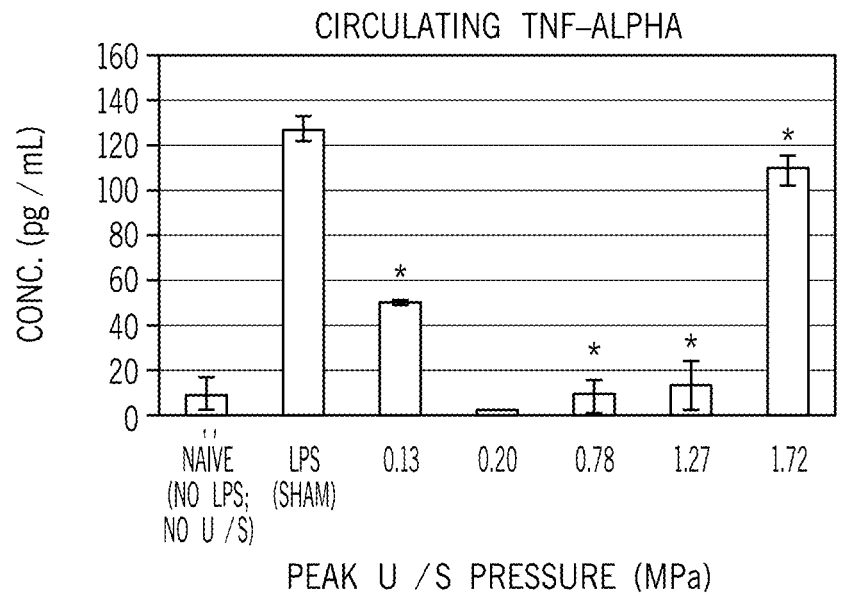
FIG. 22 shows the circulating concentration of TNF-alpha relative to peak ultrasound pressure.

FIG. 20 shows results of cytokine (TNF) concentration in the spleen for ultrasound-stimulated animals relative to a control group of unstimulated animals. FIG. 21A shows the concentration of norepinephrine, FIG. 21B shows acetylcholine, and FIG. 21C TNF-alpha in the spleen after ultrasound stimulation in a dose-dependent manner. FIG. 22 shows the concentration of circulating (i.e. blood) TNF-alpha after ultrasound stimulation of the spleen.

Figure 23:
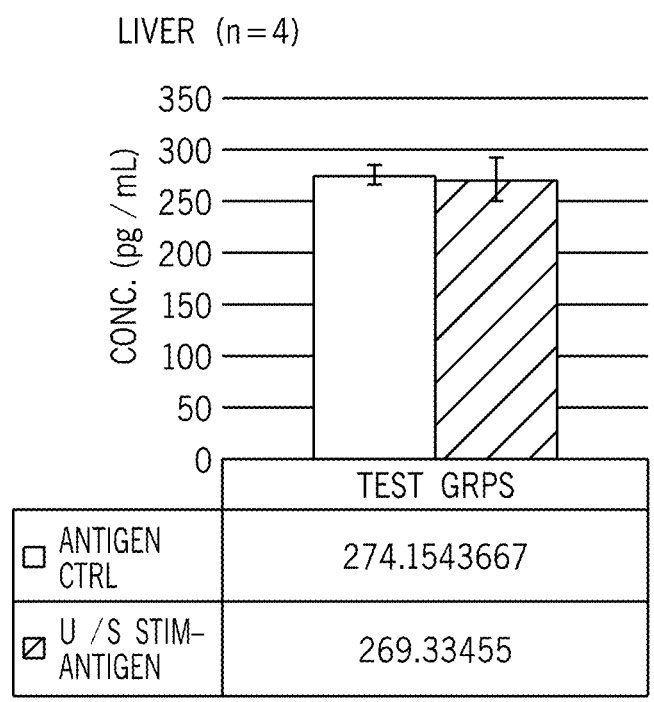
FIG. 23 shows the concentration of TNF-alpha in the liver for a group of stimulated LPS-treated animals relative to a control group of unstimulated but LPS-treated animals.

FIG. 23 shows results from the liver for a control group of LPS-treated animals vs. ultrasound-stimulated and LPS-treated animals.

Figure 24:
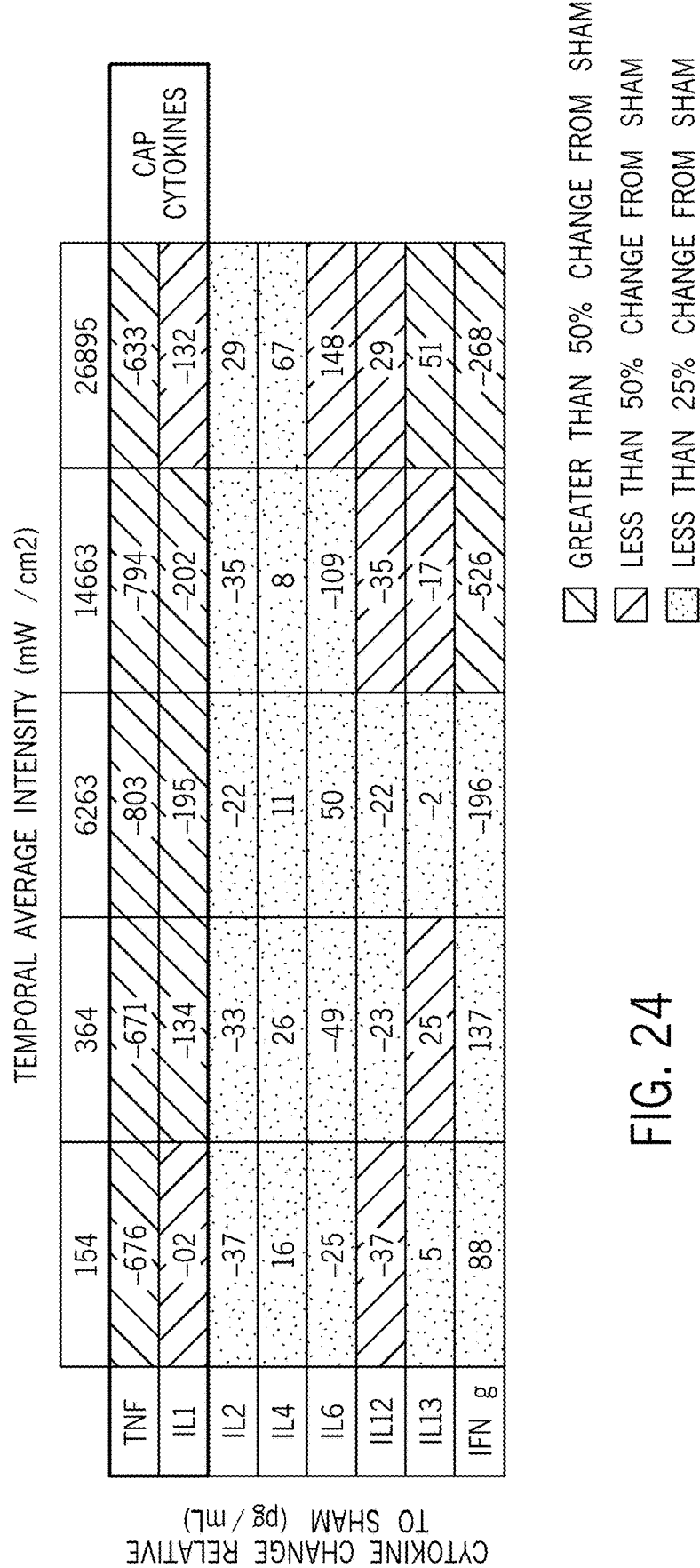
FIG. 24 is a table showing cytokine change relative to control for different temporal average intensities of ultrasound treatment at the treatment site.

FIG. 24 is a table showing splenic cytokine change relative to control for different temporal average intensities of splenic ultrasound treatment. The assessed cytokines are cytokines that may be indicative of the cholinergic anti-inflammatory pathway, and others that are non-related. For TNF-alpha (a cholinergic anti-inflammatory pathway (CAP) associated cytokine), the reduction in the change relative to the sham controls was observed across all temporal average intensities. In contrast, IFN-gamma (a cytokine unrelated to CAP) had a reduction observed at higher temporal average intensities. The results indicate that ultrasound modulation of the spleen at certain ranges of temporal average intensities may result in a corresponding decrease in cytokine concentration specifically associated with CAP activation b. Accordingly, as provided herein, the targeted physiological outcome may be a decrease in cytokine concentration, e.g., TNF-alpha concentration or IL-1 concentration as a result of modulation of at least 1 mW/cm$^2$ temporal average intensity to 30,000 mW/cm$^2$ temporal average intensity. In certain embodiments, energy applied to a region of interest in the spleen associated with a corresponding decrease in TNF-alpha concentration or IL-1 concentration may be used to treat chronic inflammation, e.g., arthritis.

Figure 25:
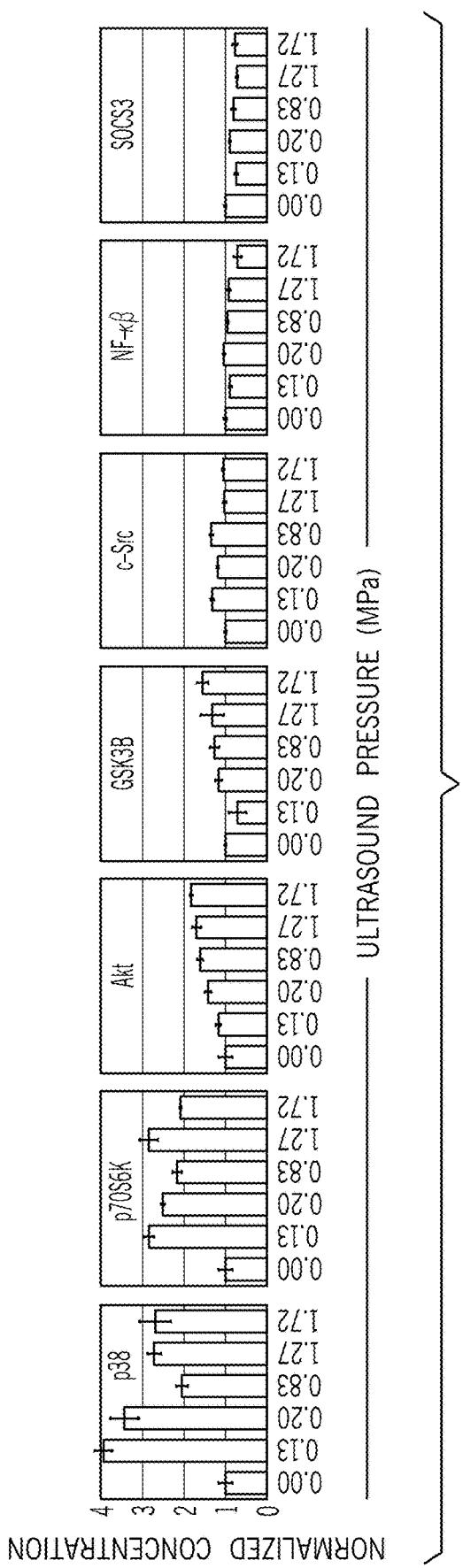
FIG. 25 shows the percentage change of phosphorylation status of secondary messenger molecules relative to LPS-treated control for different peak pressures of ultrasound treatment of the spleen.
Figure 26:
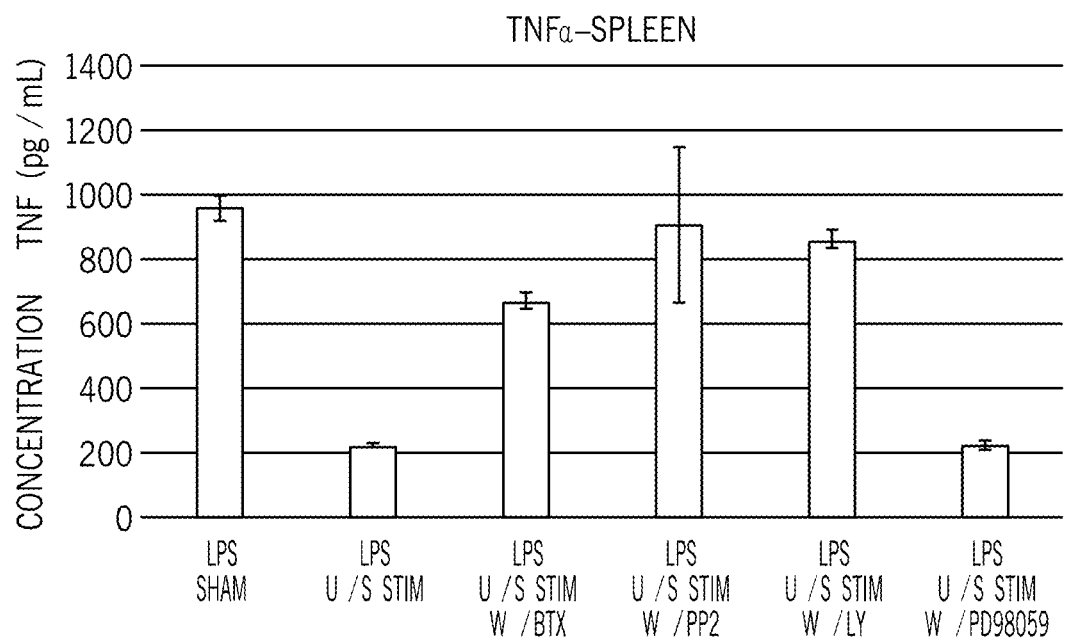
FIG. 26 shows the spleen concentration of TNF-alpha for a group of stimulated LPS-treated animals in the context of pathway blocking treatments.
Figure 27:
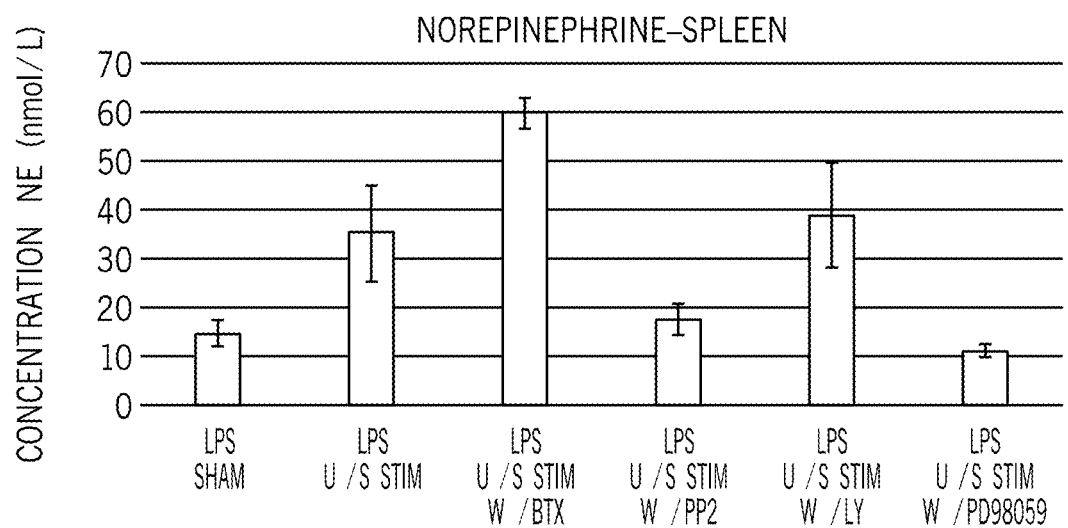
FIG. 27 shows the spleen concentration of norepinephrine for a group of stimulated LPS-treated animals in the context of pathway blocking treatments.
Figure 28:
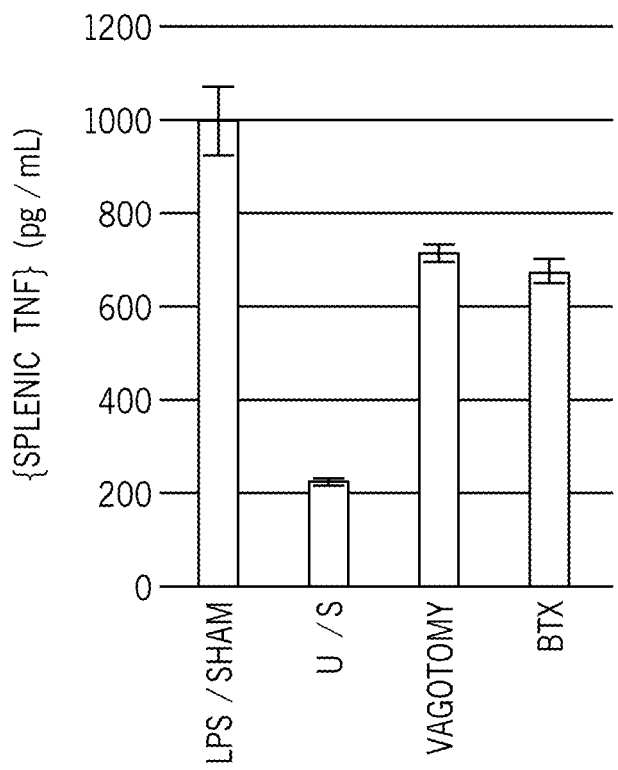
FIG. 28 shows the spleen concentration of TNF-alpha for a group of stimulated LPS-treated animals relative to animals treated with vagotomy or pathway blocking.
Figure 29:
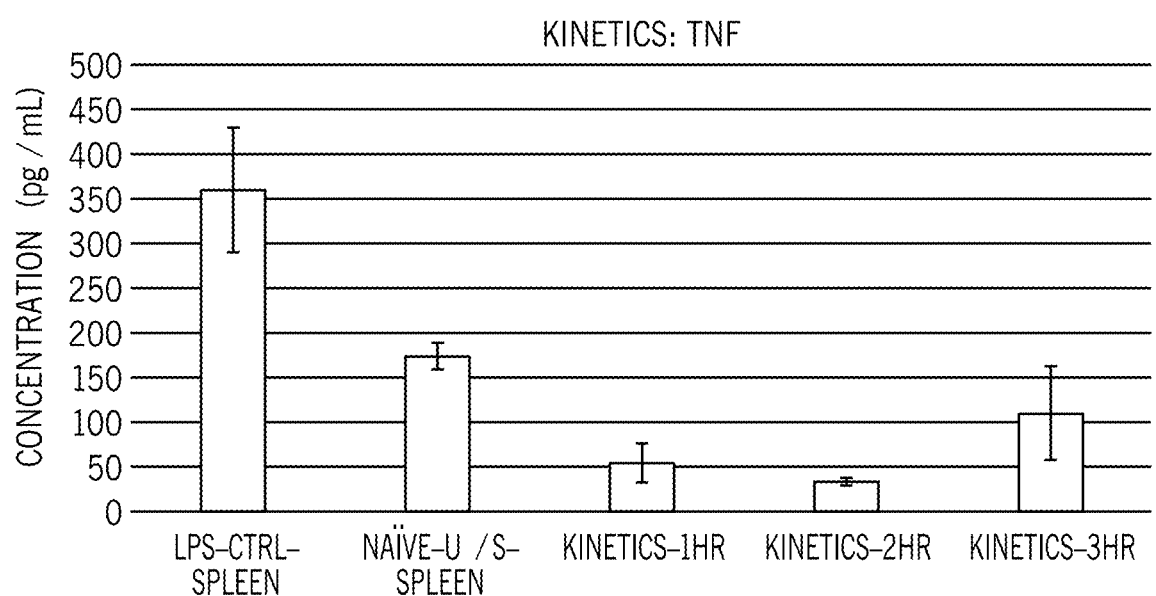
FIG. 29 shows the spleen concentration of TNF-alpha at various time points after ultrasound treatment in conjunction with LPS treatment.

FIG. 25 shows the percentage change of phosphorylation status of secondary messenger molecules relative to LPS-treated control for different peak pressures of ultrasound treatment of the spleen. The results show that ultrasound treatment at the spleen modulates multiple pathways across different cells types in tissue. Nevertheless, the modulation parameters may be found that have a more targeted effect on one (or a distinct set) of the pathways. As shown, for splenic ultrasound modulation, the p-p38 phosphorylation changes across different peak pressures trend with t TNF concentration changes in response, while other pathways show monotonically increasing or decreasing trends with respect to applied ultrasound pressures FIG. 26 shows the spleen concentration of TNF-alpha for a group of stimulated LPS-treated animals in the context of pathway blocking treatments. BTX is a chemical blocker of acetylcholine receptor (blocks neural pathway at integrator cell); PP2 is a Src-kinase Inhibitor; LY is a PI3-kinase Inhibitor; and PD98059 is a MAPK-kinase Inhibitor. FIG. 27 shows the spleen concentration of norepinephrine for a group of stimulated LPS-treated animals in the context of the pathway blocking treatments. FIG. 28 shows the spleen concentration of TNF-alpha for a group of stimulated LPS-treated animals relative to animals treated with vagotomy or the pathway blocking. FIG. 29 shows the spleen concentration of TNF-alpha at various time points after ultrasound treatment in conjunction with LPS treatment. The effect begins to reverse after three hours.

Figure 30:
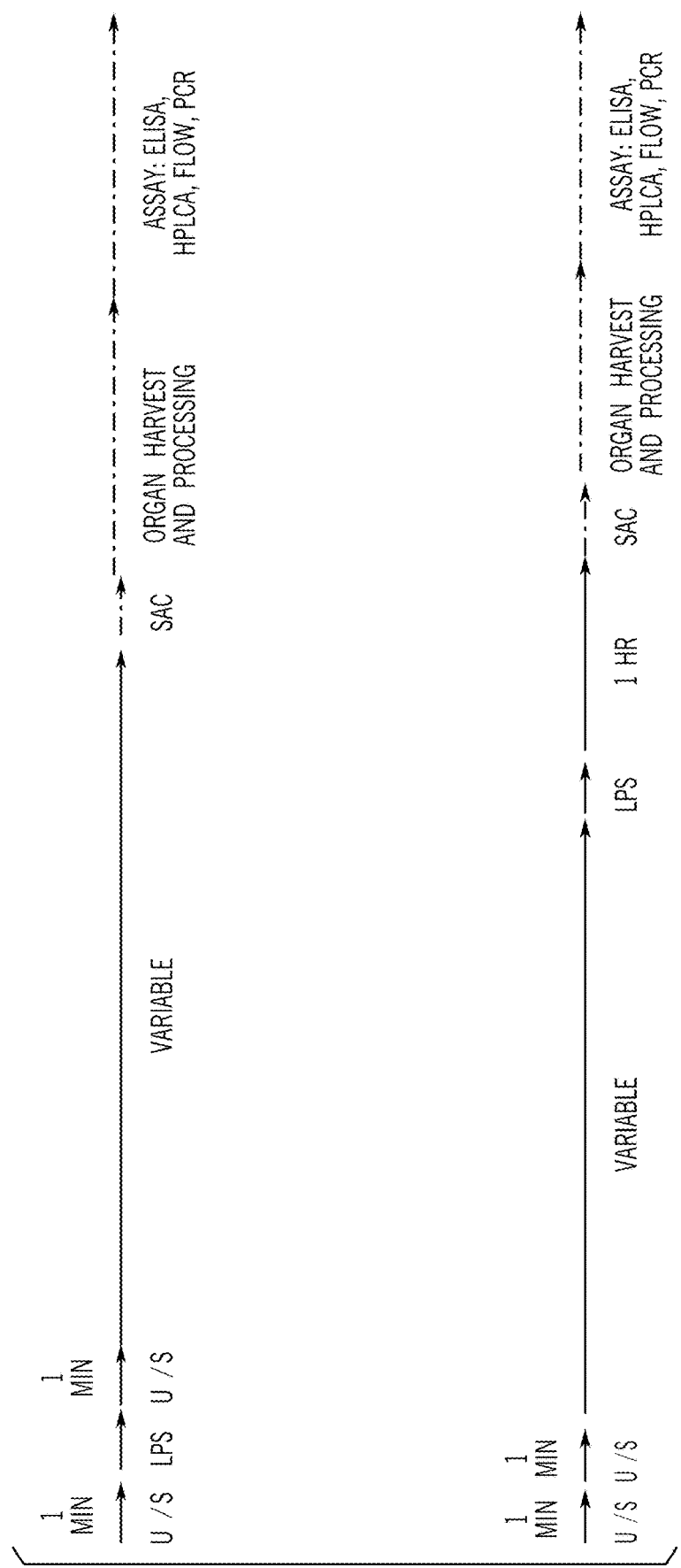
FIG. 30 is an experimental timeline for LPS treatment after ultrasound treatment.
Figure 31:
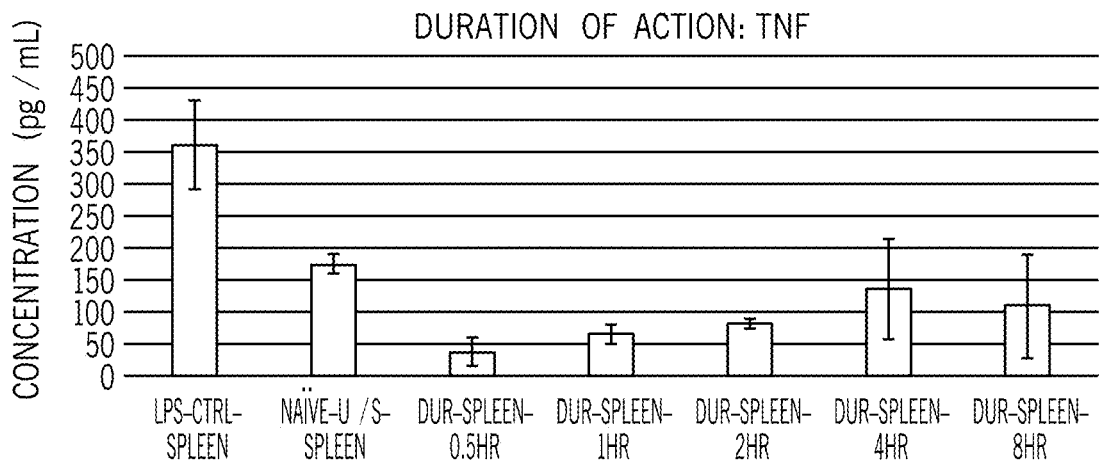
FIG. 31 shows the spleen concentration of TNF-alpha at various time points after ultrasound and LPS treatment according to the timeline of FIG. 30.

FIG. 30 is an experimental timeline for LPS treatment after ultrasound treatment that was used to demonstrate protective effects of ultrasound treatment to a future immune/inflammation insult. The ultrasound treatment appears to provide at least a partially protective effect to the LPS immune trigger for several hours after treatment by protecting against the LPS-associated drop in norepinephrine and subsequent activation of the CAP, with protective effects being greatest at a 30 minute interval, but stabilizing at 1-2 hours. FIG. 31 shows the spleen concentration of TNF-alpha at various time points after ultrasound and LPS treatment according to the timeline of FIG. 30. The protective effect of ultrasound treatment against the immune insult by protecting against the LPS-associated increase in TNF-alpha was greater than in the naïve animals (i.e. animals with no LPS or inflammatory insult), and decreased TNF production compared to LPS-control (i.e. no ultrasound) controls. Accordingly, as provided herein, noninvasive or minimally invasive energy application to the spleen may be used to protect against inflammatory insults or chronic inflammation (as protection from a single ultrasound modulation is protective over a long period of time).

Figure 32:
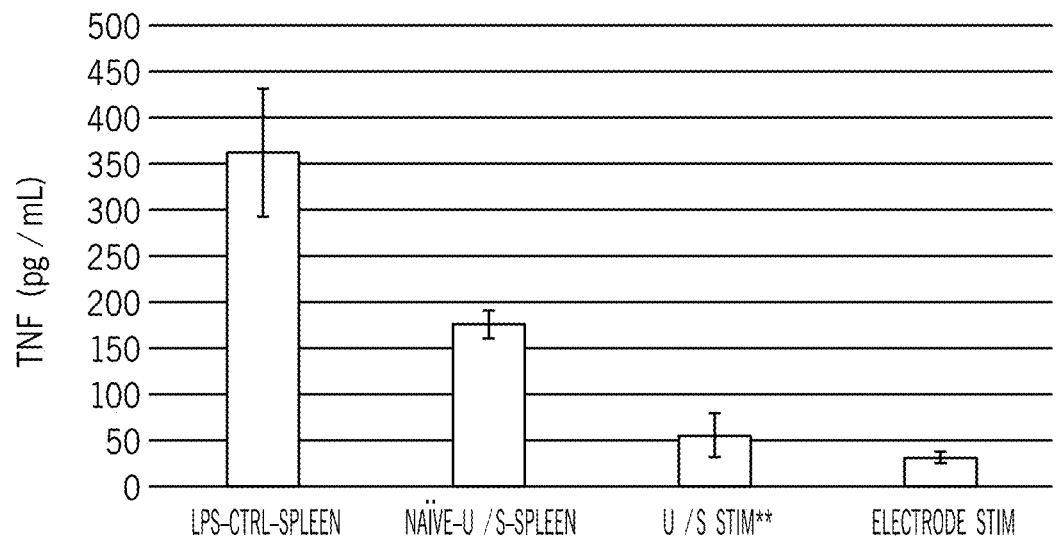
FIG. 32 shows the spleen concentration of TNF-alpha for noninvasively ultrasound stimulated vs. electrode stimulated animals.
Figure 33:
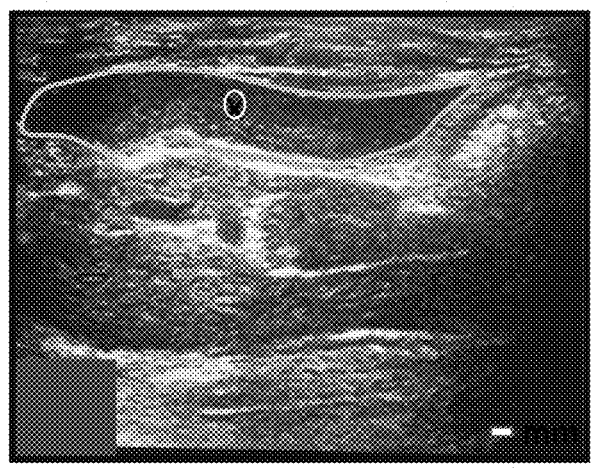
FIG. 33 is an ultrasound image used to identify the region of interest and ultrasound placement for the ultrasound treatment of FIG. 35A and FIG. 35B.

FIG. 32 shows the spleen concentration of TNF-alpha for noninvasively ultrasound stimulated vs. invasive, cervical vagal electrode stimulated animals and FIG. 33 is an ultrasound image used to identify the region of interest and ultrasound placement for the ultrasound treatment of FIG. 32 by centering the imagine transducer directly in the FUS cone. The stimulation and LPS treatment was performed as generally provided herein. The noninvasive ultrasound stimulation was performed in a completely noninvasive manner and achieve similar results (reversal of LPS-associated TNF-alpha increase) relative to invasive ultrasound treatment (results above) or invasive electrode treatment (as shown).

Figure 34:
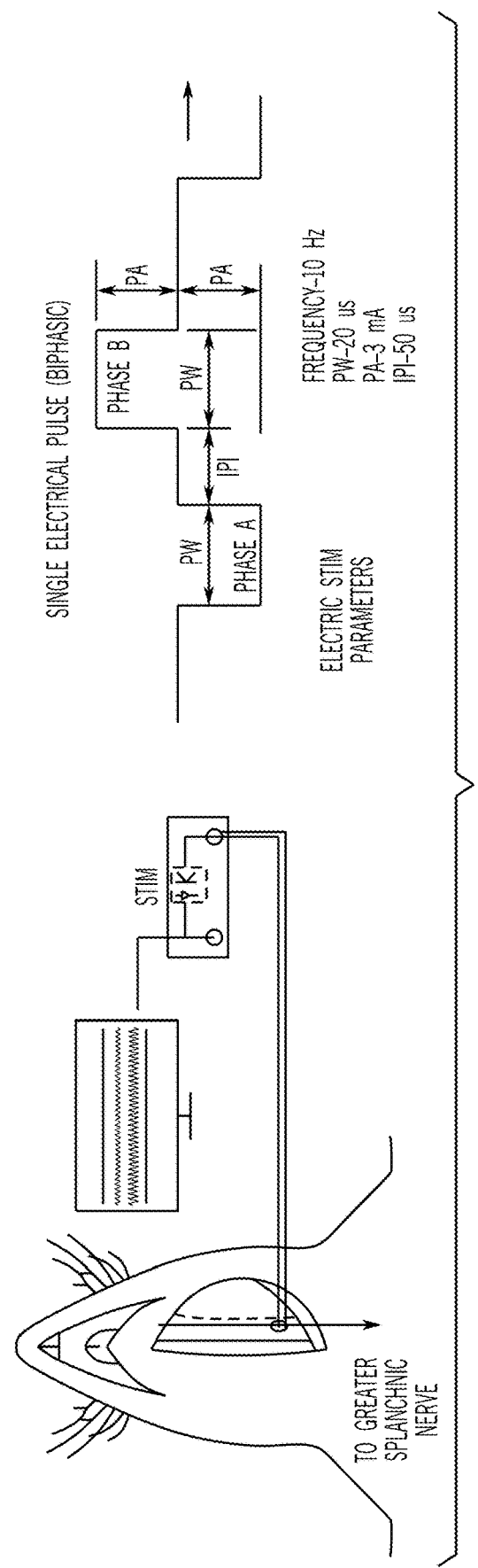
FIG. 34 shows a control electrical stimulation experimental setup.
Figure 35B:
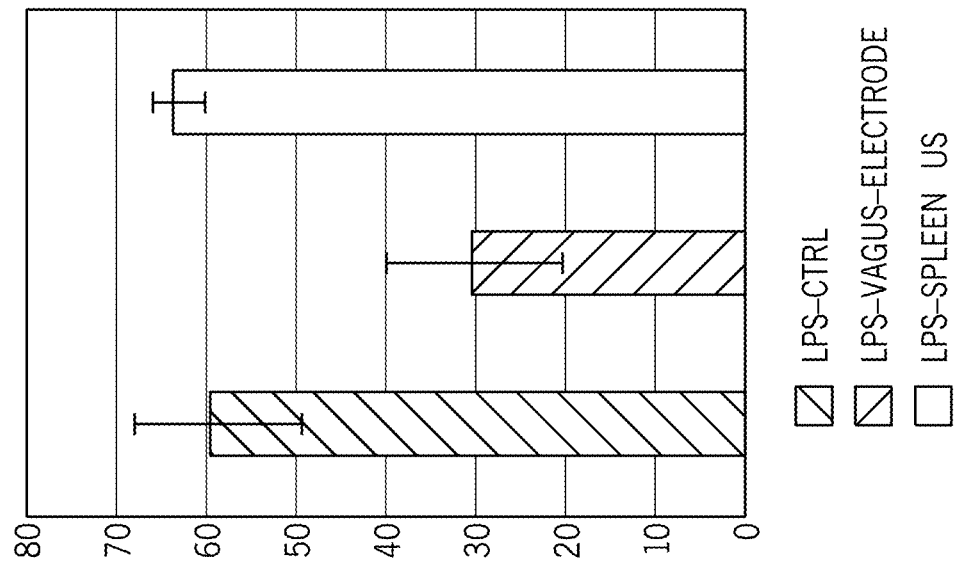
FIG. 35B shows the circulating glucose concentration for noninvasively ultrasound stimulated vs. electrode-stimulated control animals in the context of LPS treatment, the electrode stimulation performed according to the setup of FIG. 34.
Figure 35A:
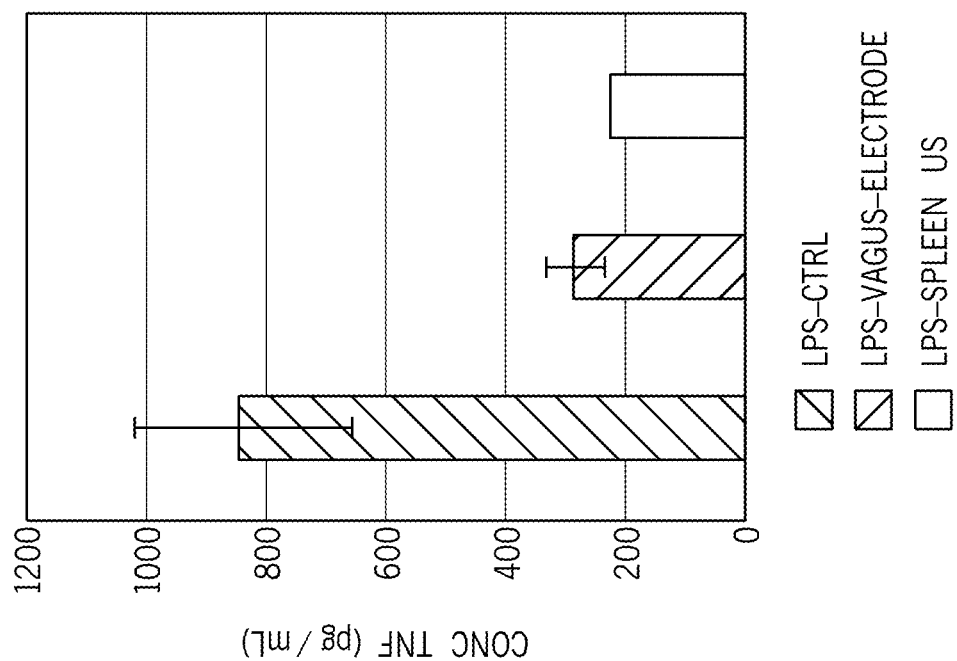
FIG. 35A shows the spleen concentration of TNF-alpha for noninvasively ultrasound stimulated vs. electrode-stimulated control animals in the context of LPS treatment, the electrode stimulation performed according to the setup of FIG. 34.

FIG. 34 shows a control electrical stimulation experimental setup. FIG. 35A shows the spleen concentration of TNF-alpha for noninvasively ultrasound stimulated vs. electrode-stimulated control animals in the context of LPS treatment, the electrode stimulation performed according to the setup of FIG. 34. FIG. 35B shows the blood glucose concentration for noninvasively ultrasound stimulated vs. electrode-stimulated control animals in the context of LPS treatment, the electrode stimulation performed according to the setup of FIG. 34. The ultrasound and electrical stimulation had the same effect on LPS-induced TNF concentrations. LPS is also known to cause hyperglycemia (see LPS control, FIG. 35B). LPS-induced hyperglycemia has previously been shown to be abrogated by VNS (by an unknown pathway), and this is an "off-target" effect if viewed in terms of attempting VNS cholinergic anti-inflammatory pathway stimulation. However, ultrasound cholinergic anti-inflammatory pathway stimulation does not produce the off-target effect on glucose. Accordingly, cholinergic anti-inflammatory pathway ultrasound stimulation may be beneficial in certain clinical circumstances relative to VNS (or other imprecise electrical nerve stimulation techniques), and the organ-based, axoextracellular synapse ultrasound modulation is shown as provided herein to be more precise.

Figure 36:
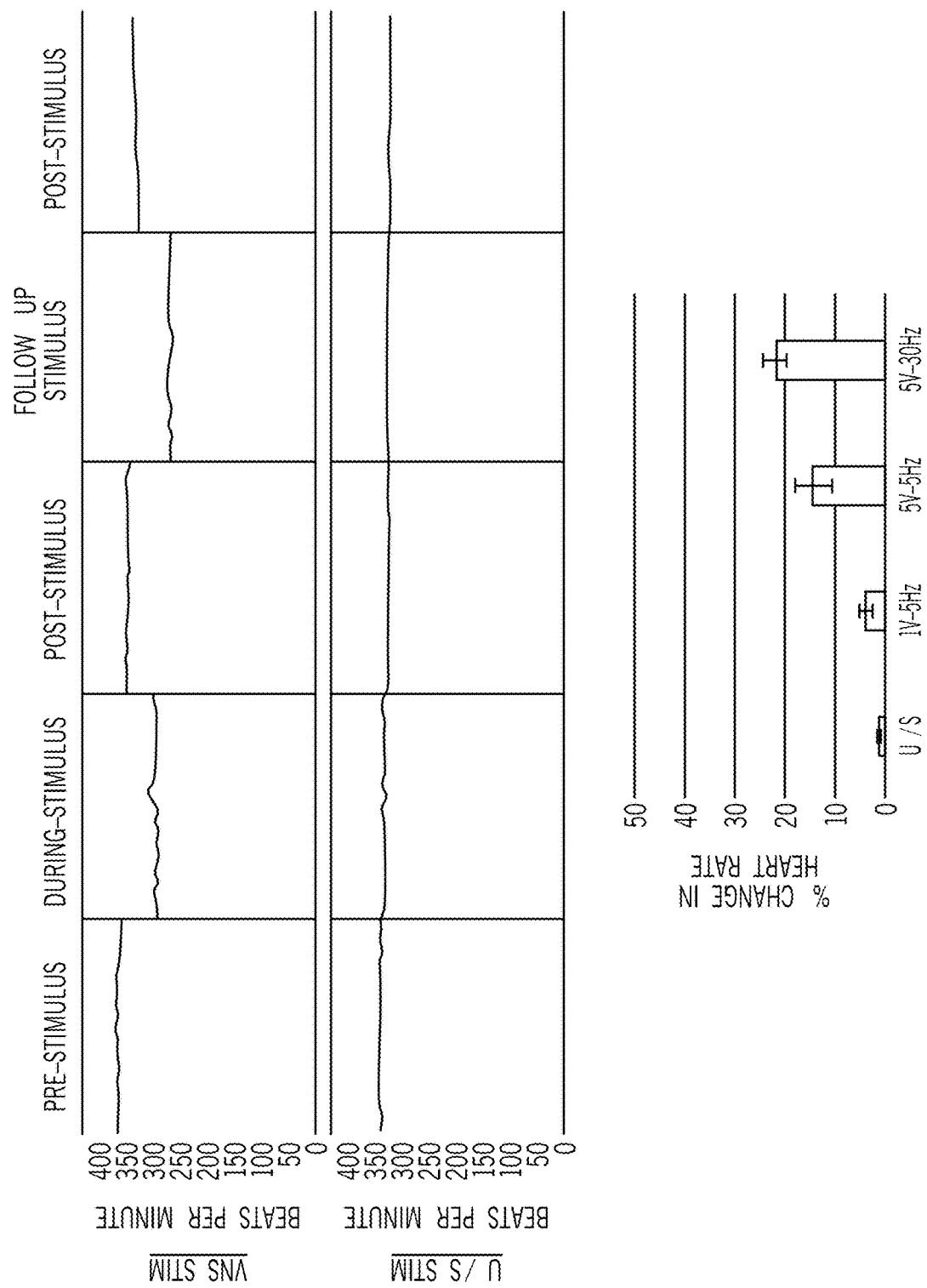
FIG. 36 shows the effect of VNS electrode stimulation vs. ultrasound splenic neuromodulation on heart rate relative to a non-stimulated animal.

FIG. 36 shows the effect of VNS electrode stimulation vs. ultrasound splenic neuromodulation on heart rate relative to a non-stimulated animal measured using a commercially available non-invasive, optical heart rate probe placed on paw of animal during experiments. Percent change in hearts rate is the change in heart rate compared to a non-stimulated animal. Again, electrical stimulation is shown to have potential off-target effect (i.e. modulation of heart rate), and the organ-based, axoextracellular synapse ultrasound modulation does not have this off-target (i.e. effect other than CAP activation) effect.

Figure 37A:
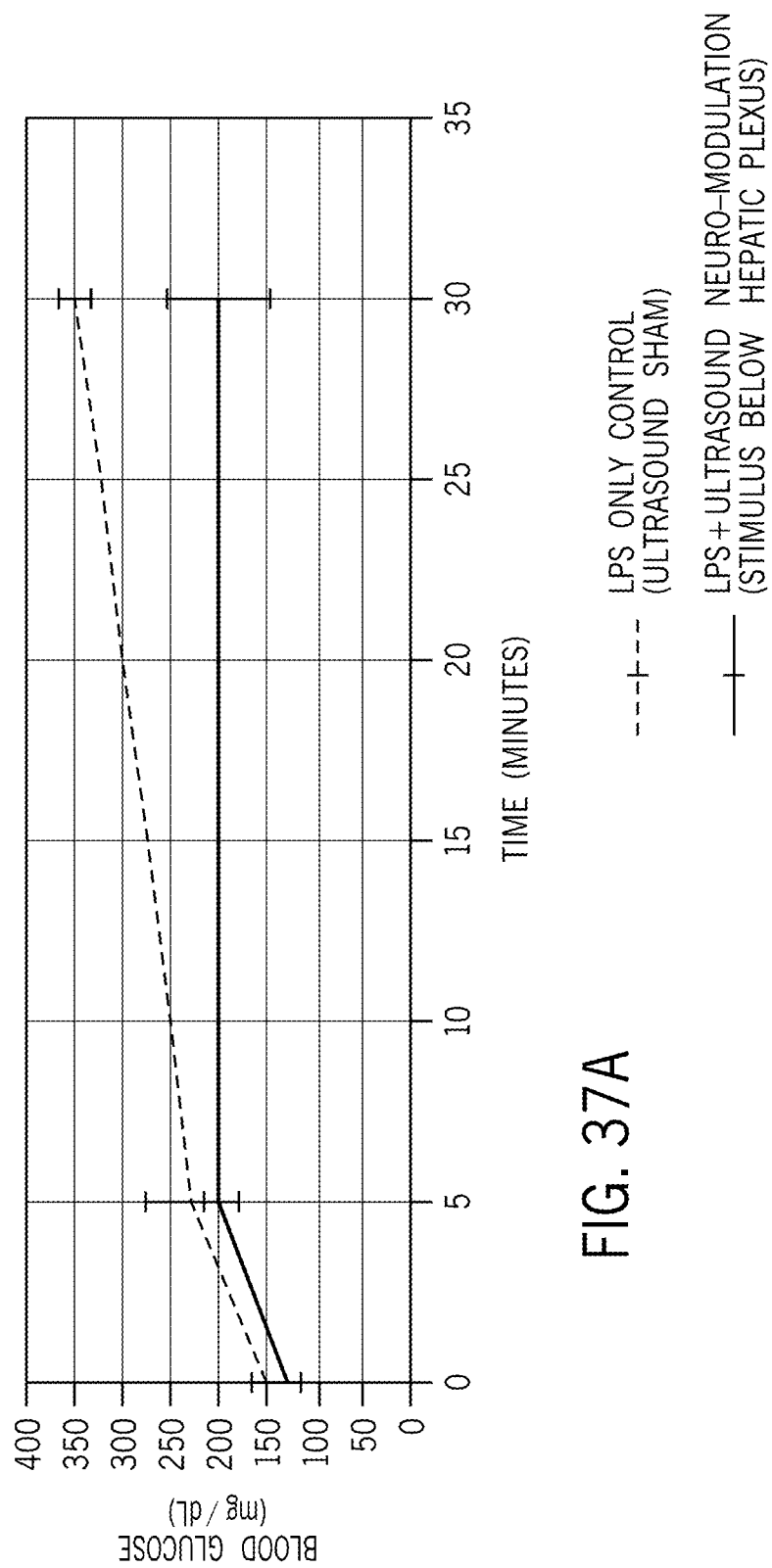
FIG. 37A shows the effect of ultrasound liver porta hepatis modulation on blood glucose relative to a control.

FIG. 37A shows the effect of ultrasound liver modulation below the porta hepatis on blood glucose relative to a control. The porta hepatis is a site known to have glucose sensing neurons, and was hypothesized to be origination site for the off-target VNS effect on glucose seen above (i.e. VNS was also stimulating afferent nerves from this area in addition to the CAP pathway). FIG. 37B and FIG. 37C show the effect of ultrasound hepatic modulation on liver concentration of various molecules involved with metabolism and glucose utilization. Only a change in insulin was observed in the liver. However, insulin is not produced in the liver, and is transported there from other sites, pointing to systemic effects on insulin production and glucose metabolism as a result of local liver porta hepatis stimulation.

Figure 38A:
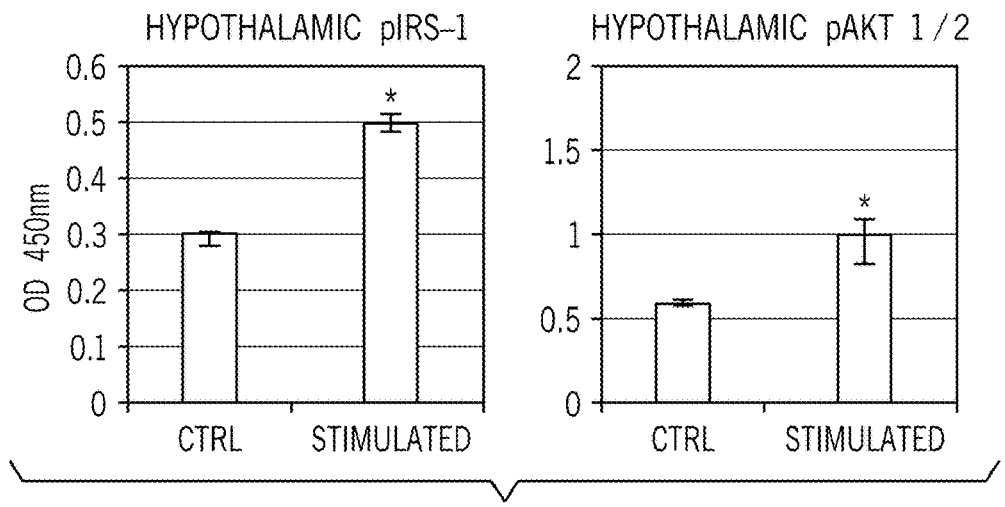
FIG. 38A shows the effect of ultrasound liver porta hepatis modulation on brain concentration of various molecules.
Figure 38B:
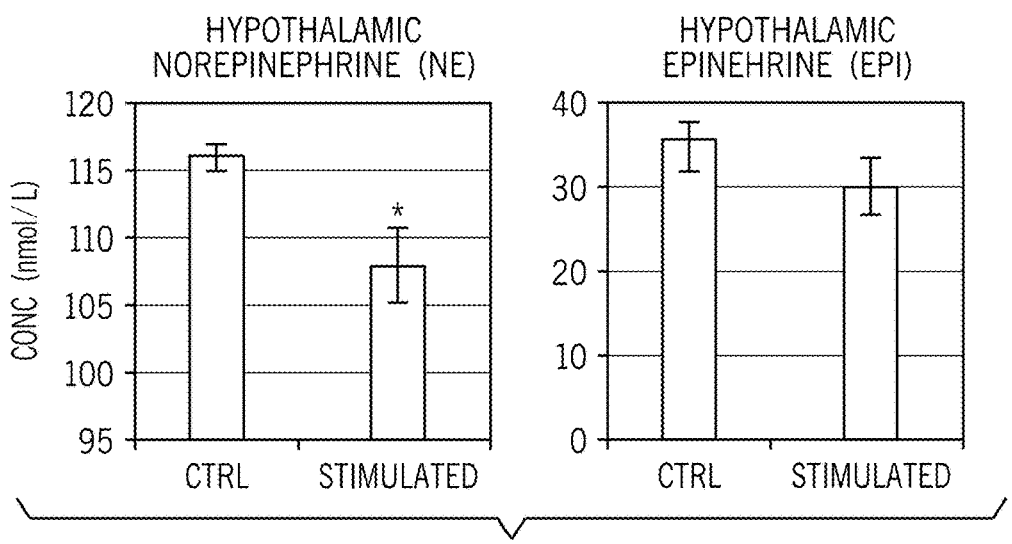
FIG. 38B shows the effect of ultrasound liver porta hepatis modulation on brain concentration of various molecules.
Figure 38C:
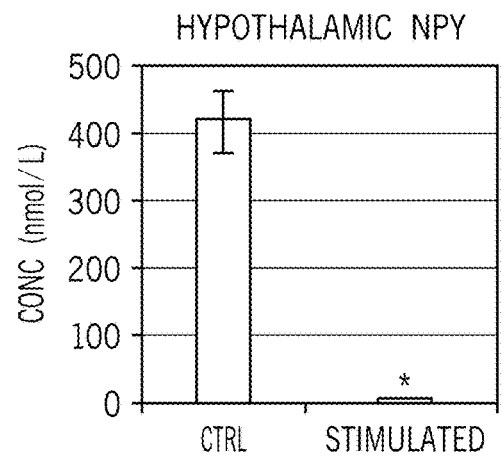
FIG. 38C shows the effect of ultrasound liver porta hepatis modulation on brain concentration of various molecules.

FIGS. 38A-C shows the effect of ultrasound liver porta hepatis modulation on brain concentration of various molecules. The hypothalamus is known to harbor regions responsible for glucose regulation across the body. The liver afferents appear to be a PNS control pathway to those sites (and neuromodulation of the sensory nerve/liver fluid axo-extracellular synapse causes a change in signaling via the neural pathway). Accordingly, as provided herein, direct application of energy (e.g., ultrasound energy) to the liver may be used to treat disorders related to glucose regulation. Such disorders may include obesity, diabetes-associated dementia, eating disorders, diabetes, hypo or hyperglycemia, etc. In certain embodiments, hyperglycemia is a concentration of glucose greater than 300 mg/dL in the blood and a successful targeted physiological outcome is a concentration of glucose greater than 220 mg/dL in the blood. The treatment may include application of energy to a region of interest in the liver to induce a targeted physiological outcome in hypothalamic tissue. In one embodiment, the targeted physiological outcome is a change in pIRS-1, pAKT 1/2, norepinephrine, epinephrine, and/or NPY in hypothalamic tissue relative to baseline (e.g., before energy application).

Figure 39A:
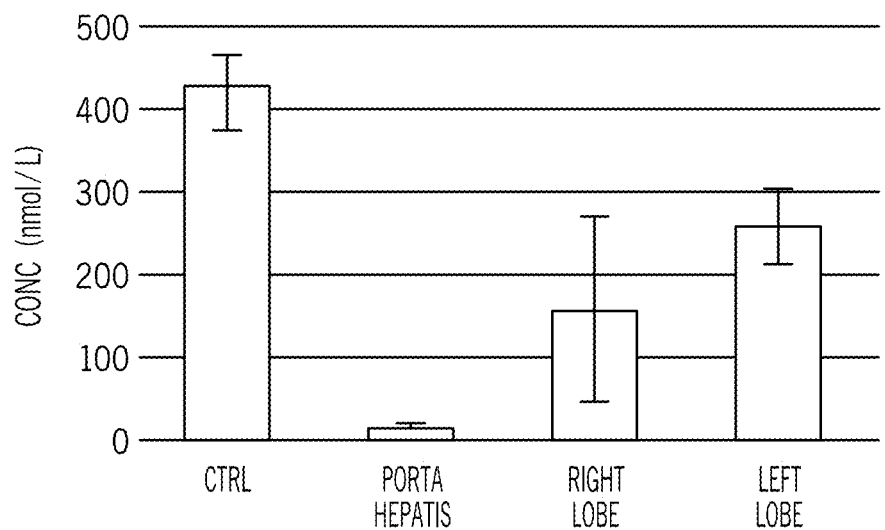
FIG. 39A shows the effect of ultrasound liver modulation at various location on glucose concentration.
Figure 39B:
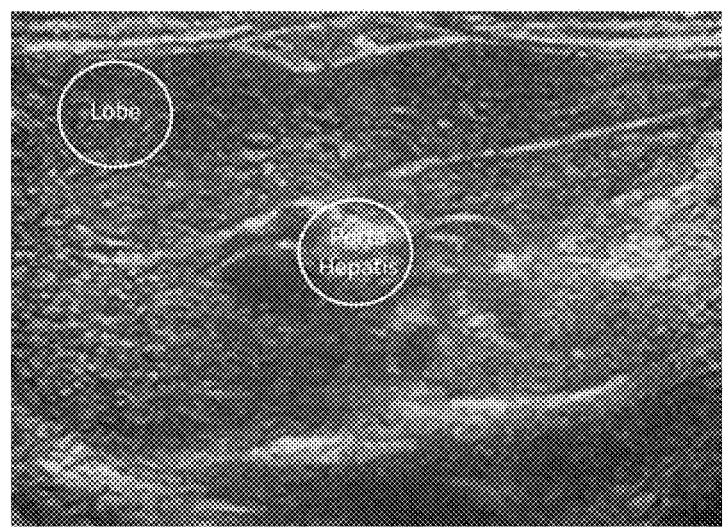
FIG. 39B shows the modulation locations of regions of interest of FIG. 39A.
Figure 40:
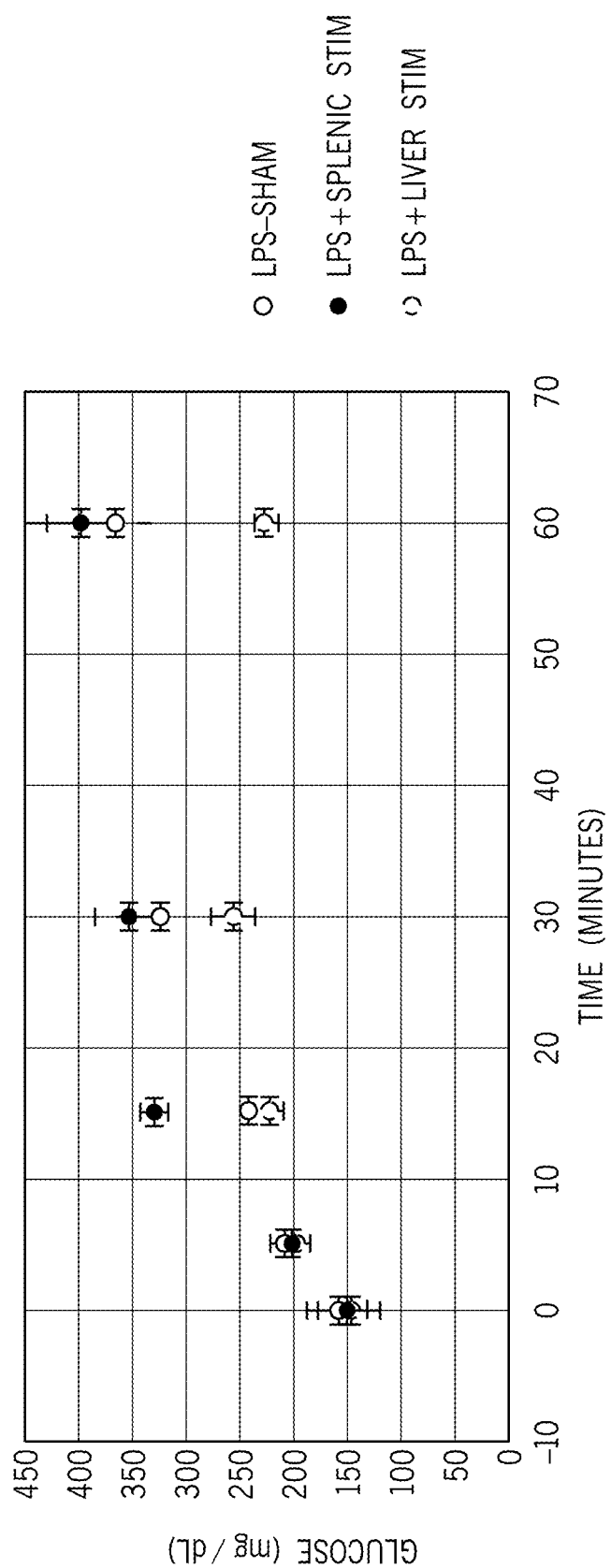
FIG. 40 shows that splenic ultrasound stimulation in LPS-treated animals does not yield the effects seen in the liver.

FIG. 39A shows the effect of ultrasound liver modulation at various location within the liver on glucose concentration and FIG. 39B shows the modulation locations of targeted regions of interest of FIG. 39A. The ultrasound modulation effect on the concentration of glucose is dependent on the location of the region of interest, i.e., the stimulation site. The change in glucose was most pronounced after stimulation at the porta hepatis and stimulation of the left lobe had the lowest observed change. Accordingly, in certain embodiments, the application of energy to a region of interest in the liver to induce a targeted physiological outcome may include application of energy to the porta hepatis and not to the left lobe of the liver. FIG. 40 shows that splenic ultrasound stimulation in LPS-treated animals does not yield the observed effects on glucose concentration seen following ultrasound stimulation of the liver, indicating that the effect is specific to the stimulation site.

Figure 41A:
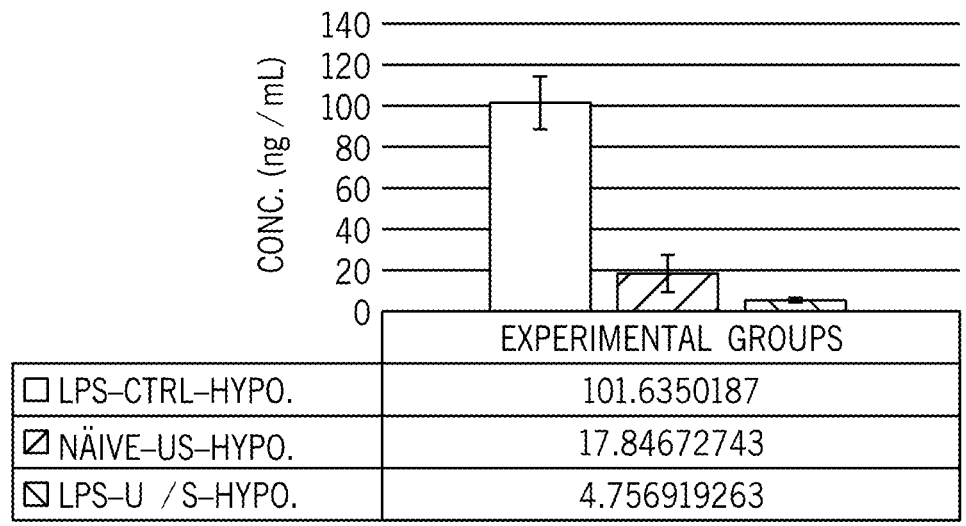
FIG. 41A shows hypothalamic NPY concentrations in LPS-treated animals stimulated animals vs. control.
Figure 41B:
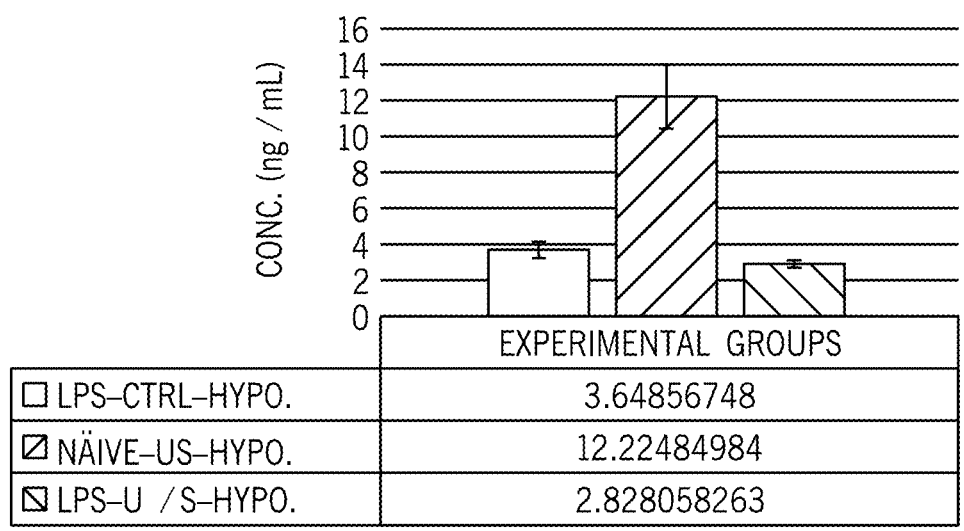
FIG. 41B shows hypothalamic POMC concentrations in LPS-treated stimulated animals vs. control.

FIG. 41A shows hypothalamic NPY concentrations in LPS-treated animals and ultrasound stimulated animals vs. controls. FIG. 41B shows hypothalamic POMC concentrations in LPS-treated and ultrasound stimulated animals vs. control. The data shows that hepatic ultrasound stimulation does not activation or modulate all metabolic control pathway within the hypothalamus, and is specific for certain pathways and neuron types.

Figure 42A:
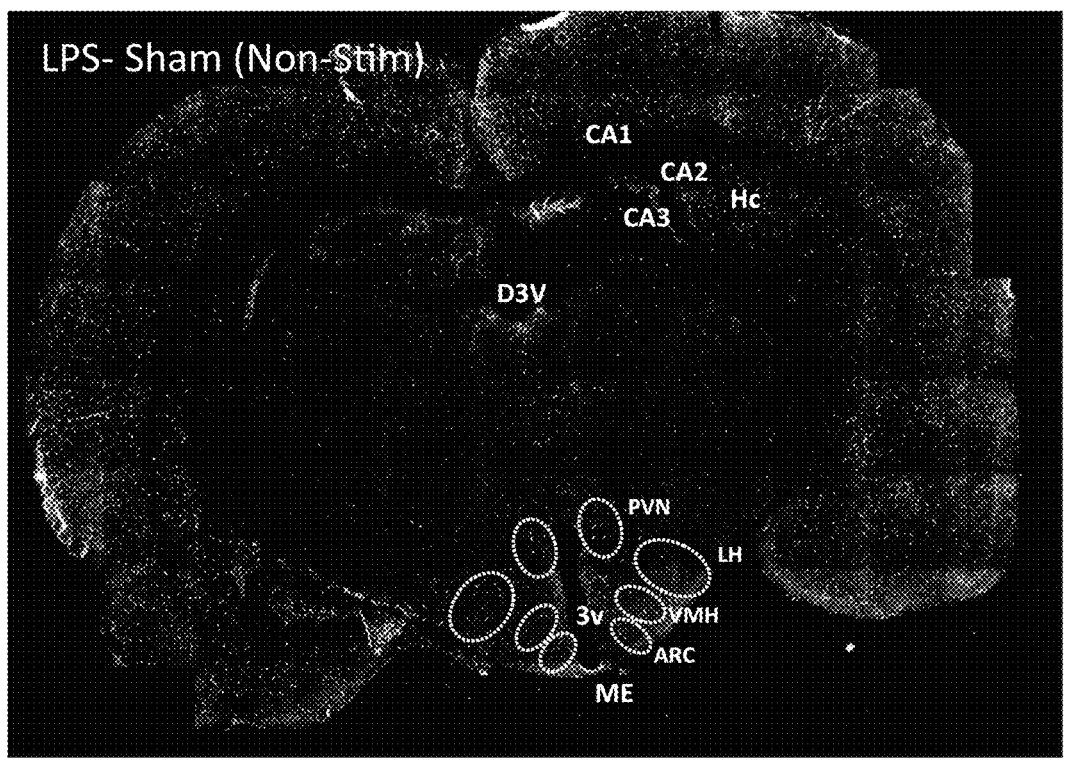
FIG. 42A shows a coronal section from a non-stimulated LPS sham animal.
Figure 42B:
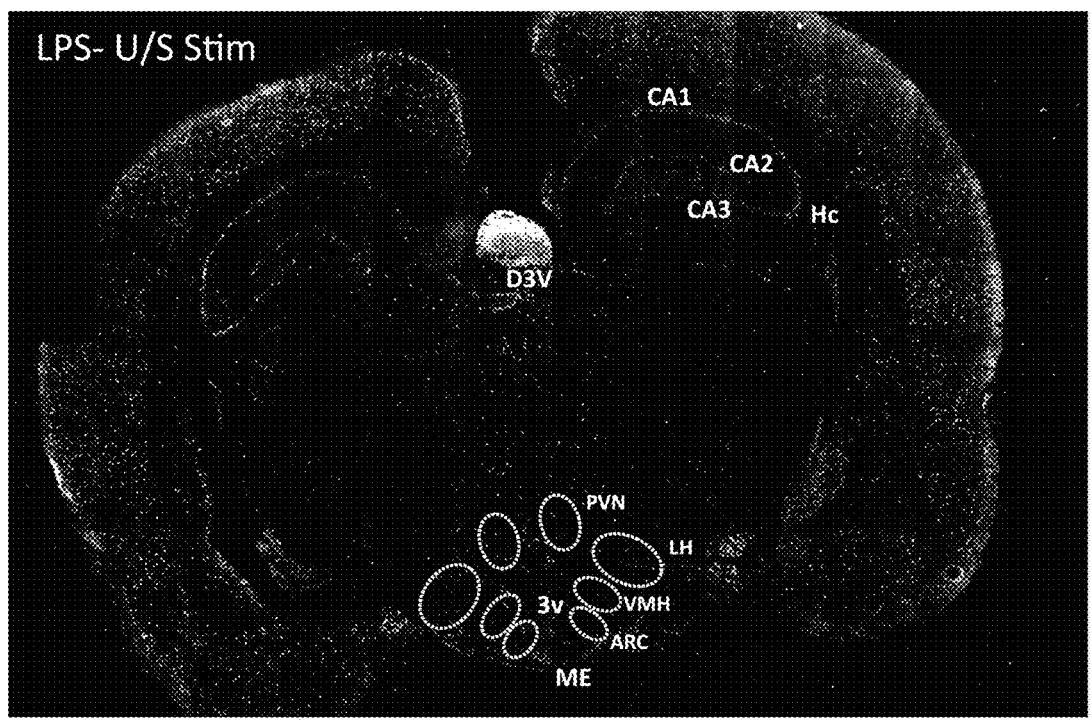
FIG. 42B shows a coronal section from a stimulated LPS-treated animal.
Figure 45A:
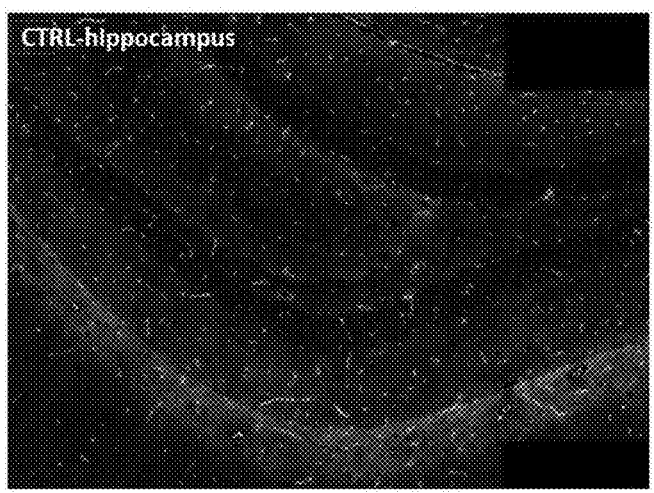
FIG. 45A shows cFOS and Glut1 staining in a control hippocampus.
Figure 45B:
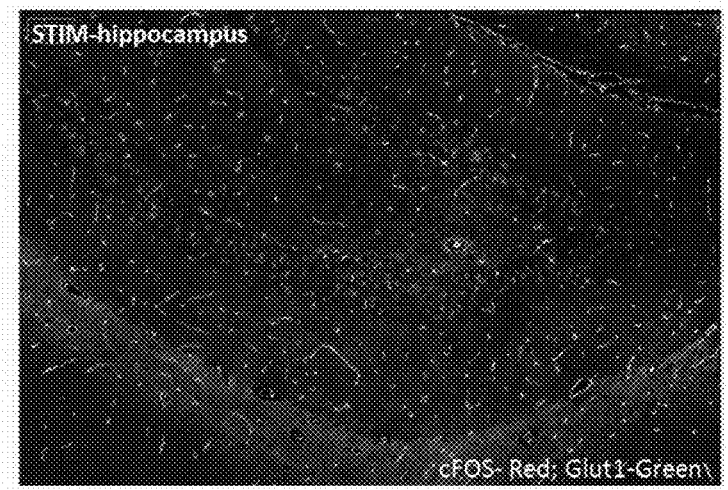
FIG. 45B shows cFOS and Glut1 staining in a stimulated hippocampus.
Figure 45C:
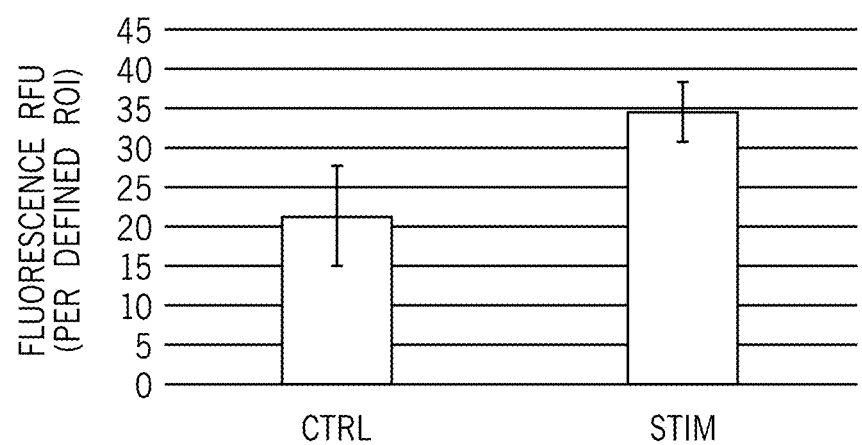
FIG. 45C shows fluorescence staining RFU for the image in FIG. 45A vs. the image in FIG. 45B.

FIG. 42A shows a coronal section and immunohistochemistry/stained image from a non-stimulated LPS sham animal and FIG. 42B shows a coronal section from a liver-stimulated LPS-treated animal. Significant decrease in cFos positive cells were observed in the ventromedial hypothalamus (VMH), arcuate (ARC) nucleus and moderate decrease in the lateral hypothalamic (LH) areas in the stimulated LPS-treated animal relative to the non-stimulated LPS sham animal. Significant increases in cFos positive cells in the hippocampus (Hc) with defined increase in the hippocampus proper (CA1, CA2, CA3) regions were also observed in the stimulated LPS-treated animal relative to the non-stimulated LPS sham animal. Diffusion MRI indicates an increase in ADC signal following ultrasound in the hippocampus (not shown). The opposite happens in the hypothalamus, where diffusion is greater before ultrasound stimulation FIG. 43 relative to the unstimulated animals (FIG. 44). cFos staining appears to support the conclusion of dMRI studies. Accordingly, as provided herein, the targeted physiological outcome may be a change in nerve signaling to the brain, and effect of gene expression within communicating and/or effect areas. FIG. 45A shows cFOS and Glut1 staining in a control hippocampus, and FIG. 45B shows cFOS and Glut1 staining in a stimulated hippocampus, indicating that the liver ultrasound stimulation effects upstream sites beyond the hypothalamus, and may have additional effects (beyond glucose regulation and metabolism) such as effects on cognition. FIG. 45C shows fluorescence staining RFU for the image in FIG. 45A vs. the image in FIG. 45B.

Figure 46:
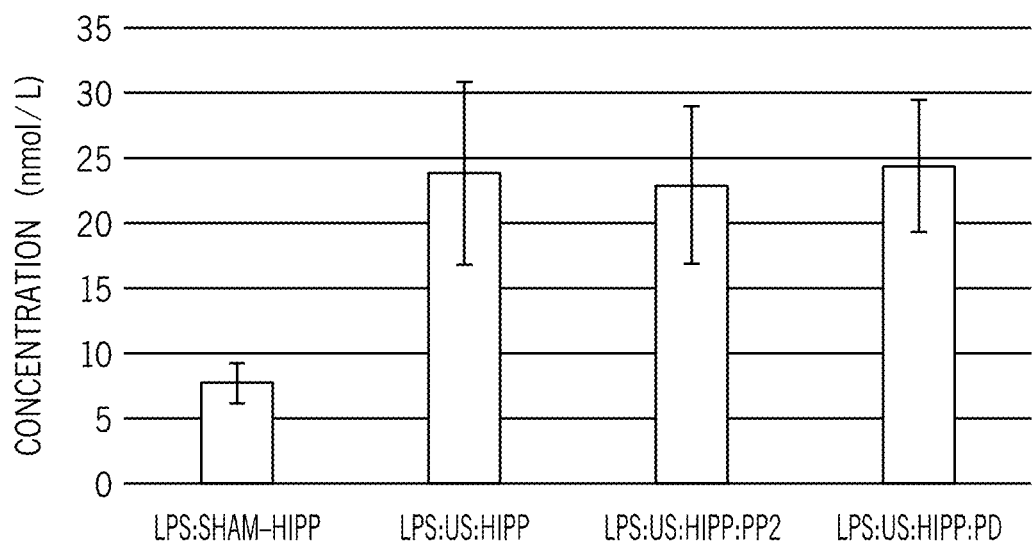
FIG. 46 shows hippocampus norepinephrine after stimulation in the liver in LPS-treated animals treated with pathway-blockers.
Figure 47:
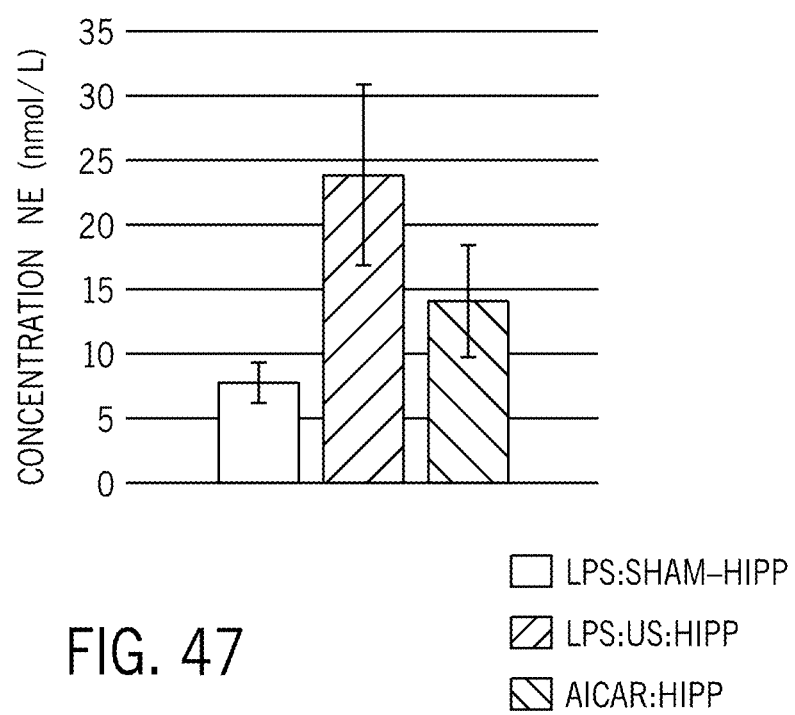
FIG. 47 shows hippocampus norepinephrine after treatment with an agonist for a diabetes drug target in LPS-treated animals.

FIG. 46 shows hippocampus norepinephrine after stimulation in the liver in LPS-treated animals treated with pathway-blockers (that unlike the splenic blocking experiments do not show a blocking effect on hepatic ultrasound neuromodulation). These results again indicate that ultrasound modulation has specific effects at different axoextracellular synaptic targets. FIG. 47 shows hippocampus norepinephrine after treatment with an agonist for a diabetes drug target (AICAR: an AMP-kinase activator) in LPS-treated animals, serving as a positive control and showing a similar effect relative to the liver ultrasound treatment. Accordingly, liver ultrasound treatment may be used to target diabetes-related pathways.

Figure 48:
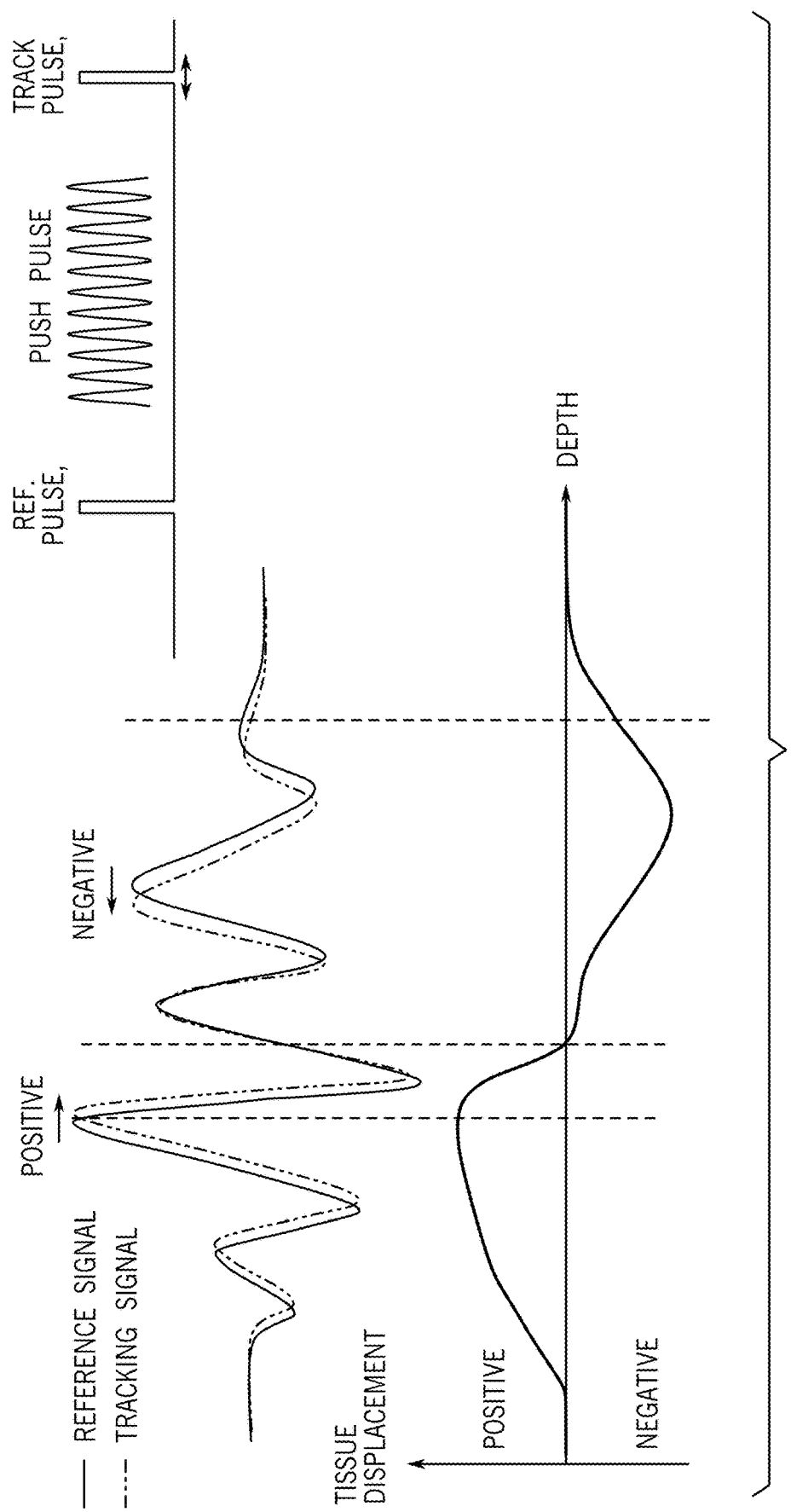
FIG. 48 shows tissue displacement tracked with a reference ultrasound signal.

FIG. 48 shows a schematic of how tissue displacement during neuromodulation may be tracked with a reference ultrasound imaging signal before and after ultrasound neuromodulation. The ultrasound probe may be used to 1) image, 2) measure displacement, and 3) stimulate. Displacement of the tissue may be used to assess the level of tissue movement due to the ultrasound stimulation (and therefore the probability of activating stretch activated proteins or ion channels in the target axoextracellular synapse). That is, for subjects with different body mass index (and different thickness of tissue between the ultrasound probe and the neuromodulation target that may attenuate applied ultrasound energy), the direct measurement of tissue displacement (at the site of neuromodulation) can be used to measurement the probability of successful neuromodulation and adjust ultrasound parameters accordingly. For example, the reference pulse may be used to measure tissue displacement.

Figure 49:
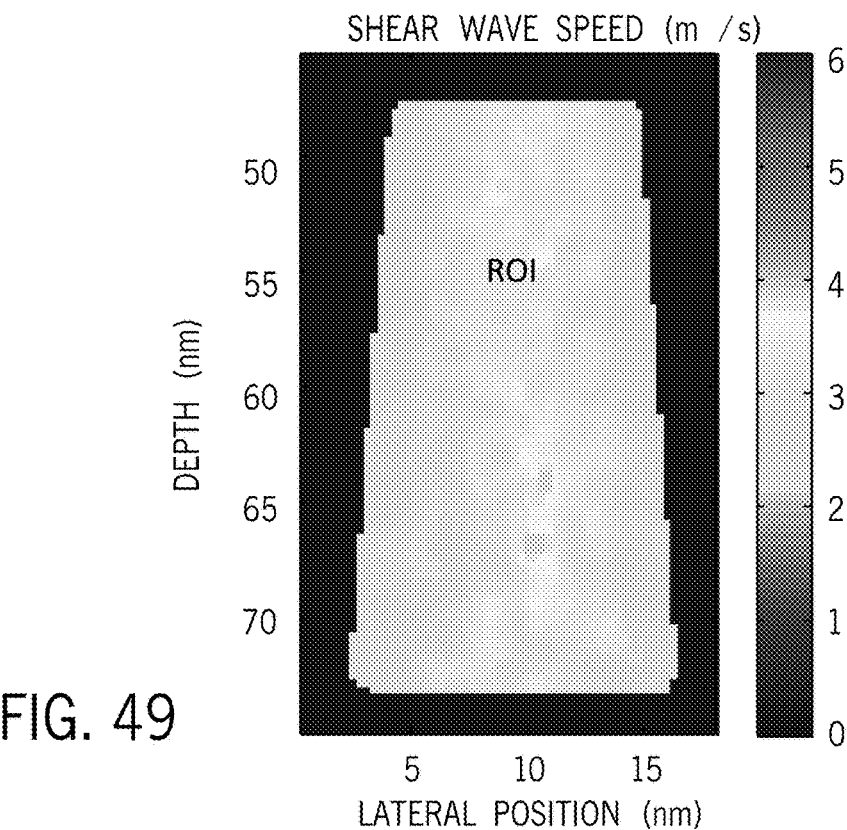
FIG. 49 shows shear wave measurements taken from the site of splenic stimulation.
Figure 50:
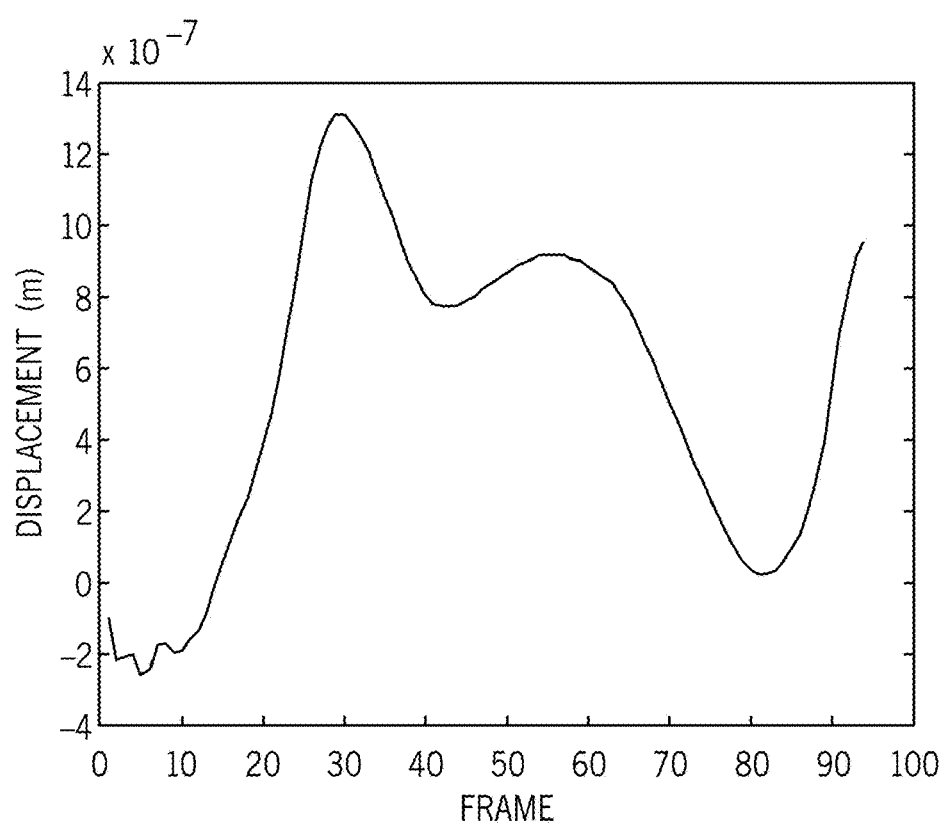
FIG. 50 shows displacement measurements taken from the site of splenic stimulation.

FIG. 49 shows shear wave measurements taken from the site of splenic stimulation and FIG. 50 shows displacement measurements taken from the site of splenic stimulation. D-displacement measurements may be made and used for feedback of reaching the targeted physiological outcome. For example, the feedback may be reaching a minimal threshold value in at least one imaging frame, achieving a specific total displacement value based on area under the curve of displacement, etc.

Figure 51:
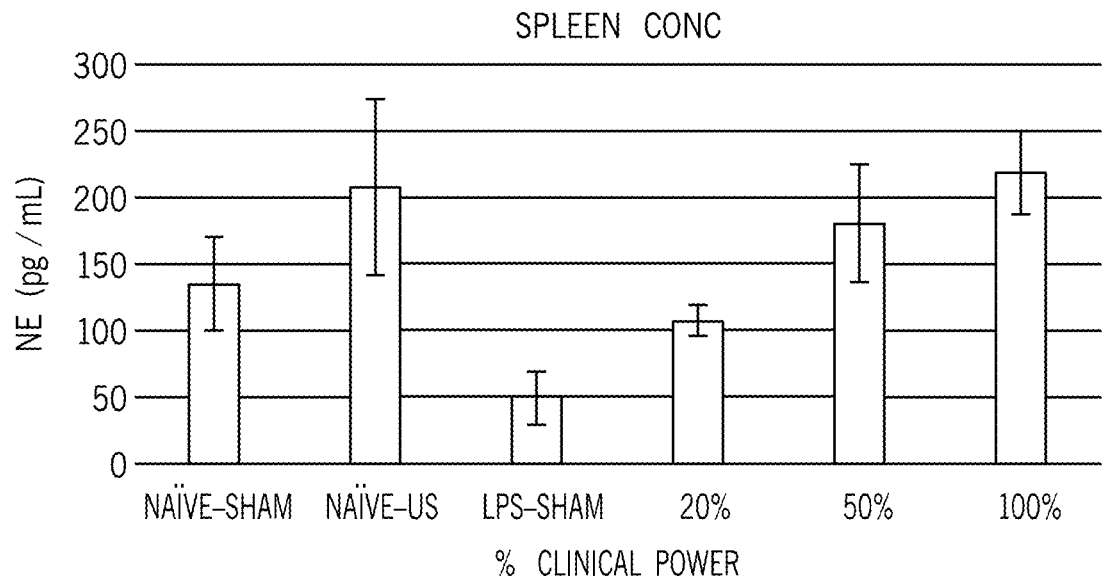
FIG. 51 shows splenic norepinephrine concentrations in animals treated with reduced ultrasound clinical power.
Figure 52:
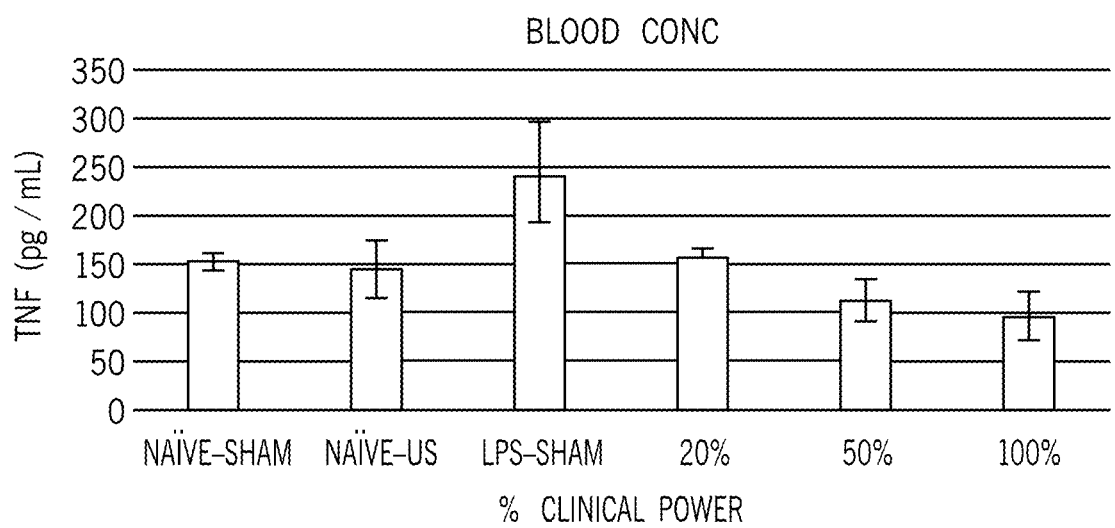
FIG. 52 shows splenic TNF-alpha concentrations in animals treated with reduced ultrasound clinical power.
Figure 53:
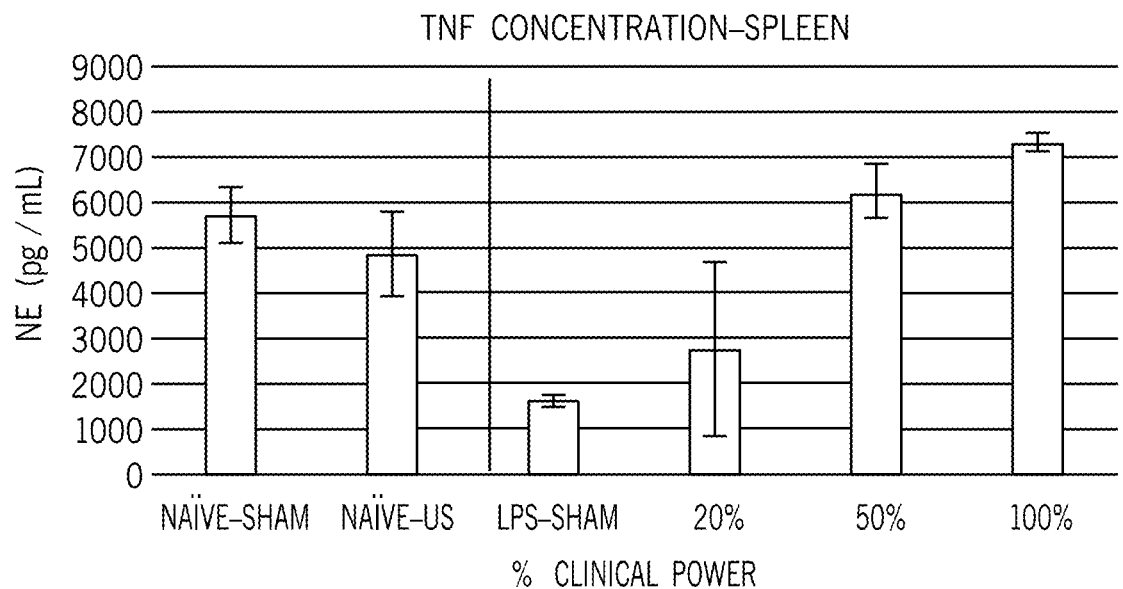
FIG. 53 shows blood norepinephrine concentrations in animals treated with reduced ultrasound clinical power.
Figure 54:
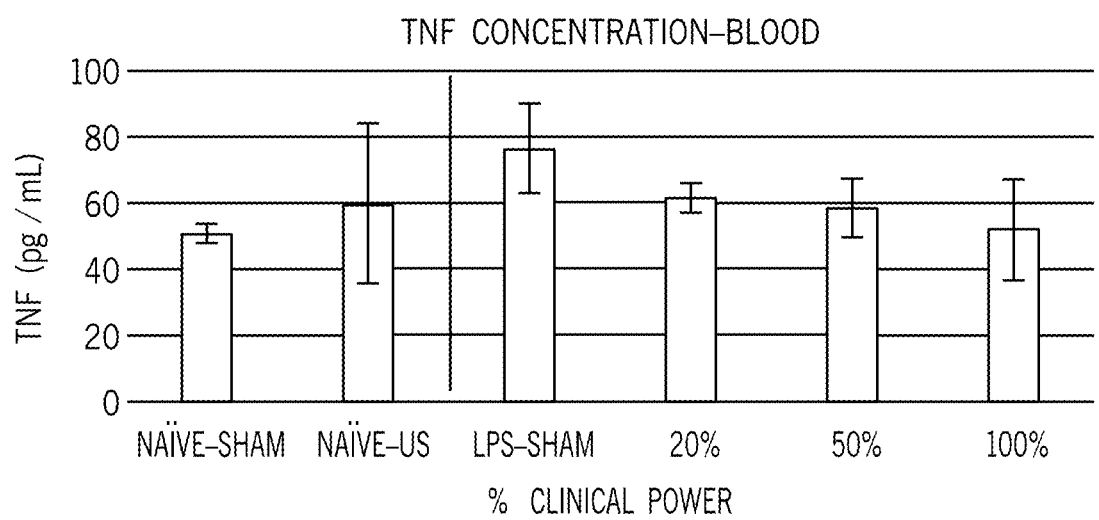
FIG. 54 shows blood TNF-alpha concentrations in animals treated with reduced ultrasound clinical power.

FIG. 51 shows splenic norepinephrine concentrations in animals treated with reduced ultrasound clinical power. FIG. 52 shows splenic TNF-alpha concentrations in animals treated with reduced ultrasound clinical power. FIG. 53 shows blood norepinephrine concentrations in animals treated with reduced ultrasound clinical power. FIG. 54 shows blood TNF-alpha concentrations in animals treated with reduced ultrasound clinical power. Reduced clinical power is relative to 100% clinical power.

Figure 55:
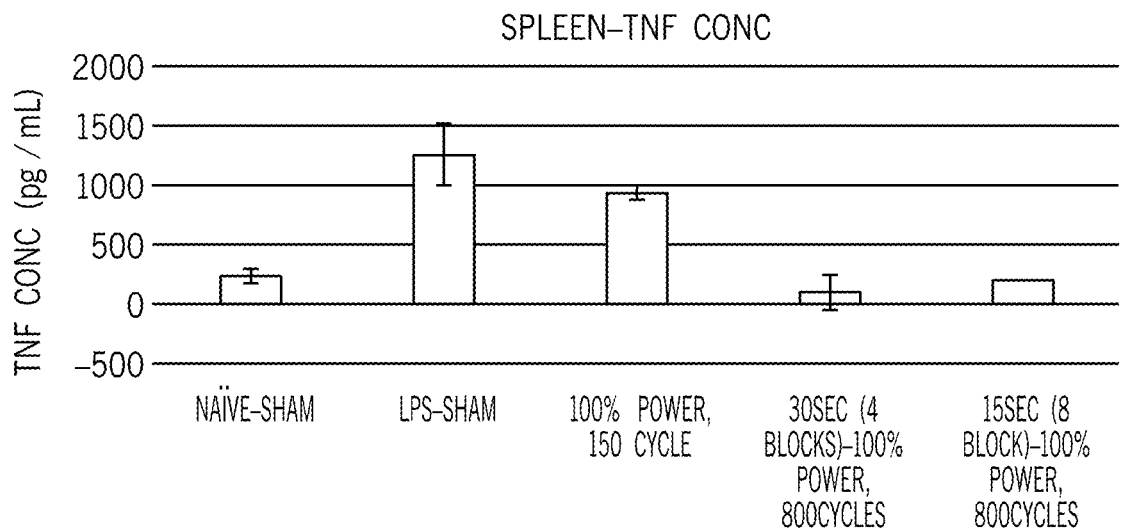
FIG. 55 shows splenic TNF-alpha concentrations in animals treated with modified pulse sequences.
Figure 56:
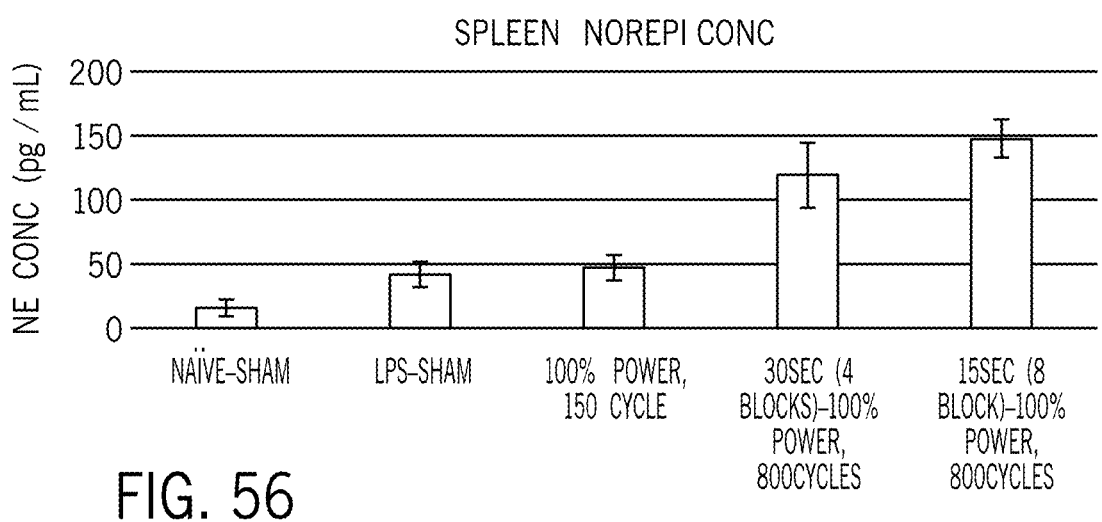
FIG. 56 shows splenic norepinephrine concentrations in animals treated with modified pulse sequences.
Figure 57:
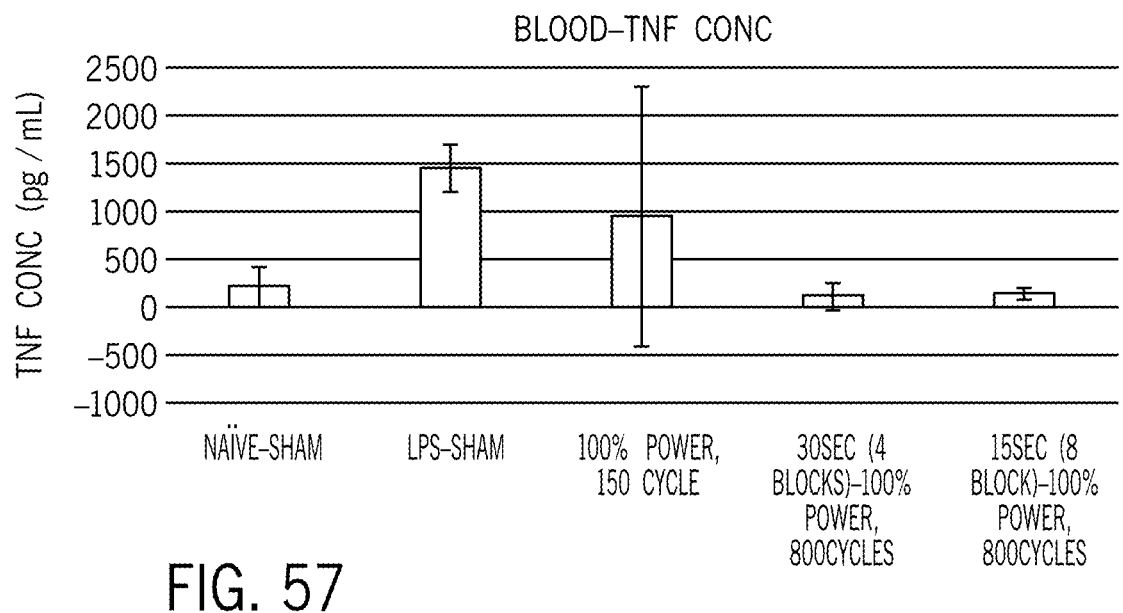
FIG. 57 shows blood TNF-alpha concentrations in animals treated with modified pulse sequences.
Figure 58:
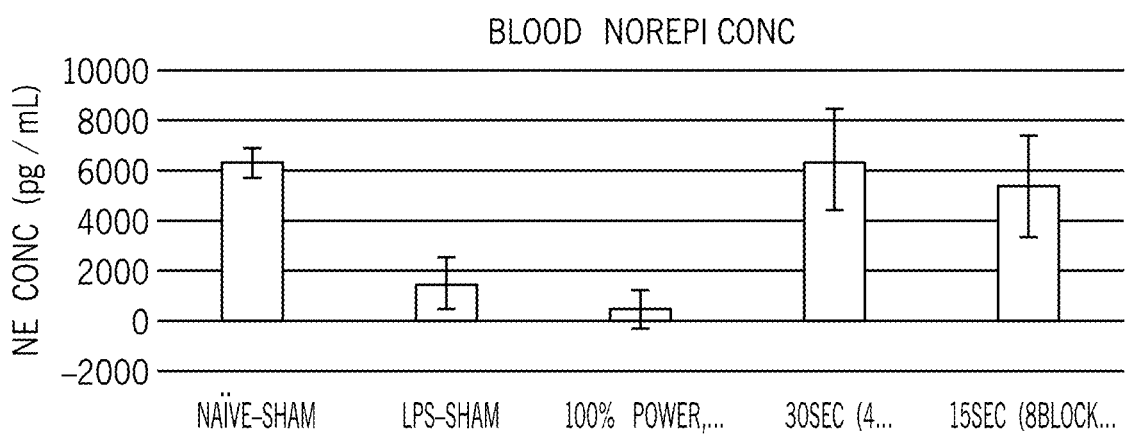
FIG. 58 shows blood norepinephrine concentrations in animals treated with modified pulse sequences.

FIG. 55-58 shows results from ultrasound stimulations of the spleen with modified pulse sequences of 800 pulses performed 30 s or 15 s at a time and showing the same effect as 800 cycles performed all at once. FIG. 55 shows splenic TNF-alpha concentrations in animals treated with the modified pulse sequences. FIG. 56 shows splenic norepinephrine concentrations in animals treated with the modified pulse sequences. FIG. 57 shows blood TNF-alpha concentrations in animals treated with the modified pulse sequences. FIG. 58 shows blood norepinephrine concentrations in animals treated with the modified pulse sequences.

Figure 59:
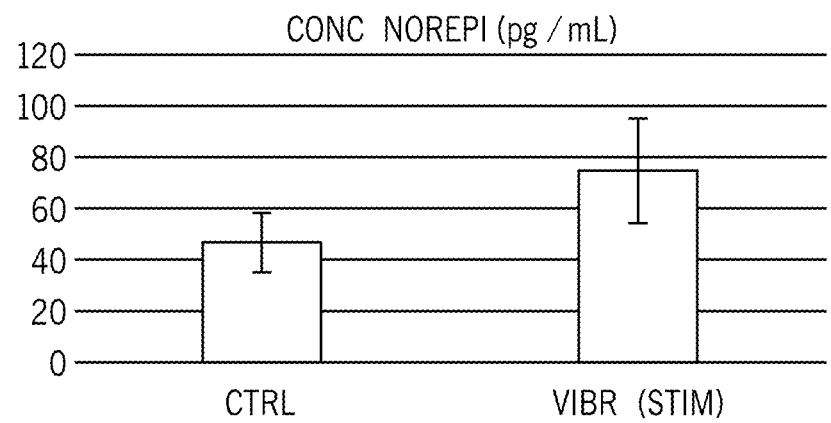
FIG. 59 shows splenic norepinephrine concentrations relative to control after direct mechanical vibration of the spleen.
Figure 60:
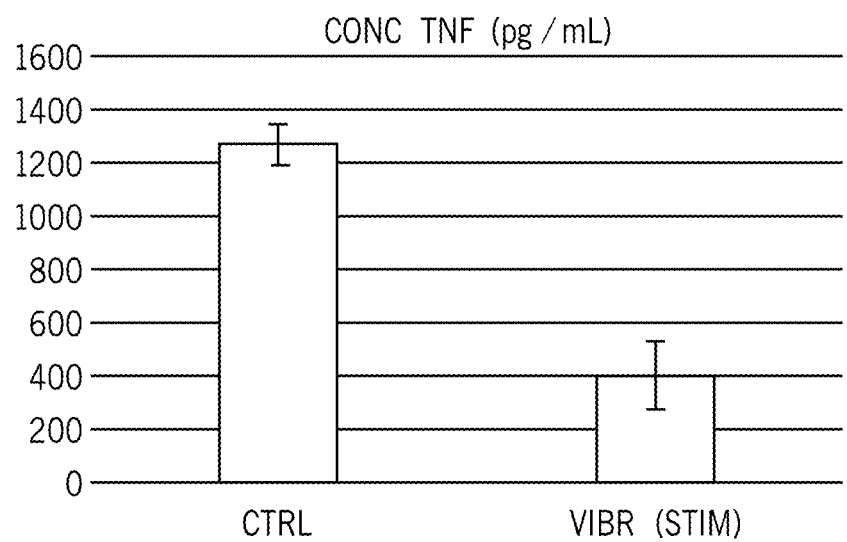
FIG. 60 shows splenic TNF-alpha concentrations relative to control after direct mechanical vibration of the spleen.

FIG. 59 shows splenic norepinephrine concentrations relative to control after applying mechanical vibrational energy to the spleen and FIG. 60 shows splenic TNF-alpha concentrations relative to control after applying mechanical vibrational energy to the spleen. The mechanical vibrational energy was generated using a TIRA Vibration System Model TV 50018 from TIRA GmbH consisting of a shaker (model S 504) and amplifier (BAA 60) The tip of the shaker was in direct contract with splenic surface. FIG. 59 and FIG. 60 show that mechanical vibrational energy modulates specific, targeted axoextracellular synapse in a similar manner as ultrasound energy Provided herein are techniques for neuromodulation based on direct and focused stimulation of targeted regions of interest. The targeted regions of interest may be any tissue or structure in the body having a plurality of types of axon terminals forming axoextracellular synapses with non-neuronal cells or fluids. In one example, the region of interest may be in an immune organ or structure, such as a spleen or lymph node. Neuromodulation of lymph tissue may alter the drainage rate and/or the population of cells in the drained fluid. Due to co-localization of nerves innervating the immune cell and lymphatic vessel compartments of the lymph node, neurotransmitter release may have a simultaneous effect on both lymphatic and immune function; therefore, the observable changes in lymphatic function (i.e. easily observable size and/or flow change in lymphatic tissue using non-invasive imaging technology) may be used as a targeted physiological outcome and surrogate measure of immune cell neuromodulation (i.e. the simultaneous changes in immune cell phenotypes due to release of the local neurotransmitters).

Provided herein are techniques that may be applied to "neuroimmune synapses" or "neuroimmune interfaces." The depicted examples are directed to application of energy to lymph nodes that are proximate to the exit lymphatic vessels on lymph nodes. These nerves may alter the transit of lymphocytes through the lymph node and when stimulated result in increased lymphocyte retention (i.e. more lymphocytes in the lymph node). One molecular mechanism for decreasing lymphocyte egress from the exit lymphatic vessels is modulation of the ccr7 chemoreceptor activity through coupling and signaling through a beta-adrenergic receptor.

Also provided herein are techniques that may be applied to the treatment of glucose metabolism and associated disorders. In one embodiment, liver modulation at one or more regions of interest may be used to treat diabetes, hyperglycemia, diabetes-associated dementia, obesity, or other eating or metabolic disorders.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A neuromodulation system comprising:
   an energy application device; and
   a controller comprising a memory, wherein the memory stores instructions that, when executed by the controller, cause the controller to:
      acquire image data of non-neuronal peripheral tissue using an ultrasound energy application device;
      identify a region of interest of the non-neuronal peripheral tissue using the image data;
      apply treatment energy using modulation parameters via the energy application device to the region of interest to cause lateral tissue displacement of the non-neuronal peripheral tissue that is lateral to a direction of the applied treatment energy in the region of interest;
      acquire additional image data;
      measure the lateral tissue displacement caused by application of the applied treatment energy using the additional image data; and
      change one or more of the modulation parameters based on the measured lateral tissue displacement.

2. The system of claim 1, wherein the lateral tissue displacement is measured relative to a reference.

3. The system of claim 2, wherein the reference is acquired before the treatment energy is applied and the additional image data is acquired after the treatment energy is applied.

* * * * *